United States Patent Office 3,514,477
Patented May 26, 1970

3,514,477
2-(CYANOAMINOMETHYL)-4,10-DIOXO-1,2,3,4,4a, 9,9a,10-OCTAHYDROANTHRACENES
Lloyd H. Conover, Quaker Hill, Conn., assignor to Chas. Pfizer & Co., Inc., New York, N.Y., a corporation of Delaware
No Drawing. Original application June 17, 1966, Ser. No. 558,267, now Patent No. 3,502,696, dated Mar. 24, 1970. Divided and this application Apr. 3, 1967, Ser. No. 627,852
Int. Cl. A61k 27/00; C07c 103/19, 121/66
U.S. Cl. 260—465                                  6 Claims

ABSTRACT OF THE DISCLOSURE

A series of 4,10-dioxo-1,2,3,4,4a,9,9a,10-octahydroanthracenes having at the 2-position a formyl, carboxy, carboalkoxy, carbobenzyloxy, carbothioalkyl, carbothiobenzyl chloroformyl, cyanoaminomethyl, or cyanohydroxymethyl group which are useful as intermediates for the synthesis of tetracycline-type antibiotics, as bactericides and/or chelating agents; and methods for their preparation. Tetracyclines are produced by a multistep process beginning with 4,10-dioxo-1,2,3,4,4a,9,9a,10-octahydro-2-anthraldehyde comprising; (1) condensation with acetone cyanohydrin followed by reaction with an amine to give a 2-(cyanoaminomethyl)-4,10-dioxo-1,2,3,4,4a,9, 9a,10-octahydroanthracene; (2) hydrolysis of the nitrile to the corresponding 2-(carboxyaminomethyl)-1,2,3,4,4a, 9,9a,10-octahydroanthracene; (3) conversion of the acid to a mixed anhydride; (4) acylation of a malonic ester derivative with the mixed anhydride; (5) followed by cyclization of the acyl malonate derivative to a 12a-deoxytetracycline which is then hydroxylated to a tetracycline.

CROSS-REFERENCES TO RELATED APPLICATIONS

This application is a divisional of co-pending application Ser. No. 558,267, filed June 17, 1966, which in turn is a continuation-in-part of application Ser. No. 234,511, filed Oct. 31, 1962, which in turn is a continuation-in-part of application Ser. No. 132,287, filed Aug. 18, 1961, both of which are now abandoned.

BACKGROUND OF THE INVENTION

This invention relates to a process of preparation of antibacterial agents. More particularly, it is concerned with the discovery of new and novel synthetic routes for the preparation of known as well as new tetracycline products. It is also concerned with the new and useful tetracycline products obtained thereby, as well as with the new intermediates of the process.

The tetracycline antibiotics comprise a group of biologically active hydronaphthacene derivatives having the following essential structural features. The numbering system indicated is that employed by "Chemical Abstracts."

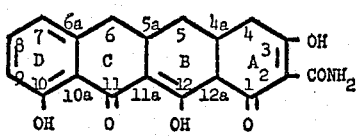

Among the biologically active members of this group are those containing the following substituent groups:

| Substituents | Common name |
|---|---|
| 4-N(CH$_3$)$_2$,6-OH,6-CH$_3$,12a-OH | Tetracycline. |
| 4-N(CH$_3$)$_2$,5-OH,6-OH,6-CH$_3$,12a-OH. | 5-oxytetracycline: |
| 4-N(CH$_3$)$_2$,6-OH,6-CH$_3$,7-Cl-12a-OH. | 7-chlorotetracycline. |
| 4-N(CH$_3$)$_2$,5-OH,6-CH$_3$,12a-OH | 6-dioxy-5-oxytetracycline. |
| 5-OH,6-CH$_3$,12a-OH,6-OH | 4-desdimethylamino-5-oxytetracycline. |
| 4-N(CH$_3$)$_2$,6-CH$_3$,12a-OH | 6-deoxytetracycline. |
| 4-N(CH$_3$)$_2$,12a-OH | 6-deoxy-6-demethyltetracycline. |
| 4-N(CH$_3$)$_2$,6-OH,6-CH$_3$,7-Br,12a-OH. | 7-bromotetracycline. |
| 4-N(CH$_3$)$_2$,6-OH,7-Cl,12a-OH | 6-demethyl-7-chlorotetracycline. |
| 6-OH,6-CH$_3$,12a-OH | 4-desdimethylaminotetracycline. |
| 6-OH,6-CH$_3$,7-Cl,12a-OH | 4-desdimethylamino-7-chlorotetracycline. |
| 4-N(CH$_3$)$_2$,6-OH,12a-OH | 6-demethyltetracycline. |
| 12a-OH | 6-deoxy-6-demethyl-4-desdimethylaminotetracycline. |

SUMMARY OF THE INVENTION

The present new processes utilize a unique group of diketotricyclic aldehydes having the following structural formula:

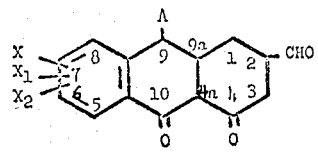

(I)

For convenience in illustrating the location of substituent groups the positions of the ring system have been numbered in this formula. The parent compound of the ring system have been numbered in this formula. The parent compound of the series, that is, the unsubstituted product, is 4,10 - dioxo-1,2,3,4,4a,9,9a,10-octahydro-2-anthraldehyde.

In the above formula, X is selected from the group consisting of hydrogen, hydroxy, trifluoromethyl, amino, mono- and di-lower-alkylamino, alkanoylamino containing 2 to 4 carbon atoms, lower alkyl, alkanoyloxy containing 2 to 4 carbon atoms, and OR wherein R is selected from the group consisting of lower alkyl and benzyl;

X$_1$ is selected from the group consisting of hydrogen, hydroxy, chloro, lower alkyl, trifluoromethyl, amino, mono- and di-lower alkylamino, alkanoylamino containing 2 to 4 carbon atoms, and OR' wherein R' is lower alkyl;

With the proviso that only one of X and X$_1$ is selected from the group consisting of amino, mono- and di-lower-alkylamino, and alkanoylamino containing 2 to 4 carbon atoms;

X$_2$ is selected from the group consisting of hydrogen, hydroxy, and OR in which R is as previously defined;

A is selected from the group consisting of hydrogen, lower alkyl, and R$_8$OCH(R$_4$)— wherein R$_8$ is lower alkyl and R$_4$ is selected from the group consisting of hydrogen and lower alkyl.

It should be noted that whereas the X, X$_1$ and X$_2$ substituents are arranged in that order in the generic structure I, this representation is for convenience only. In actual practice these groups can occur in any sequence in the benzenoid moiety.

Of course, the compounds of structure I may exist in other tautomeric forms, e.g. the 10-enol form.

The favored compounds of structure I are those of the following formula:

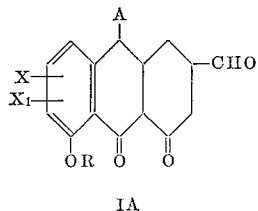

IA in which X, $X_1$, R and A are as above-described. The preferred compounds are those in which the X and $X_1$ groups are at the 7- and 8-positions or the 8- and 7-positions of Formula 1–A. These compounds are preferred since they are useful in the preparation of known tetracyclines as well as new and useful tetracycline derivatives not previously described.

Compounds of structure I are particularly useful in synthesizing 6-deoxytetracycline, 6-dexoy-6 - demethyltetracycline and various novel antimicrobial agents bearing structural similarities to the known tetracycline antibiotics. Thus, Structure I compounds may be transformed, by a number of alternative synthetic sequences, to tetracyclines having the formula

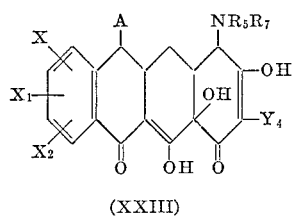

(XXIII)

where X, $X_1$, $X_2$ and A are as previously defined. Additionally, these substituents may be replaced, in the final tetracycline or in the intermediates, by other valuable groupings, according to procedures described hereinafter. Thus, X, $X_1$ and $X_2$ may be transformed to hydroxy, nitro, cyano, bromo, carbalkoxy, hydroxyalkyl, alkyl sulfonyl, halo sulfonyl, alkyl sulfinyl, and sulfamyl, and A may be transformed to amino, mono- and dialkylamino, $=CHR_4$ and $—CH(R_4)OH$, by appropriate reactions, as will be later discussed.

In the above formula, $R_5$ and $R_7$ when taken together with the nitrogen atom to which they are attached form a nitrogen heterocyclic ring selected from the group consisting of piperazino, piperidino, morpholino, thiomorpholino, pyrrylo, pyrrolidino, and 2-(lower carbalkoxy)pyrrolidino;

$R_5$ and $R_7$ are each selected from the group consisting of hydrogen, alkanoyl containing 1 to 4 carbon atoms, and $CH_2B_1$ wherein $B_1$ is selected from the group consisting of hydrogen, lower alkyl and monosubstituted lower alkyl, said substituent being selected from the group consisting of hydroxy and lower alkoxy;

Provided that only one of $R_5$ and $R_7$ is selected from the group consisting of alkanoyl containing 1 to 4 carbon atoms;

and $Y_4$ is selected from the group consisting of cyano and

wherein

D is selected from the group consisting of hydrogen and lower alkyl.

Several alternative procedures are available for the preparation of the tetracyclines of Structure XXIII from aldehydes I. The choice of a particular route for the preparation of a given tetracycline will be influenced by availability of materials, yields of products throughout the sequence, and similar economic factors. The conditions employed in each of the reactions can, unless otherwise indicated, be varied within the skill of the art.

DETAILED DESCRIPTION OF THE INVENTION

The various alternative reaction sequences for the preparation of tetracyclines XXIII via aldehydes I, and other novel intermediates utilized in these alternatives sequences, are summarized in Flow Sheet I.

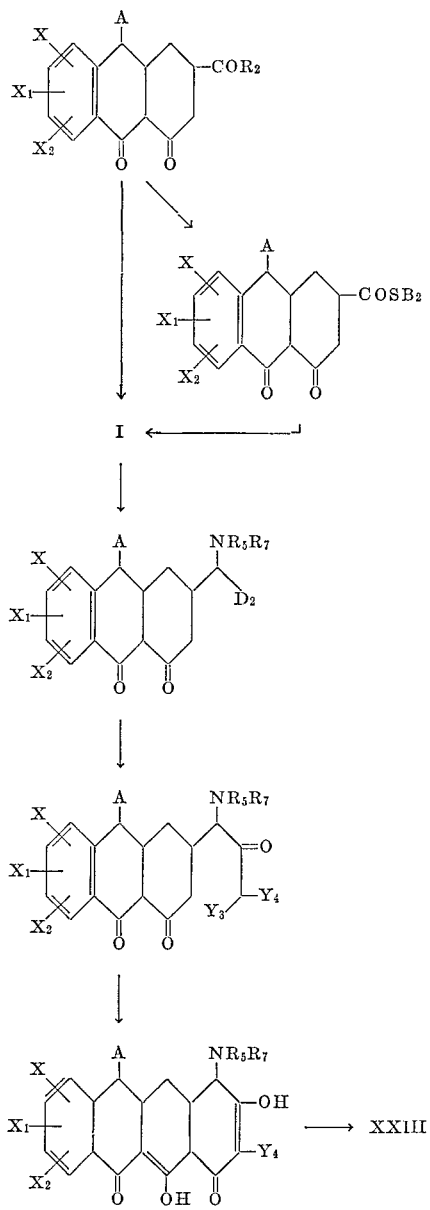

FLOW SHEET I

In the reaction sequences depicted in Flow Sheet I, X, $X_1$, $X_2$, A, $R_5$, $R_7$ and $Y_4$ are as previously defined;

$B_2$ is selected from the group consisting of lower alkyl, benzyl and mercaptoethyl;

$D_2$ is selected from the group consisting of cyano and $COZ_2$ wherein $Z_2$ is selected from the group consisting of hydroxy, lower alkoxy, and $—O(CO)OR_8$ wherein $R_8$ is lower alkyl;

$R_2$ is selected from the group consisting of hydroxy, lower alkoxy, benzyloxy, and halo;

$Y_3$ is selected from the group consisting of hydrogen, cyano and lower carbalkoxy.

Reaction sequences depicting the conversion of aldehydes I to tetracyclines in greater detail are provided in Flow Sheet 2.

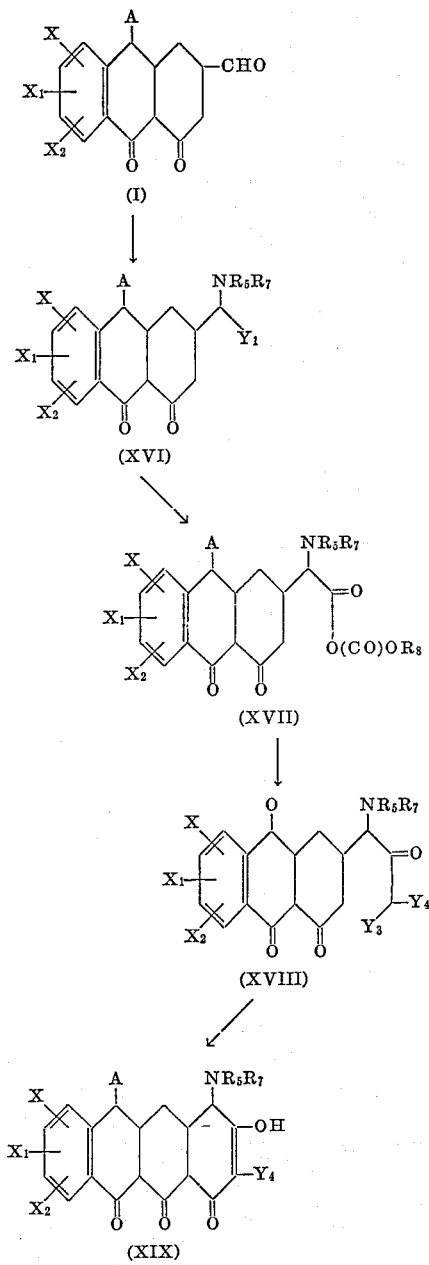

FLOW SHEET 2

In the foregoing reaction schemes X, $X_1$, $X_2$, $Y_3$, $Y_4$, A, $R_5$, $R_7$ and $R_8$ are as previously defined;

$Y_1$ is selected from the group consisting of carboxy, cyano, and lower carbalkoxy.

The reactions of Flow Sheet 2 may be summarized as follows:

I→XVI: represents conversion of aldehyde I to the aminonitrile, where $Y_1$=CN. This transformation can be effected by treatment of the aldehyde with acetone cyanohydrin in the presence in the presence of base to provide the 2-cyanohydroxymethyl derivatives, which yields the aminonitrile upon reaction with the selected amine, e.g.

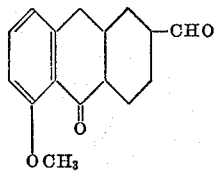

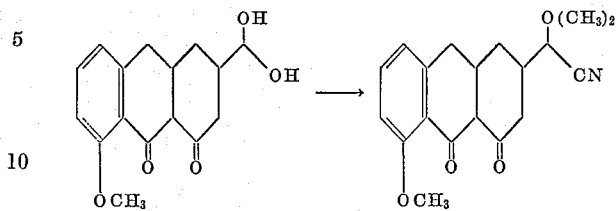

where $R_5$ and $R_7$ are hydrogen the product can be obtained by reaction of the aldehyde with a mixture of ammonium chloride and sodium cyanide in ammoniacal aqueuos alcohol. The aminonitriles are converted to the aminoacids ($Y_1$=COOH) by acid hydrolysis or by prolonged refluxing in 5% NaOH in the presence of $ZnCl_2$.

XVI→XVII: is the formation of a mixed anhydride with a lower alkyl chlorocarbonate as described in the Journal of the American Chemical Society, vol. 75, p. 638 (1953) and the Journal of Organic Chemistry, vol. 22, p. 248 (1957).

XVII→XVIII: is the acylation of a malonic ester derivative with XVII. Suitable malonic derivatives include malonic ester, cyanoacetic ester, malonodinitrile, malonic ester half amide, etc. The malonic diester, cyanoacetic ester, malonic ester half amide, including N-alkylated amides and especially the magnesium salt of ethyl t-butyl-maloamate etc., with the mixed anhydride produces the malonate. Reaction is conducted in a suitable solvent system such as chloroform, toluene, benzene, diethylether, acetonitrile, dimethylformamide, nitromethane, dioxane, tetrahydrofuran, ethers of ethyleneglycol and diethyleneglycol at from about −5° to about 35° C. for periods ranging from 25 minutes to up to 3 days. When $X_3$ is (CO)$OR_8$ the malonic acid derivative is employed as a magnesium enolate according to the procedure of Tarbell and Price (J. Org. Chem., Loc. cit.) ($R_8$=lower alkyl, benzyl).

Where $Y_4$=N-alkyl carboxamido, treatment of XVIII with sulfuric acid (e.g. 80% $H_2SO_4$) yields the corresponding unsubstituted carboxamide.

XVVIII→XIX: represents ring closure by base-catalyzed acylation. Where $Y_3$=CN the 1-imido group which results is hydrolyzed with aqueous acid to the keto group. Where $Y_3$ and $Y_4$ are both hydrogen, base-catalyzed acylation with a dialkyl carbonate provides XIX ($Y_4$=H).

Compounds of structure XIX wherein $Y_4$ is other than cyano or carboxamido may be converted to compounds wherein $Y_4$=CN or $CONH_2$ by a variety of routes. Where the $C_2$ substituent is H ($Y_4$—H), treatment with an alkyl or acyl isocyanate in the presence of sodium hydride or other base (triethylamine, alkali metal alkoxides, sodamide, 1,4-diaza[2,2,2]bicyclooctane) introduces a 2-N-substituted carboxamido group. In the case of an acyl isocyanate, the resulting 2-N-acyl carboxamido group is readily hydrolyzed to a 2-carboxamido group by methanolic ammonia; while in the case of a secondary or tertiary alkyl isocyanate, e.g. t-butyl isocyanate the resulting 2-N-alkyl carboxamido group is converted to the 2-carboxamido group by dealkylation with concentrated mineral acid and water. The carboxamido group may also be introduced into compounds of Formula XIX by treatment with carbamyl chloride or an N-alkyl carbamyl chloride under basic conditions, e.g. in the presence of triethylamine, or other base as given above. Where a secondary or tertiary N-alkyl carboxamide is converted to an unsubstituted carboxamide by treatment with mineral acid as previously discussed.

The reactions of isocyanates and carbamyl chlorides are generally carried out at temperatures of from about 0° to about 70° C. Most reactions proceed satisfactorily at room temperature after an initial cooling period which serves to moderate the reaction during the mixing of the reactants. Solvents such as dimethyl sulfoxide, toluene, dioxane, tetrahydrofuran, acetonitrile, ethers of ethylene- and diethyleneglycol and especially dimethylformamide are suitable for the reaction. The reaction time varies from about 10 minutes to 24 hours depending upon the reactants.

Additionally, thet carboxamide group may be introduced at the 2-position of these compounds by heating with urea under basic conditions. For example, the reaction may be carried out in dimethyl-formamide solution under the influence of triethanolamine at temperatures ranging from 80° C. to the boiling point of the solvent. The reaction period varies with the structure of the reactant. However, periods of from about 5 minutes to one hour are generally satisfactory.

In lieu of this procedure, fusion with urea at about 130° C. for from 15 to 45 minutes under nitrogen serves to introduce a carboxamide group at C–2. (Scarborough, J. Org. Chem. 26, 3717 (1960)). Additionally, compounds in which hydrogen is at C–2 may be treated with lower alkyl halocarbonates to introduce carbalkoxy under conditions similar to those described above for introducing the carboxamide group via carbamyl chlorides. Further, ethyl ortho formate under acid conditions introduces a formyl group at C–2. The aldehyde function thus produced can be subjected to typical carbonyl reactions.

Compounds of structure XIX in which hydrogen is at C–2 are converted to corresponding compounds in which C–2 bears cyano by reaction with ethyl chloroximinoacetate in the presence of an acid acceptor, e.g. sodium carbonate or triethylamine, followed by hydrolysis of the thus produced 2,3-tetracycline - 4',5' - isoxazole-3'-carboxylic acid ethyl ester to the corresponding 3'-carboxylic acid which is decarboxylated and converted to the nitrile product by treatment with copper and ammonia. A further related method comprises the reaction of chlorine free cyanogen chloride with compounds of structure XIX.

Conversion of the 2-cyano group to a carboxamido group is accomplished by the method described in U.S. Pat. 3,029,284, issued Apr. 10, 1962 wherein is described the conversion of tetracycline nitriles to the corresponding carboxamide by the Ritter Reaction followed by dealkylation of the resulting N-alkylated carboxamide with concentrated mineral acid and water.

Where $Y_4$=carbalkoxy, conversion to the corresponding carboxamido compounds is accomplished by ammonium formate fusion followed by hydrolysis, but the yield in this instance is usually lower.

In the above sequences, many of the indicated steps are carried out by standard procedures known to those in the art, e.g. hydrolysis, esterification, acylation, etc.

12a-hydroxylation may be accomplished by known procedures such as described in J.A.C.S. 81, p. 4748 (1959). A preferred method of 12a-hydroxylation is the method described in U.S. Pat. 3,188,348, issued June 8, 1965, wherein is described the hydroxylation of certain metal chelates of 12a-deoxytetracyclines. The advantage of this latter process lies in the fact that the hydroxyl group is introduced cis to the hydrogen at position 4a of the tetracycline nucleus.

A variety of 4-aminotetracyclines are prepared according to the present invention by substituting various primary or secondary amines, as well as ammonia, for dimethylamine. Suitable amines include other dialkyl amines, e.g. methyl, ethyl, propyl, etc. amines; aralkyl and alkaryl amines, and N-alkyl derivatives thereof, e.g. N-methylaniline, benzylamine; heterocyclic amines, e.g. pyrrolidine, morpholine, aminopyridines and N-alkyl derivatives thereof. Further, hydroxyalkyl substituents on the nitrogen, where protected for some of the reaction steps by ether formation or acetylation, as discussed below, may subsequently be regenerated by HBr cleavage or hydrolysis.

When the substituents of the present compounds are hydroxy or amino, the use of a blocking group is sometimes advantageous in obtaining high yields during their preparation. Especially useful blocking groups are acyl, benzyl, tetrahydropyranyl, methoxymethyl, methyl and ethyl radicals. Benzyl ethers are particularly easily reduced to hydroxyl groups. Hydroxyl groups are conveniently protected during basic reaction steps by prior conversion to the tetrahydropyranyl ether, which is easily re-hydrolyzed under mildly acidic conditions. Acyl groups which may be used include the acetyl, propionyl, butyryl, benzoyl and the like. The lower alkyl blocking groups are preferred because of the ease with which these compounds are prepared.

When desired, the above mentioned blocking groups, i.e. enol ether radicals, may be removed. The enol radicals are hydrolyzed by treatment with aqueous acid as is well known by those skilled in the art. When the ether radical is benzyl, hydrogenolysis over noble metal catalyst may also be used.

The new compounds described herein are useful as chelating, complexing, or sequestering agents. The complexes formed with polyvalent metal ions are particularly stable and usually quite soluble in various organic solvents. These properties, of course, render them useful for a variety of purposes wherein metal ion contamination presents a problem, e.g. in metal extraction and biological experimentation, as well as in various organic systems such as saturated and unsaturated lubricating oils, hydrocarbons, fatty acids and waxes, wherein metal ion contamination accelerates oxidative deterioration and color formation. They are also useful as metal carriers and in analysis of polyvalent metal ions which may be complexed and extracted by means of these reagents. Other uses common to sequestering agents will also be apparent.

In addition, the compounds of Flow Sheet I are especially valuable as intermediates in chemical synthesis. They are particularly useful in synthesizing 6-deoxytetracycline, 6-deoxy-6-demethyltetracycline and various novel tetracyclines. Many of the herein described compounds, especially those containing one or more hydroxyl groups in the benzeneoid moiety, are useful as antibacterial agents in their own right.

In order to synthesize biologically active tetracyclines, it is necessary to employ intermediates in which the hydrogen atoms at the 9a and 2-positions of the anthracene ring (corresponding to the 4a and 5a-positions of the tetracycline nucleus) are in the cis arrangement. For example, preferred compounds are depicted by the following formula (syn. compounds)

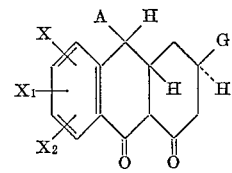

in which G is a substituent other than hydrogen, as contrasted with anti compounds of the formula:

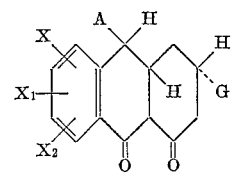

In general, syn and anti compounds are separable by virtue of differences in physical properties, e.g. differences in solubility in various solvents. Usually, fractional crystallization permits ready separation. The syn and anti compounds are diastereoisomers.

It is a particular advantage of the novel diketo tricyclic octahydroanthraldehydes of the present invention that, by virtue of the activating influence of the aldehyde oxygen, they equilibrate to the predominately cis configuration in the course of preparation. This enables the synthesis to proceed in stereospecific fashion without the loss of material that would otherwise be entailed in the separation of syn and anti compounds.

It is recognized by those in the art that, when such compounds have an asymmetric center in the substituent G, they exist as two diastereoisomers which, as previously mentioned, may be separated by fractional crystallization for each of the syn and anti compounds. Of course, as is known, diastereoisomers are racemic modifications consisting of two structures which are mirror images (optical antipodes). The racemic modifications may be resolved according to standard procedures. In the present process it is preferred, however, to utilize the diastereoisomers of the syn compounds since changes in configuration may occur during the various procedural steps of the total synthesis to tetracycline compounds, thus necessitating costly and time-consuming resolution procedures. The syn diastereoisomers are converted to tetracycline products which consist of the normal tetracyclines and their 4-epimers which are separable by known procedures. Of course, the 4-epitetracyclines are useful in that they are converted to normal tetracyclines by known procedures.

The diketo tricyclic aldehydes of structure I may be prepared by several useful procedures. They may, for example, be synthesized from the triketo tricyclic esters of Structure IV (the synthesis of which is described hereinafter) by the reaction sequences illustrated in accompanying Flow Sheet 3. In this sequence, X, $X_1$, $X_2$, A, $B_2$ and $R_2$ are as previously defined; and $R_1$ is lower alkyl or benzyl. The reactions shown are as follows:

IV→XV: is reduction of the 3-keto group by standard procedures. This may be effected in stepwise fashion: the 3-keto group being first reduced to hydroxyl under mild conditions, e.g. with zinc dust and glacial acetic acid or with sodium borohydride; the resulting alcohol then being converted to the formate by treatment with acetoformic anhydride; and the formate in turn being reduced to tricyclic diketo ester XV with zinc dust and formic acid or by hydrogenation with palladium. Alternatively, the reduction IV→XV may be effected in one step with zinc and acetic acid under more vigorous conditions.

IV→XX: is a conversion of the 3-keto group to the ethylene dithioketal by treatment with ethanedithiol under esterifying conditions, i.e. by reflux in an azeotroping solvent such as toluene in the presence of a catalytic amount of acid catalyst.

XX→XV: is a reduction of the dithioketal by treatment with Raney nickel according to standard procedures. This process also leaves the 2-carbalkoxy group intact. The product may be converted to the corresponding acid ($R_2$=OH)

by standard acid hydrolysis, and the acid in turn converted to the acid chloride ($R_2$=halo) by standard reactions such as treatment with phosphorus pentachloride.

XV→I: represents preparation of the diketo tricyclic aldehyde by reduction of XV in which $R_2$ is halo. The Rosenmund reduction, i.e. hydrogenation with a poisoned palladium catalyst, is appropriate for this step. Alternatively, the reduction may be conducted with lithium-tri-t-butoxyaluminohydride (as described in the Journal of the American Chemical Society, vol. 78, p. 252, 1956).

XV→XXI: is a transesterification of the diketo tricyclic ester ($R_2$=lower alkoxy or benzyloxy) with mercaptan $HSB_2$ to form the 2-carbothiolic ester.

XXI→I: is the reduction of the carbothiolic ester group to the aldehyde by treatment with Raney nickel under standard conditions.

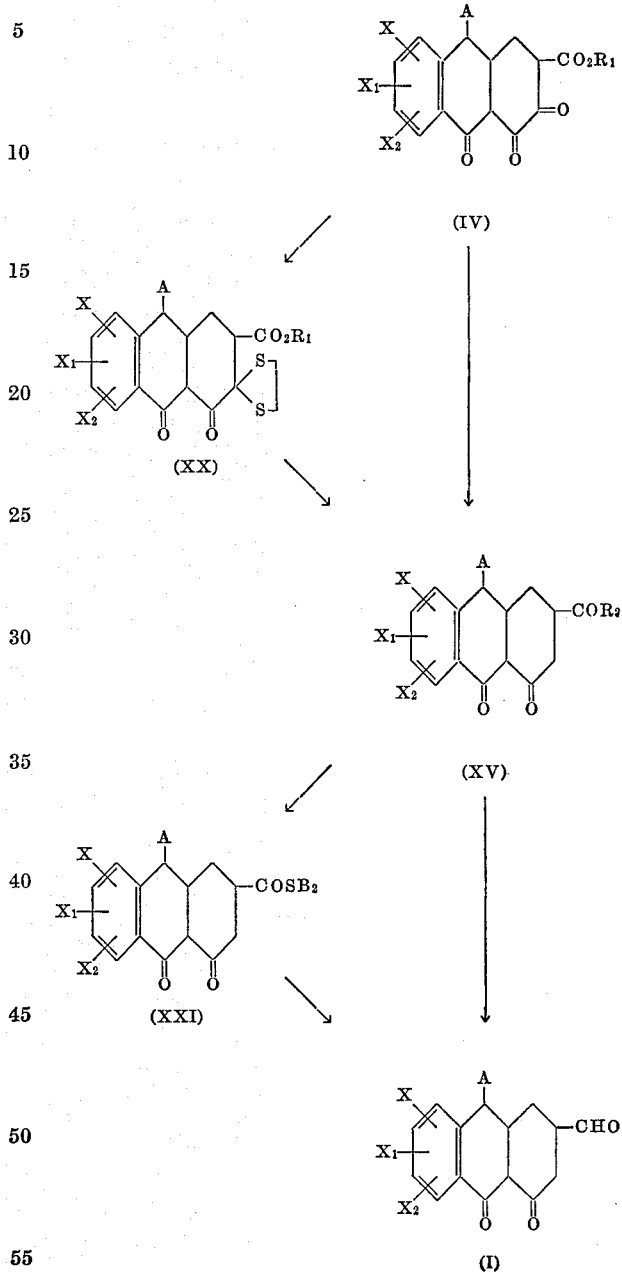

FLOW SHEET 3

The diketo tricyclic aldehydes of structure I may also be prepared by the synthetic sequences indicated in attached Flow Sheet 4 in which X, $X_1$, $X_2$, A, and $R_4$ are as previously defined and $D_3$ is $COR_2$ or cyano. The preparation of starting compounds of structures III and XII will be described hereinafter.

III→XXII: is an alternative route to the dicarboxy propyl α-tetralone via the base-catalyzed alkylation of a 2-(β-carboalkoxyethyl)-4-tetralone ($D_3$=lower carboalkoxy) or a 2-(β-cyanoethyl) tetralone ($D_3$=CN) with an alkyl haloacetate. For this reaction it is advisable to first convert the tetralone to a ketal, e.g. by treatment with ethylene glycol, β-mercaptoethanol or ethanedithiol under standard conditions. Diester product XXII may be converted to the corresponding dibasic acid where required, by standard hydrolysis procedures.

XXII→XV: represents ring-closure of α-tetralone XXII, as a diester ($D_3$=lower carbalkoxy, $R_4$=lower alkyl) or an ester-nitrile ($D_3$=CN, $R_4$=lower alkyl) by a base-catalyzed acylation reaction, to form the diketo tricyclic ester or nitrile XV.

III→IV: represents condensation with oxalic ester in the presence of strong base, as further discussed hereinafter in conjunction with the synthesis of compounds III and IV.

IV→XV: represents reduction of the 3-keto group by the procedures described in conjunction with Flow Sheet 3.

XV→I: may be effected, where $D_3$=lower carbalkoxy, by the procedures described in conjunction with Flow Sheet 3. Alternatively, where $D_3$=CN, direct reduction to the aldehyde may be effected, e.g. with lithium triethoxyaluminohydride, or with disobutyl aluminum hydride as described in Proc. Acad. Sci. USSR, Chemistry Section, pp. 879–81 (1957). In addition, ester XV ($D_3$=lower carbalkoxy) is readily converted to the corresponding amide, the latter dehydrated to nitrile XV ($D_3$=CN), and the nitrile in turn reduced to aldehyde I, by standard procedures.

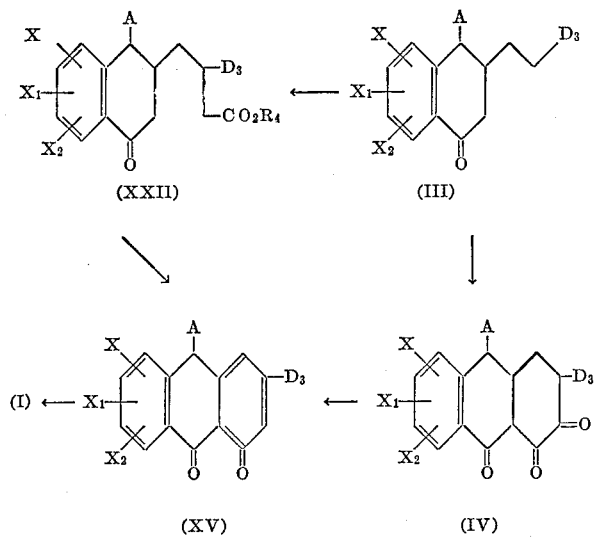

FLOW SHEET 4

In the foregoing reaction sequence it is often most convenient to introduce the X, $X_1$ and $X_2$ groups by employing the appropriately substituted benzoyl succinate XII as starting material. Syntheses for a variety of these succinates are described hereinafter, and others may be readily devised by those skilled in the art.

In commencing the sequence with a substituted benzoyl succinate or benzyladipate it is essential that an ortho ring position be unsubstituted, since cyclization to form the center ring of the hydroanthraldehyde occurs at this position. For the preparation of the preferred aldehydes of structure 1A, which bear an OR substituent in the 5-position, the position of the benzene ring between the OR group and the keto group in the starting benzoyl succinate should be unsubstituted, to provide for the subsequent ring closure. On the other hand, it is preferred to have a substituent in what corresponds to the 8-position of aldehyde I, since this precludes cyclization to that position in competition with the desired cyclization. A $CF_3$, lower alkyl, or acylamino group can be conveniently carried in this position from the outset. Alternatively, an 8-substituent may be introduced during the reaction sequence, prior to the cyclization.

The discussion which follows describes the synthesis of starting compounds III, IV and XII for Flow Sheets 3 and 4.

The starting compounds of structure III and IV are prepared according to the following procedure:

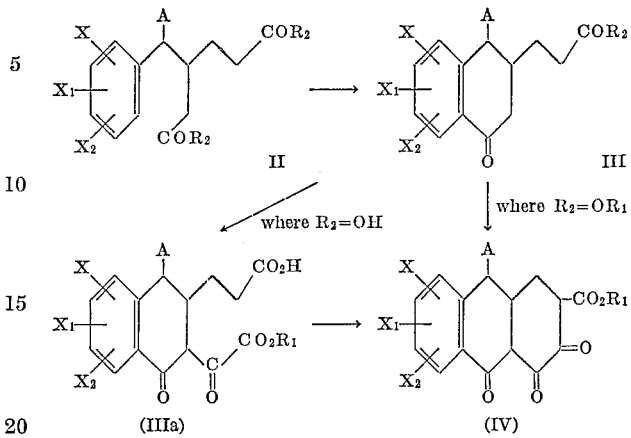

In the above formulae, X, $X_1$, $X_2$, A, $R_1$ and $R_2$ are as previously described with the exception that substituent X is preferably not a nitro group since this group deactivates the ring of compounds of structure II in the ring closure reaction to those of structure III. Alternatively, the corresponding nitriles (e.g. where $COR_2$ is replaced by CN may be used in the case of m-hydroxy- or alkoxy-benzyl compounds of structure II. Further, at least one of the two positions of the benzenoid ring ortho to the diester side chain should be available for the ring closure of compounds of structure II to the structure III compounds. If desired, halogen (Cl or Br) may be introduced into compounds of structure II and structure III in which at least one of the benzenoid substituents is hydrogen by direct halogenation with a chlorinating or brominating agent or by other methods generally employed for halogenation of an aromatic ring. A variety of such agents are known to those in the art and include phosphorus pentachloride and pentabromide, sulfuryl chloride, N-chloro or bromoalkanoamides, e.g. N-chlor- and N-bromacetamide; N-chloro (or bromo) alkanedioic acid imides, e.g. N-halosuccinimide; N-halophthalimide; chlorine; bromine; N-haloacylanilides, e.g. N-bromoacetanilide, propionanilide and the like; 3-chloro-, 3-bromo, 3,5-dichloro and 3,5-dibromo-5,5-dimethylhydantoin; pyridinium perbromide and perchloride hydrohalides, e.g. pyridinium perbromide hydrobromide; and lower alkyl hypochlorites, e.g. t-butylhypochlorite.

Alternatively, compounds of structure IV may be prepared by the following sequences:

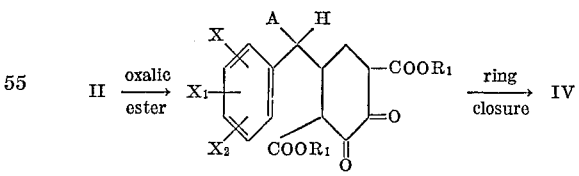

The ring closure of compounds II to III or VI to IV is accomplished by any of the commonly employed methods for such reactions which generally involve the use of a dehydrating or dehydrohalogenating cyclization agent. With compounds of structure II, a preferred method when $R_2$ is OH or alkoxy involves treatment of the starting compound with such ring closure agents as hydrogen fluoride or polyphosphoric acid. When $R_2$ is halogen, a Friedel-Craft's catalyst, of course, should be employed, e.g. aluminum chloride. m-Hydroxy- or alkoxy-benzyl compounds of structure II having CN in place of $COR_2$ lend themselves to the Hoesch synthesis (Berichte, 48, 1122 and 50, 462) wherein treatment with dry hydrogen chloride in the presence of zinc chloride leads to imine formation, and hydrolysis of the latter provides the tetralone keto group.

The condensation of compounds II or III in which $R_2$ is $OR_1$ with oxalic ester are effected by the general methods for ester condensation reactions of this type. Usually the reaction is carried out in the presence of a strong base such as alkali metal, alkali metal alkoxides and hydrides, sodamide and the like. If the starting compound in the oxalate condensation contains free hydroxy or amino it is preferred to block such groups by alkylation or acylation by known procedures. After the reaction is completed, the blocking groups may be removed, if desired. Cleavage of the ether linkage or other blocking groups by any of the general methods, e.g. treatment with mineral acid such as concentrated hydrobromic or hydriodic acid, or, when R is benzyl, hydrogenolysis, gives a free hydroxy group in the benzenoid portion.

The starting compounds of the above described processes, i.e. compounds of structure II are prepared by the following sequence of reactions:

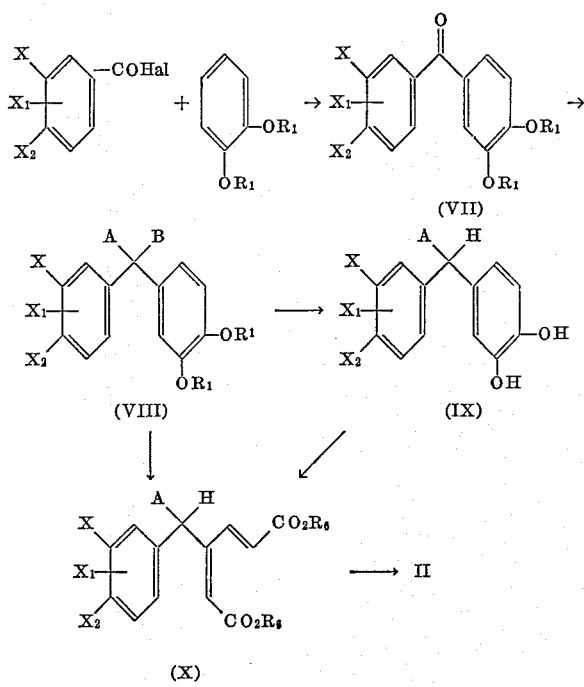

(VII)

(VIII)

(IX)

(X)

FLOW SHEET 5

In the above sequence, $R_1$ is lower alkyl or benzyl; $R_6$ is hydrogen, lower alkyl or benzyl; and B is hydrogen and hydroxyl. Further, in this sequence a lower alkyl group can be present in the starting diether at the 4-position of the aromatic ring if desired to produce 3-benzyl-4-(lower alkyl)substituted adipic acid derivatives (II).

The first of these reactions for the preparation of compounds of structure VII is by means of Friedel-Craft's reaction, e.g. $AlCl_3$ in carbon disulfide. The conversion of compounds of structure VII to those of VIII in which A and B are hydrogen is by catalytic reduction, e.g. over copper chromium oxide or noble metal, e.g. palladium catalyst at from atmospheric to superatmospheric pressures of hydrogen gas; where A is alkyl and B hydroxyl, by reaction with a suitable Grignard reagent, e.g. AMg Halogen; where A is alkyl or hydrogen and B is hydrogen, by reduction, i.e. hydrogenolysis, of corresponding compounds in which B is hydroxyl. From VIII to IX is a standard ether hydrolysis, e.g. concentrated hydrobromic acid. From IX to X is an ozonolysis reaction giving rise to the dienedioic acid ($R_6=H$) which on hydrogenation over a noble metal catalyst, e.g. palladium, palladium on carbon, platinum, platinum oxide, etc., gives compounds of structure II. From VIII to X represents the ozonolysis reaction as applied to the diether to produce X in the form of a diester. In the hydrogenation reaction, compounds of structure X may be used as the free acids or corresponding benzyl or lower alkyl esters to provide corresponding products of structure II. Of course, benzyl esters may undergo concurrent hydrogenolysis to the free acids.

In the described reaction sequences, where aromatic halo substituents are present, care should be taken to avoid prolonged hydrogenations which may result in the removal of the halogen atom. The possibility of halogen removal may be minimized by the use of a lower alkanoic acid, e.g. acetic or propionic, as solvent for the reaction. Of course, if removed, halogen may be reintroduced, if desired, by the methods hereinbefore described. Free amino groups are protected by acylation. In the ozonolysis reaction to form compounds of structure X it is possible to employ as starting compounds those of structure IX in which there are adjacent hydroxyl groups in the benzene ring containing X, $X_1$ and $X_2$ as substituents, since such structures are susceptible to the oxidation reaction. Similarly, care must be taken to protect adjacent hydroxyl and amino groups as by alkylation or acylation in order to avoid formation of quinone and imine type products. Where X, $X_1$ or $X_2$ are alkyl ether groups and $R_1$=benzyl, step VIII→IX may be accomplished selectively by hydrogenolysis of the benzyl ether groups.

The benzyl keto group of compounds VII may be subjected to the well known Wittig reaction to introduce an alkylidene, aldehyde, alkoxyalkyl or hydroxyalkyl group in the tetracycline 6-position, as discussed in conjunction with compounds IIa.

Compounds of structure II are also prepared by the following sequences of reactions:

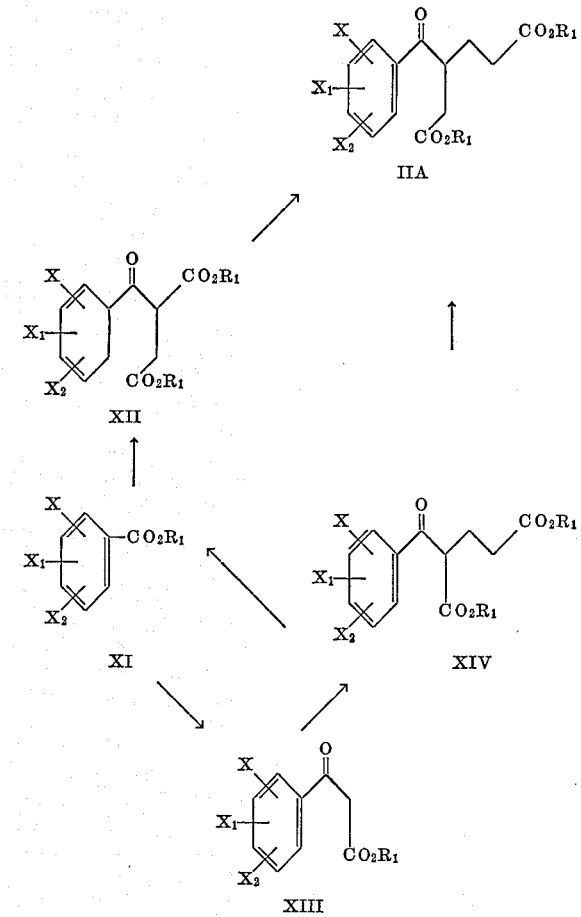

FLOW SHEET 6

The conversion of compounds of Formula XI to those of XII is a Claisen-type condensation of the lower alkyl ester of XI with succinic acid diesters to provide Formula XII compounds. The conversion of compounds of Formula XI to XIII is similarly a Claisen condensation using acetic acid esters. The conversion of compounds of Formula XIII to XII is by alkylation reaction with a monohaloacetic acid ester, and the conversion of XIV to IIa is such an alkylation followed by hydrolysis and decarboxylation. The preparation of compounds of Formula XIV from those of Formula XIII is by standard alkylation procedures, preferably using an acrylic acid ester of the formula $H_2C=CHCO_2R_1$ or the corresponding nitrile. This conversion may also be effected by alkylation with a β-haloacid derivative of the formula Halogen-$CH_2CH_2CO_2R_1$ or the corresponding nitrile. Each of these reactions are effected under standard conditions known to those skilled in the art, e.g. in a reaction-inert solvent in the presence of a base such as Triton B (benzyltrimethylammonium hydroxide), sodamide, sodium hydride and their obvious equivalents.

The conversion of compounds of Formula XII to those of IIa is by known standard reactions, e.g. by reaction of Formula XII compounds with a corresponding acrylic acid ester of the formula $H_2C=CHCO_2R_1$. It may also be effected by alkylation with a β-halo-alkanoic acid of the formula Halogen-$CH_2CH_2CO_2R_1$ or the corresponding nitrile. Hydrolysis and decarboxylation of these compounds gives structure IIa compounds. In the conversions XIV→IIa and XII→IIa omission of the hydrolysis and decarboxylation steps permits retention of the carbalkoxy group ($R_1$=lower alkyl) in the 5a position of the final tetracycline.

The conversion of structure IIa compounds to those of structure II is brought about by reactions as previously described for preparing structure VIII compounds. Thus, for example, the keto group of structure IIa compounds may be reduced to structure II (A=H), e.g. by palladium-catalyzed hydrogenolysis or by the well known Clemmensen procedures with zinc and HCl. Similarly, reaction of IIa with a Grignard reagent permits replacement of the keto oxygen with an alkyl and a hydroxyl group, providing an intermediate for further reactions, i.e. hydrogenolysis of the hydroxyl group to provide II (A=alkyl).

An amino group may also be introduced in place of the keto carbonyl oxygen of compounds of structures XIV, VII and IIa by reduction of the corresponding oxime or hydrazone or by reductive amination of the keto carbonyl group over noble metal catalysts.

A modification of the present invention provides a further means of introducing a variety of substituents in positions corresponding to the 5a, and 6-position of the tetracycline nucleus. This involves formation of the secondary alcohol corresponding to structure IIa compounds represented by the formula:

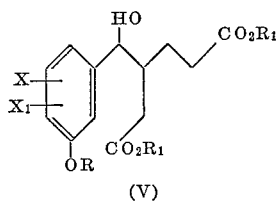

(V)

by partial reduction of the corresponding ketone with sodium borohydride or by hydrogenation over palladium catalyst until only one molar equivalent of hydrogen is taken up. Compounds of structure V may be subjected to replacement reactions. They may, for example, be converted to the corresponding tosylate which, upon treatment with ammonia or a primary or secondary amine, affords an alternative method for introducing an amino group in the 6-position of the final tetracycline. The tosylate also affords a means for introducing a cyano or

—$CH(CO_2R_8)_2$ group at the tetracycline 6-position. The secondary alcohol V may also be dehydrated to the corresponding unsaturated compound (by treatment with HF) and the unsaturated compound reduced to the corresponding benzyl derivative. Compounds of structure V are also intermediates for the preparation of 6-demethyltetracyclines.

Other modifications of the present invention provide means for introducing an alkylideno group in the 6-position of the tetracycline nucleus. The benzoyl keto group of compounds of structure IIa may be subjected to the previously discussed Wittig reaction in the same manner as Compounds VII.

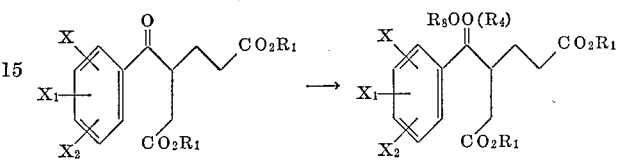

by treatment with the ylid prepared from a chloroether of the formula $R_4CHClOR_8$ (where $R_8$ is lower alkyl and $R_4$ is hydrogen or lower alkyl). The necessary chloroethers are obtained by treatment of an aldehyde acetal of the formula $R_4CH(OR_8)_2$ with an acid chloride, as described by Post (J. Org. Chem. I, p. 231, 1936).

The products of the above reaction may in turn be hydrogenated with noble metal catalysts:

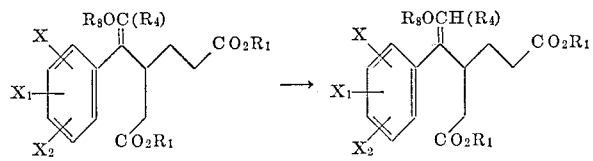

Subjecting the reduction products to the further synthetic sequences illustrated herein yields tetracyclines having a 6-$CH(R_4)OR_8$ substituent. Treatment of such tetracyclines with liquid hydrogen fluoride results in the elimination of a mole of alcohol $R_8OH$ and provides tetracyclines having a =$CH(R_4)$ group at the 6-position. The latter treatment is, for example, conveniently effected after the introduction of the 12a-hydroxy group. Alternatively, treatment of such tetracyclines having a 6-$CH(R_4)OR_8$ substituent with HBr converts this group to —$CH(R_4)OH$ with concurrent hydrolysis of any ether groups in the aromatic D-ring.

The products of the Wittig reaction may also be hydrolyzed, e.g.

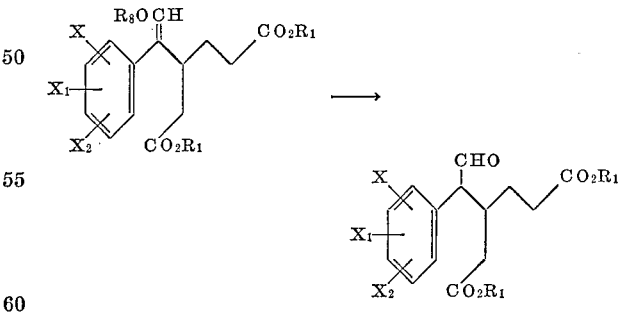

and the resulting aldehyde group in turn converted by catalytic hydrogenation to a hydroxymethyl group. The latter may be carried through the subsequent reactions of the synthetic sequence with its free hydroxyl group, or preferably, in the form of a lower alkyl ether.

The described procedures are adaptable to the preparation of a variety of tetracycline molecules, as follows:

For introduction of aromatic nitro groups, the given compound, e.g. tetralone III, is nitrated by standard procedures, such as treatment with nitric acid-acetic anhydride-acetic acid mixtures, or nitric-sulfuric acid mixtures. Those in which X is halogen, cyano, halo sulfonyl nitro or other such groups may be prepared by Sandmeyer reaction of the corresponding diazonium salt with suitable salt reagents ($Cu_2Cl_2$, $Cu_2Br_2$, KI, etc.).

The diazonium salt is obtained by diazotisation of the amino compound, which may in turn be prepared by reduction of the corresponding nitro compound by conventional means, e.g. chemical reduction with active metals (Sn) and mineral acids (HCl) or catalytic hydrogenation e.g. with nickel catalyst at superatmospheric pressure. Aromatic cyano groups may be further converted to carboxy or carbalkoxy groups where desired by standard hydrolysis and esterification.

The amino group may also be introduced into the benzenoid ring, e.g. in compounds of structure II having a phenolic hydroxyl group, by coupling with aryldiazonium salts such as benzene diazonium chloride or the diazonium salt of p-aminobenzenesulfonic acid, followed by reduction of the resulting phenylazo compound, e.g. by catalytic hydrogenolysis with noble metal catalysts.

As has been previously pointed out, normal discretion must be employed in subjecting certain of the substituted intermediates to the herein described reaction steps. In the base condensation reactions the presence of a substituent having an active hydrogen (e.g. a hydroxyl or amino group) will necessitate the use of an additional mole of the sodium hydride or other base. The presence of more than one such substituent per molecule is preferably avoided in these reactions, e.g. by the use of protective ether groups as previously described. The considerations apply to Grignard reactions and hydride reductions. Hydroxyl groups can be subsequently regenerated from their ethers by conventional hydrolytic procedures such as treatment with hydrogen bromide. Similarly, protective benzyl ether groups can subsequently be hydrogenolyzed to obtain hydroxyl groups where desired.

In the reduction of diketo tricyclic acid chloride XV to aldehyde I, the lithium-tri-t-butoxyaluminohydride procedure described may be substituted for the Rosenmund palladium reduction. Similarly, in the reduction of benzoyl adipate IIa or benzophenone VII to the corresponding benzyl derivatives II and VIII, chemical reduction with amalgamated zinc and HCl by the well known Clemmensen procedure may be employed in place of catalytic hydrogenolysis. Any ester groups which may be present in the molecule may be concurrently hydrolyzed in the Clemmensen procedure, and reesterification may therefore be necessary.

Alternative routes or procedures can be selected in place of the Clemmensen reduction. Thus, in the reduction of benzoyl adipate IIa to corresponding benzyl derivative II, the three-step procedure previously referred to is an appropriate alternative to direct reduction; i.e. (1) conversion of the keto group to hydroxyl, e.g. with sodium borohydride or by mild reduction at room temperature with palladium on carbon in alcohol or other neutral solvent; (2) conversion of the resulting alcohol to the unsaturated compound by dehydration in anhydrous hydrogen fluoride; and (3) rapid hydrogenation of the resulting double bond, e.g. with palladium at room temperature and moderate hydrogen pressure, until one mole of hydrogen has been consumed. Another alternative reduction procedure which is suitable is the Wolf-Kishner reaction (Annalen, 394, 90, 1912 and J. Russ. Phys. Chem. Soc., 43, 582, 1911) wherein the benzoyl derivative is converted to a hydrazone, and the latter is in turn reduced to the corresponding benzyl derivative by heating with a base such as sodium ethoxide.

The present invention provides a means of synthesizing tetracycline compounds including 8-substituted and other valuable new tetracyclines, not previously described, which are therapeutically useful by virtue of their antimicrobial activity.

Some of the new tetracyclines of the present invention are homologs, isomers or closely related analogs of known tetracyclines. Many of the new tetracyclines are distinguished from prior art compounds by their possession of important and desirable properties, such as extended in vitro and in vivo antibacterial spectra, activity against organisms which have inherent or acquired resistance to known antibiotics, rapid absorption, sustained blood levels, freedom from serum binding, preferential tissue distribution at various parts of the body (e.g. kidney, lung, bladder, skin, etc.) which are sites for infection, sustained stability in a variety of dosage forms, resistance to metabolic destruction, broad solubility, and freedom from objectionable acute and cumulative sideeffects. The new tetracyclines are useful in therapy, in agriculture, and in veterinary practice both therapeutically and as growth stimulants. In addition, they may be employed as disinfectants and bacteriostatic agents, in industrial fermentations to prevent contamination by sensitive organisms, and in tissue culture, e.g. for vaccine production.

The various new tetracyclines of the present invention which do not share the antibacterial activity of the known tetracyclines are valuable intermediates in the preparation of other compounds of classes known to contain biologically active members. Thus, the D-ring can be nitrated directly and the nitro derivative reduced catalytically to an aminotetracycline. Further, the tetracycline products of this invention can be halogenated by known methods at the 11a, or in the case of a 7-unsubstituted tetracycline, in the 7,11a-positions by treatment with such halogenating agents as perchloryl fluoride, N-chlorsuccinimide, N-bromsuccinimide and iodobromide.

The present invention embraces all salts, including acid-addition and metal salts, of the new antibiotics. Such salts are formed by well known procedures with both pharmaceutically acceptable and pharmaceutically unacceptable acids and metals. By "pharmaceutically acceptable" is meant those salt-forming acids and metals which do not substantially increase the toxicity of the antibiotic.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically unacceptable acid addition salts, while not useful for therapy, are valuable for isolation and purification of the new substances. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochlorides, by solution in hydrochloric acid and crystallization of the hydrochloride salt formed. The perchloric acid salts are useful for purification and crystallization of the new products.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e. magnesium and calcium, and additionally, aluminum, zinc, iron and magnanese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e. barium and strontium, which are useful for isolating and purifying the compounds.

It will be obvious that, in addition to their value in therapy, the pharmaceutically acceptable acid and metal salts are also useful in isolation and purification.

The new tricyclic intermediates of the present invention, in addition to their value in synthesis, exhibit valuable antimicrobial activity. They may be employed as bacteriostatic agents, and are further useful in separation and classification of organisms for medical and diagnostic purposes. These new intermediates, by virtue of their β-diketone structure, are also valuable chelating, complexing or sequestering agents, and form particularly stable and soluble complexes with polyvalent cations. They are therefore useful wherever removal of such polyvalent ions is desired, e.g. in biological experimentation and in analytical procedures. Of course, as is well known to those skilled in the art, such β-diketones may exist in one or more of several tautomeric forms as a result of their ability to enolize. It is fully intended that the β-diketone structures herein employed embrace such tautomers.

The starting compounds of the present invention are readily preparable by known procedures. Many of these compounds, including both benzoic acid esters and benzophenone starting compounds, have been described in the literature.

The following examples are given by way of illustration and are not to be construed as limitations of this invention, many variations of which are possible within the scope and spirit thereof.

EXAMPLE I

Monoethyl ester of 3-(3-methoxybenzyl)adipic acid

*Method A.*—Five grams of diethyl 3-(3-methoxybenzoyl)adipate and 2 g. of 5% palladium on carbon in 30 ml. of acetic acid are treated in a conventional Parr shaker at a pressure of 40 p.s.i. of hydrogen gas at 50° C. until 2 moles of hydrogen are taken up. The first mole of gas is taken up rapidly and the second more slowly over a total reaction time of up to about 30 hours. The mixture is filtered, concentrated under reduced pressure to an oil which is vacuum-distilled to obtain the product.

*Method B.*—The γ-lactone of the enol form of the monoethyl ester of the starting compound is hydrogenated over palladium on carbon by this same method to obtain this product, B.P. 190–1° C. (0.3 mm.). Elemental analysis gives the following results:

Calcd. for (percent): $C_{16}H_{22}O_5$: C, 65.29; H, 7.53. Found (percent): C, 65.25; H, 7.68.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25}$=1.4973. Elemental analysis gives the following results:

Calcd. for (percent): $C_{18}H_{26}O_5$: C, 67.06; H, 8.13. Found (percent): C, 67.02; H, 8.31.

The starting compound together with the corresponding γ-lactone are prepared by hydrolysis and decarboxylation of diethyl 3-carbo-t.butoxy-3-(3-methoxybenzoyl)adipate (Example XLIII) by refluxing in dry xylene containing p-toluenesulfonic acid. The products are separated by fractional distillation or may be used together as starting compound for this hydrogenation reaction.

EXAMPLE II 3-(3-methoxybenzyl)adipic acid

*Method A.*—Amalgamated zinc is prepared by shaking for 5 minutes a mixture of 120 g. of mossy zinc, 12 g. of mercuric chloride. 200 ml. of water and 5 ml. of concentrated HCl in a round-bottomed flask. The solution is decanted and the following reagents added: 75 ml. of water and 175 ml. of conc. HCl, 100 ml. of toluene and 52 g. of 3-(3-methoxybenzoyl)adipic acid. The reaction mixture is vigorously boiled under reflux for 24 hours. Three 50 ml. portions of concentrated HCl are added at intervals of 6 hours during reflux.

After cooling to room temperature, the layers are separated, the aqueous layer diluted with 200 ml. of water and extracted with ether. The ether extract is combined with the toluene layer, dried and concentrated under reduced pressure to obtain the product.

*Method B.*—A solution of 6254.4 grams (22.1 mole) 3-(3-methoxybenzoyl)-adipic acid in 38.5 liters of glacial acetic acid is hydrogenated in a 15 gal. stirred autoclave in the presence of 2.5 kg. 5 percent palladium-on-carbon catalyst at 1000 p.s.i.g. and 50° C. until the theoretical amount of hydrogen has been absorbed. The catalyst is filtered off and the solvent removed from the filtrate by distillation at reduced pressure. This gives 5432 grams of product in the form of an oil. It is further purified by conversion to the dimethyl ester, fractional distillation, and hydrolysis, as follows:

A solution of 5432 grams (20.4 mole) of the crude 3-(3-methoxybenzyl)adipic acid, 3410 grams (106.6 mole) methanol, 10.6 liters ethylenedichloride and 106 ml. concentrated sulfuric acid is stirred and refluxed for 15 hours. The mixture is cooled and washed with water (3×5 l.), 5 percent aqueous sodium hydroxide (1×2 l.) and again with water (3×5 l.). The ethylenedichloride solution is dried over 3 lb. anhydrous magnesium sulfate (with 2 lb. Darco G60 activated carbon). The drying agent and carbon are filtered off and the filtrate concentrated at reduced pressure to remove solvent. The residue is distilled through a 3″ x 16″ vacuum-jacketed fractionating column packed with porcelain saddles. After a forerun of 934.1 grams, the product is collected at 172.0° C./0.2 mm. to 183° C./0.35 mm. This amounts to 3076.6 g. of 95 percent pure ester.

The ester, 2943.4 grams (10.00 mole) is hydrolyzed by heating over a steam bath for 19 hours with 1 kg. (25.0 mole) sodium hydroxide in 6 liters of water. The hydrolysis mixture is acidified to pH ca. 1.0 by addition of concentrated hydrochloric acid and the product is extracted into methylene chloride (1×4 l. and 2×2 l.). The methylene chloride extract is washed with water (1×4 l.—1×8 l.), dried over magnesium sulfate, filtered and freed of solvent by distillation at reduced pressure. This gives 2506 grams of 3-(3-methoxybenzyl)adipic acid in the form of a very sticky oil.

*Method C.*—A solution of dimethyl 3-(3-methoxybenzyl)adipate (0.01 mole) in 280 ml. of 1:1 tetrahydrofuran: 1,2-dimethoxyethane at a temperature of about −10° C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes. Hydrochloric acid (3 ml. of 6 N) is then added, the mixture stirred for an additional 0.5 hour, then poured into water. The product, 3-[α - hydroxy - (3 - methoxybenzyl)]adipic acid dimethyl ester, is recovered by evaporation.

The hydroxy ester is placed in 150 ml. of anhydrous hydrogen fluoride and allowed to stand overnight. The hydrogen fluoride is then evaporated and the thus produced dimethyl 3-(3-methoxy benzylidene)adipate dissolved in dioxane (300 ml.), treated with 0.3 g. of palladium on charcoal (5%) and subjected to 50 p.s.i. at room temperature until an equimolar proportion of hydrogen is consumed. The mixture is filtered and the filtrate evaporated to dryness under reduced pressure to give the desired compound as the methyl ester. It is hydrolyzed to the acid by the procedure of Method B.

EXAMPLE III

Dimethyl 3-(2-chloro-5-methoxybenzyl)adipate

*Method A.*—A mixture of 3.2 g. of dimethyl 3-(3-methoxybenzyl)adipate and 1.4 g. of N-chlorosuccinimide in 30 ml. of trifluoroacetic acid is stirred and heated on a steam bath for 30 minutes. The reaction mixture is then poured into 5% aqueous sodium bicarbonate with stirring, and the mixture extracted with ether. The combined extracts are dried over anhydrous sodium sulfate and then concentrated under reduced pressure to an oil which is vacuum-distilled to obtain the product, B.P. 200° C. (1.1 mm. Hg).

*Method B.*—A mixture of 3.2 g. of dimethyl 3-(3-methoxybenzyl)adipate and 2.1 g. of phosphorus pentachloride in 100 ml. of dry benzene is refluxed for 30 minutes. The reaction mixture is carefully poured into ice water, the benzene layer separated, washed with water and dried. Concentration of the dried benzene solution under reduced pressure yields an oil which is vaccum-distilled to obtain the product.

Similarly, the diethyl, dibenzyl and dipropyl chloro-esters are prepared.

*Method C.*—A solution of 1688 g. of 3-(3-methoxybenzyl)adipic acid and 50 mg. of iodine in 9 liters of glacial acetic acid is stirred while a solution of 450 g. of chlorine in 8 liters of glacial acetic acid is added during about 2 hours. The mixture is kept in the dark during the procedure and the temperature maintained at 10°–15° C. The solvent is then removed by concentration under reduced pressure to give 1902 g. of a dark amber oil.

This procedure is repeated with ferric chloride in lieu of iodine with comparable results.

*Method D.*—A mixture of 30.4 g. of diethyl 3-(3-methoxybenzyl)adipate and 12.75 g. of sulfuryl chloride in 250 ml. of benzene is allowed to stand for 3 days at room temperature. At the end of this period, the reaction mixture is concentrated under reduced pressure to a gummy residue which is vaccum-distilled to obtain the product.

*Method E.*—The procedure of Method B is repeated using as starting compound the corresponding dicarboxylic acid to obtain 3 - (2 - chloro - 5-methoxybenzyl) adipic acid dichloride.

EXAMPLE IV

Diethyl 3-(2-chloro-5-ethoxybenzyl)adipate

This product is obtained by the procedure of Method A of Example III employing diethyl 3-(3-ethoxybenzyl) adipate in lieu of dimethyl 3-(3-methoxybenzyl)adipate.

EXAMPLE V 2-(2-carbethoxyethyl)-5-methoxy-8-chloro-4-tetralone

*Method A.*—A mixture of 2 g. of diethyl-3-(2-chloro-5-methoxybenzyl)adipate (Example III) and 30 g. of polyphosphoric acid is heated on a steam bath for 30 minutes and then poured into ice water. The oil then separates and is collected.

*Method B.*—A mixture of 2.0 g. of the di-acid chloride of 3-(2-chloro-5-methoxybenzyl)adipic acid in 30 ml. of carbon disulfide is cooled to 0° C. and 4 g. of aluminum chloride added portionwise to the cooled mixture. The mixture is stirred for 30 minutes and then allowed to warm to room temperature where a vigorous reaction ensures. After the vigorous reaction subsides the mixture is warmed on a steam bath, cooled, diluted with water and the carbon disulfide steam distilled. The mixture is extracted with chloroform and the product obtained by drying and concentrating the chloroform extract. The product is the free acid which, if desired, is converted to the desired lower alkyl ester by conventional methods. For example, the methyl ester is prepared as follows:

A mixture of 2002 g. (7.1 moles) of the tetralone acid, 3.1 chloroform, 682 g. (21.3 mole) methanol and 21.2 ml. conc. sulfuric acid is refluxed with stirring on a steam bath for 20 hours. The reaction mixture is then chilled and 2 l. each of chloroform and water are added. The organic phase is separated and washed successively with two×2 l. water, one×1 l. 2% aqueous sodium hydroxide and three×4 l. water to a final pH of about 7.5. After drying over anhydrous sodium sulfate and treatment with Darco KB activated carbon the solution is filtered and concentrated to a dark oil at reduced pressure. The oil is taken up in 6.1. hot ethyl acetate and 11 l. hexane added. The solution is chilled to −5° C. with stirring and 1404 g. 2 - (2 - carbomethoxyethyl) - 5 - methoxy-8-chloro-4-tetralone recovered by filtration, hexane-washing and air-drying. The product melts at 101.0–102.4° C.

EXAMPLE VI 2-(2-carboxyethyl)-5-methoxy-8-chloro-4-tetralone

A polyethylene container is charged with 1809 g. (6.03 mole) 3 - (2 - chloro - 5-methoxybenzyl)adipic acid and chilled in an ice bath while 7 kg. liquid hydrogen fluoride is introduced from an inverted, chilled tank. The mixture is swirled to make homogeneous and then left to evaporate partially overnight in a hood. Most of the hydrogen fluoride that remains is removed by placing the polyethylene container in warm water to cause rapid evaporation. The remainder is removed by quenching in about 10 l. water. The product is then extracted into chloroform, washed with water and dried over magnesium sulfate. Removal of the drying agent by filtration and the solvent by distillation gives a gum that is triturated with ether and filtered. This gives 1031 g. of crude product that is recrystallized from a mixture of 16 l. ethanol, 2 l. acetone and 1 l. ethylene dichloride, with activated carbon treatment. The first two crops amount to 863.9 grams, of white crystalline product melting at 175.0–180.5° C.

Elemental analysis gives the following results:
Calcd. for $C_{14}H_{15}O_4Cl$ (percent): C, 59.47; H, 5.35; Cl, 12.54. Found (percent): C, 59.51; H, 5.42; Cl, 12.60.

Ultraviolet absorption shows λ max at 223 mμ

($\epsilon=24,650$)

255 mμ ($\epsilon=7,900$) and 326 mμ ($\epsilon=4,510$). Infrared absorption maxima appear at 5.76 and 5.99μ.

This product is also obtained by hydrolysis of the product of Method A, Example V, by treatment with HCl in acetic acid.

The methyl ester, ethyl ester (M.P. 57–59° C.) and benzyl ester (M.P. 84–85° C.) are prepared by conventional methods.

3-(3-methoxybenzyl)adipic acid, treated with HF as described, yields 2-(2-carboxyethyl)-7-methoxy-4-tetralone, which melts at 158–9° C. after two recrystallizations from benzene-hexane and exhibits ultraviolet absorption maxima at 225 mμ ($\epsilon=13,500$) and 276 mμ ($\epsilon=16,000$) in methanolic HCl and NaOH.

*Analysis.*—Calcd. for $C_{14}H_{16}O_4$ (percent): C, 67.73; H, 6.50. Found (percent): C, 67.67; H, 6.48.

EXAMPLE VII 2-(2-carboxyethyl)-6-chloro-7-methoxy-4-tetralone

This substance is a byproduct of the cyclization of the products of Example III. It is separated from the crude 2-(2-carboxyethyl)-5-methoxy-8-chloro - 4 - tetralone of Example VI by virtue of its chloroform insolubility. 2900 g. of the crude tetralone are leached six times with 8 liters portions of hot chloroform. 170 g. of white solid remains, melting at 236–239° C. The methyl ester is prepared by the procedure of Example V, Method B.

EXAMPLE VIII 2-(2-carbomethoxyethyl)-5-benzyloxy-8-chloro-4-tetralone

2 - (2-carboxyethyl)-5-methoxy-8 - chloro-4-tetralone (25 g.), glacial acetic acid (200 ml.) and 48% hydrobromic acid (50 ml.) are heated at 90° under nitrogen for twenty-four hours. The cooled solution deposits a crystalline solid. The mixture is poured over two parts ice and the total solid crop isolated by filtration and thoroughly washed with water. The crude 2-(2-carboxyethyl)-5-hydroxy-8-chloro-4-tetralone obtained in this way is recrystallized from acetonitrile to obtain 18.8 g. melting at 164–8° C.

Elemental analysis, Calcd. for $C_{13}H_{13}ClO_4$ (percent): C, 58.11; H, 4.88; Cl, 13.20. Found (percent): C, 57.99; H, 4.87; Cl, 12.73.

14.5 g. of this product is placed in 200 ml. dry methanol and the mixture refluxed for 30 minutes as anhydrous HCl is passed through. The now clear yellow solution is allowed to stand overnight, and the methanol is then removed in vacuo. The residual gum is extracted exhaustively with hexane and the combined extracts are concentrated and cooled. 11.8 g. of the white, crystalline methyl ester separates and is filtered off and recrystallized from hexane. The ester melts at 68–69.5° C. and analyzes as follows: Calcd. for $C_{14}H_{15}ClO_4$ (percent): C, 59.45; H, 5.35; Cl, 12.6. Found (percent): C, 59.16; H, 5.38; Cl, 12.6.

5.6 g. (0.02 mole) of this substance is dissolved in 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated at reduced pressure and the residual oil chromatographed on acetone-washed and dried silicic acid in chloroform. The first effluent fraction consists of unchanged starting material. The main fraction, recognized by a negative ferric chloride test, deposits crystalline 2 - (2-carbomethoxyethyl)-5-benzyloxy-8-chloro-4-tetralone on standing.

EXAMPLE IX 2-carbomethoxy-5-methoxy-8-chloro-3,4,10-trioxo-1,2,3,4,4a,9,9a,10-octahydroanthracene 30 grams of 2-(2-carbomethoxyethyl)-5-methoxy-8-chloro-4-tetralone (0.1 mole), prepared as described in Example V, Method B, is dissolved together with 24 grams dimethyloxalate (0.2 mole) by warming with 135 ml. freshly distilled dimethyl formamide in a well dried two liter flask which has been flushed with dry nitrogen. The solution is cooled to 20° C. and to it is added all at one time 0.4 mole sodium hydride in the form of a 50% oil dispersion which has been exposed to the atmosphere for 24 hours in order to produce a deactivating coating. The reaction mixture is maintained at 20–25° C. with an ice bath. 0.1 mole dry methanol is now added, and the temperature rises spontaneously to 40–50° C. When the temperature begins to fall (about 5 minutes after addition of the methanol) the reaction vessel is removed from the ice bath and quickly placed in an oil bath at 110° C. The reaction temperature is brought with dispatch to 90° C. and maintained there for 10 minutes or until active bubbling ceases if this occurs sooner.

The flask is now immediately transferred back to the ice bath, and when the temperature reaches 15° C., 100 ml. of glacial acetic acid is added at such a rate that the temperature does not exceed 30° C. At this point, a golden yellow precipitate appears. 150 ml. methanol and 50 ml. water are added and the mixture is digested at 45° C. for 15 minutes and then stirred in an ice bath for an hour. If only a scanty crop of crystals is present at this time the mixture may be stored in the refrigerator overnight before proceeding. It is now transferred to a separatory funnel to permit separation of the oil from the sodium hydride oil dispersion. The suspension is then filtered with suction and the filter cake triturated three times with 100 ml. portions of hot hexane to extract impurities. The washed solid is next stirred with 200 ml. water, filtered, and then digested with 500 ml. refluxing methanol for 20 minutes, to effect further purification. 15–16 grams of bright yellow needles are obtained. The product melts at 200–205° C. and exhibits no carbonyl absorption below 6μ. In 0.01 N methanolic HCl it exhibits ultraviolet absorption maxima at 406 mμ ($\epsilon=14,200$) and at 275–290 mμ ($\epsilon=5,940$). In 0.01 N methanolic NaOH it exhibits maxima at 423 mμ ($\epsilon=13,950$) and at 340 mμ ($\epsilon=7,120$).

EXAMPLE X 2-carbomethoxy-6-chloro-7-methoxy-3,4,10-trioxo-1,2,3,4,4a,9,9a,10-octahydroanthracene 2 - (2-carbomethoxyethyl)-6-chloro-7-methoxy-4-tetralone, prepared in Example VII, 30 g., is dissolved in 24 g. dimethyl oxalate in 300 ml. dry distilled dimethyl formamide by warming. The solution is then cooled under nitrogen in an ice-salt bath and 19.86 g. sodium hydride (51.2% in oil) added all at once as the temperature is maintained below 20° C. The ice bath is removed and the temperature rises spontaneously to 30° C., whereupon the bath is replaced briefly to control the vigorous reaction. The reaction mixture is then heated to 70–80° C. for 5–8 minutes, cooled to below 0° C., and treated with 100 ml. acetic acid, added at such rate that the temperature does not reach 25° C. The reaction mixture is now poured into four volumes of chloroform. The chloroform solution is washed with water, then with saturated brine, and dried over anhydrous sodium sulfate. The solvent is removed in vacuo, and the residue is treated with 350 ml. methanol. After standing for several hours at room temperature the slurry is filtered to obtain 12.5 g. yellow crystalline product, melting at 228–231° C. with decomposition and gas evolution. Recrystallization from chloroform-methanol raises the melting point to 235.6–236.8° C.

*Analysis.*—Calcd. for (percent): $C_{17}H_{15}Cl_6$: C, 58.21; H, 4.31; Cl, 10.11. Found (percent): C, 58.53; H, 4.43; Cl, 10.10.

EXAMPLE XI 2-carbobenzyloxy-5-methoxy-8-chloro-3,4,10-trioxo-1,2,3,4,4a,9,9a,10-octahydroanthracene 2 - (2 - carboxyethyl)-5-methoxy-8-chloro-4-tetralone, 0.02 mole, is combined with 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated under reduced pressure to obtain the benzyl ester as residue. Purification is effected by washing of a chloroform solution with aqueous sodium bicarbonate.

This substance is dissolved together with 0.04 mole dibenzyl oxalate in 50 ml. dry, distilled dimethyl formamide. To this is added 0.08 mole sodium hydride in the form of a 50% oil dispersion, while maintaining the temperature at about 20–25° C. Benzyl alcohol, 0.02 mole, is added, and the mixture is heated to 80° C. for 5 minutes, then cooled to 20° C. and slowly acidified with glacial acetic acid. The reaction mixture is next evaporated to dryness under reduced pressure and the residue is taken up in chloroform. The chloroform solution is washed with water, then with brine, dried over sodium sulfate, treated with activated carbon and filtered. The filtrate is evaporated at reduced pressure to obtain the product as residue. It is purified by evaporation of the highly fluorescent, less polar eluate fraction from silicic acid chromatography in chloroform.

EXAMPLE XII 2-carbomethoxy-5-methoxy-8-chloro-3,4,10-trioxo-1,2,3,4,4a,9,9a,10-octahydroanthracene Clean sodium metal (3.68 g.) is dissolved in methanol (50 ml.) and the solution evaporated to a dry white solid in vacuo (this is most successfully carried out by using rotary vacuum equipment). Dimethyloxalate (9.44 g.) and benzene (100 ml.) are then added to the flask and refluxing is carried out for about 10 minutes under nitrogen (not all of the solids dissolve but the cake is broken up). The solution is cooled and dimethylformamide (50 ml.) then added followed by the dropwise addition of a solution of 2 - (2 - carboxyethyl)-5-methoxy-8-chloro-4-tetralone (Example VI) (11.3 g.) in dimethylformamide (100 ml.) during one hour at 20° under $N_2$ with stirring, and stirring at room temperature under $N_2$ is continued overnight. The solution is then poured into cold water (1 l.) and extracted twice with chloroform. The chloroform extract is discarded and the aqueous solution acidified with 10% HCl solution. The product is obtained by extraction with chloroform (3×200 ml.), backwashing once with water, drying over anhydrous $Na_2SO_4$, treatment with charcoal, filtration and evaporation of the solvent in vacuo to give a red gum (16.4 g.) with is 2-(2-carboxyethyl)-3-methyloxalyl-5-methoxy-9-chloro-4-tetralone.

U.V. absorption maxima in 0.01 N NaOH at 258 and 363 m$\mu$. maximum in 0.01 N HCl at 347 m$\mu$, minimum at 277 m$\mu$.

The gum gives a deep red color with ferric chloride in methanol and liberates $CO_2$ from a saturated $NaHCO_3$ solution.

The acid is esterified by dissolving in chloroform (1 l.), methanol (50 ml.) and conc. $H_2SO_4$ (10 ml.) and refluxing gently for 15 hours. The solution is cooled, poured into excess water and the chloroform layer separated. The aqueous layer is extracted with chloroform (250 ml.) and the combined chloroform extracts are backwashed twice with cold water. The extract is then dried over anhydrous sodium sulphate, treated with activated charcoal, filtered and evaporated to a red gum in vacuo. This gum does not liberate $CO_2$ from saturated bicarbonate solution, and gives a deep red color with ferric chloride in methanol.

The ester product, 3.825 grams, and 1.275 g. of sodium hydride (56.5% solution in oil) are dissolved in 25 ml. of dimethylformamide. An exothermic reaction sets in with the evolution of hydrogen gas. After the evolution of gas ceases the mixture is warmed at 40° C. for ½ hour where further evolution of hydrogen gas occurs and the reaction mixture darkens. The reaction mixture is finally digested on a steam bath for 10 minutes after which it is cooled and acidified with glacial acetic acid (15 ml.). The product is then obtained by dilution of the mixture with water followed by extraction with chloroform. The dried chloroform solution is concentrated under reduced pressure to obtain a gummy residue which crystallizes on trituration in methanol. The orange-yellow crystalline product, 2-carbomethoxy-5-methoxy-8-chloro-3,4,10-trioxo-1, 2,3,4,4a,9,9a,10-octahydroanthracene, (1.2 g.) melts at 196–201.5° C.

EXAMPLE XIII 2-carbomethoxy-5-hydroxy-8-chloro-3,4,10-trioxo-1,2,3, 4,4a,9,9a,10-octahydroanthracene Dimethyl oxalate, 0.84 g., and 2-(2-carbomethoxyethyl)-5-hydroxy-8-chloro-4-tetralone, 2.0 g., are added to a suspension of 0.34 g. sodium hydride in 10 ml. dimethyl formamide and the mixture is heated to 70° C. for three minutes. After cooling, the reaction mixture is treated with 10 ml. acetic acid and evaporated to dryness at reduced pressure. The residual gum is triturated with water to remove sodium acetate and chromatographed on silicic acid in chloroform. The main effluent fraction is dried on a bright yellow solid which is crystallized from chloroform-hexane to provide 380 mg. product melting at 218–219.5° C.

Elemental analysis.—Calculated for $C_{16}H_{13}O_6Cl$ (percent: C, 56.7; H, 3.9; Cl, 10.5. Found (percent): C, 56.86; H, 3.89; Cl, 10.8.

EXAMPLE XIV

Diethyl 3-($\alpha$-hydroxy-3-methoxybenzyl)adipate

This product is obtained by treating 5 g. diethyl 3-(3-methoxybenzoyl) adipate and 2 g. 5% palladium on carbon in ethanol with 40 p.s.i. hydrogen gas at room temperature until one molar equivalent of hydrogen is consumed. The reaction mixture is filtered and concentrated at reduced pressure to obtain the product.

It is further converted to diethyl 3-($\alpha$-N,N-dimethylamino-3-methoxybenzyl)adipate in the following manner:

The $\alpha$-hydroxy benzyl adipate ester, 0.01 mole in 15 ml. dimethoxyethane, is added to a stirred mixture of 1.9 g. (0.01 mole) p-toluenesulfonyl chloride and 2.5 ml. dry pyridine in an ice bath. When the reaction subsides the mixture is permitted to warm to room temperature, stirred for three hours, and poured into 50 ml. water. The pH is adjusted to 5 and the resulting tosyl ester recovered by filtration.

The tosylate (0.0025 mole) is combined with 25 ml. dimethoxyethane and added dropwise to a stirred solution of 0.015 mole dimethylamine in 50 ml. dimethoxyethane at 0° C. After addition is complete, stirring is continued for an hour at 0° and the reaction mixture is then heated at 60° for three hours under a Dry Ice condenser. The mixture is next evaporated in vacuo and the residue washed with water to remove dimethylammonium toluenesulfonate. The product is recovered by filtration from the water. Substitution of monomethylamine for dimethylamine in this procedure provides the corresponding $\alpha$-N-methylamino derivative.

EXAMPLE XV 2-(2-carbomethoxyethyl)-5-methoxy-4-tetralone

2 - (2 - carbomethoxyethyl) - 5 - methoxy - 8 - chloro-4-tetralone (1.5 g.) is combined with 5% palladium-on-charcoal (0.37 g.), triethylamine (0.5 g.) and methanol 270 ml. in a standard Parr hydrogenation bottle and subjected to 50 pounds of hydrogen pressure. The absorption of hydrogen levels off at approximately one molar equivalent. The catalyst is filtered off, the solution taken to dryness, and triethylamine hydrochloride is removed by washing with water. The residual white solids weigh 1.1 g. and melt at 63–66° C. After two recrystallizations from hexane and one from ether the product melts at 85–87°.

Analysis.—Calcd. for $C_{15}H_{18}O_4$ (percent): C, 68.68; H, 6.92. Found (percent): C, 68.59; H, 6.98.

EXAMPLE XVI 2-(2-carboxyethyl)-7-hydroxy-4-tetralone 3-(3-methoxybenzyl) adipic acid, 22.46 g., is heated at reflux with hydriodic acid (specific gravity 1.5) for 3 hours and the methyl iodide formed is separated. The solution is evaporated in vacuo and the resulting gum triturated with cold water to yield 14.7 g. of yellow crystalline product. Dried and recrystallized from aqueous acetone the product is obtained in the form of white crystals melting at 183.5–185.5° C.

Elemental analysis.—Calculated for $C_{13}H_{14}O_4$ (percent): C, 66.65; H, 6.02. Found (percent): C, 66.60; H, 6.02.

The same product is obtained by refluxing a mixture of 0.5 g. of the 3-(3-methoxybenzyl)adipic acid with 25 ml. 48% HBr for 18 hours, then pouring the reaction mixture into 3 volumes of water, and filtering the resulting 0.4 g. of crystalline precipitate.

EXAMPLE XVII 2-(2-carbomethoxyethyl)-5-methoxy-8-nitro-4-tetralone

One gram of the Example XV product is slowly added to 10 ml. of concentrated sulfuric acid containing 2 ml. of 70% nitric acid at a temperature of 0°–5° C. The solution is stirred for 15 minutes and allowed to warm to room temperature. The mixture is poured into ice-water mixture and extracted with chloroform, the chloroform layer separated, dried and concentrated to obtain the product.

EXAMPLE XVIII

2-(2-carboxyethyl-5-hydroxy-8-amino-4-tetralone

One molecular proportion of aniline is dissolved in 2 N HCl, employing about 20 ml. thereof per gram of aniline, and the solution treated with one molecular proportion of NaNO₂ at 0° to 10° C. The benzenediazonium chloride solution is then mixed with stirring at 0° to 20° C. with an aqueous solution of 2-(2-carboxyethyl)-5-hydroxy-4-tetralone sodium salt and sufficient sodium carbonate to neutralize the excess HCl in the diazotised aniline solution. The pH of the solution is in the range 8–10. Stirring is continued at 0° C. for approximately two hours after which careful neutralization of the reaction mixture yields the 8-phenylazo compound. The product is collected on a filter, washed and dried.

One part by weight of 2-(2-carboxyethyl)-5-hydroxy-8-phenylazo-4-tetralone is mixed with 20 parts by weight of methanol and ⅕ part by weight of 5% palladium-on-carbon catalyst is added to the mixture which is then hydrogenated at 30–45 p.s.i. of hydrogen gas in a conventional shaker apparatus at 30° C. until two molar equivalents of hydrogen are taken up.

After filtration, the product is recovered by high vacuum distillation of the residue obtained by removal of the solvent in vacuo. Care must be exercised to protect the amino phenol from air. It can be stabilized by acetylation, as follows:

The crude amine is placed in 20 parts water containing one molar equivalent of HCl, and 2.2 molar equivalents of acetic anhydride are added. Sufficient sodium acetate is then added to neutralize the HCl and the solution is warmed to 50° C. After 5 minutes the mixture is cooled and the crude acetate separated by filtration. The solid is then dissolved in cold 5% sodium carbonate solution and reprecipitated with 5% HCl. The 2-(2-carboxyethyl)-5-hydroxy-8-N-acetylamino-4-tetralone obtained in this manner is a preferred form of the amino compound for further reaction sequences.

EXAMPLE XIX

3-(2-amino-5-hydroxybenzyl)adipic acid

The procedure of Example XVIII is repeated using 3-(3-hydroxybenzyl)adipic acid as starting compound to obtain this product. It may be converted to the product of Example XVIII by the ring closure procedure of Example VI.

EXAMPLE XX

3-(2-chloro-5-hydroxybenzyl)adipic acid

Three parts by weight of the product of Example XIX (obtained by evaporating the methanol) is protected from air, immediately mixed with 10 parts by weight of 10% aqueous hydrochloric acid at 0° C., and diazotized by gradual addition of 20% aqueous sodium nitrile solution. Addition of sodium nitrite is continued until a positive starch iodide test on a few drops of the reaction mixture is obtained in the conventional fashion. The resulting solution is then added to 15 parts of a boiling 10% solution of cuprous chloride in aqueous hydrochloric acid. The mixture is boiled for 10 minutes and allowed to cool. The product separates from the cooled mixture and is collected in the conventional manner.

This procedure is used for the preparation of 3-(2-substituted-5-hydroxy-benzyl) adipic acid compounds such as 2-bromo (using $Cu_2Br_2$ and HBr), 2-iodo (using KI and $H_2SO_4$).

EXAMPLE XXI

3-[α-hydroxy-α-(2-chloro-5-methoxy-phenyl)ethyl] adipic acid diethyl ester

To a solution of 3-(2-chloro-5-methoxybenzoyl)adipic acid diethyl ester in dimethoxyethane is added dimethoxyethane solution containing a molar equivalent of methyl magnesium bromide. After standing for 30 minutes, the reaction mixture is acidified cautiously with ice and aqueous 6 N HCl, and extracted with methylene chloride. The extracts are combined, washed with water, dilute aqueous sodium bicarbonate and water, dried and concentrated under reduced pressure to obtain the product.

EXAMPLE XXII

3-[α-(2-chloro-5-methoxyphenyl)ethyl]adipic acid diethyl ester

The product of Example XXI, 2 g., is dissolved in 150 ml. of glacial acetic acid and hydrogenated at a pressure of 40 p.s.i. of hydrogen gas for 24 hours at room temperature in the presence of 2 g. of 5% palladium-in-carbon catalyst. The mixture is filtered and then concentrated. The product is obtained by vacuum distillation of the residue.

EXAMPLE XXIII

3,3′,4-trimethoxybenzophenone

A mixture of 40 g. of 3-methoxybenzoyl chloride, 32 g. of veratrole and 250 ml. of carbon disulfide in a 3 neck round bottom flask fitted with reflux and stirrer is cooled to 0° C. Then 40 g. of aluminum chloride is added portionwise to the cooled mixture and the mixture stirred for 45 minutes, after which it is allowed to warm to room temperature. A vigorous reaction ensues with the separation of a yellow precipitate. The mixture is carefully warmed on a steam bath and stirred for 1½ hours. Water is then added to the cooled mixture and the carbon disulfide is steam distilled off. The resultant mixture is then extracted with chloroform and the chloroform layer separated, washed with dilute hydrochloric acid, followed by dilute sodium hydroxide and then dried and concentrated under reduced pressure. The residual oil is distilled to obtain the product, B.P. 216–218° C. at 1.5 mm. mercury. A 65% yield of product is obtained. The viscosity product is stirred in absolute methanol and crystallizes, M.P. 85–86° C.

EXAMPLE XXIV

3,3′,4-trimethoxydiphenylmethane

*Method A.*—A solution of 5 g. of 3,3′,4-trimethoxybenzophenone in 200 ml. of ethanol containing 1 g. of copper chromium oxide is hydrogenated at 180° C. and 100 atmospheres of hydrogen gas for 1.5 hours. The resultant solution is filtered and concentrated under reduced pressure. The residual oil is distilled to obtain the product B.P. 192–194° C. at 2.5 mm. mercury. The product crystallizes on standing, the melting point of the crystals being 45–46° C. Elemental analysis gives the following results:

Calcd. for $C_{16}H_{18}O_3$ (percent): C, 74.39; H, 7.02. Found (percent): C, 74.50; H, 7.18.

*Method B.*—This product is also obtained by hydrogenation of the starting compound of Method A using 10% palladium on carbon in ethanol at 50° C. and 40 p.s.i. of hydrogen gas. The hydrogenation procedure is also carried out at room temperature, although the uptake of hydrogen is considerably slower than at 50° C. The product is obtained by filtration and concentration of the hydrogenation mixture.

EXAMPLE XXV

3,3′,4-trihydroxydiphenylmethane

Two grams of 3,3′,4-trimethoxydiphenylmethane are dissolved in 10 ml. of acetic acid and 10 ml. of 48% hydrobromic acid and the mixture refluxed for 5 hours. The reaction mixture is concentrated under reduced pressure to obtain a residual gum which is vacuum-distilled (B.P. 230° C. at 0.5 mm. of mercury). The distillate, a colorless gum, crystallizes. A 62% yield of product is obtained, M.P. 103.5–104° C.

EXAMPLE XXVI

3-(3-hydroxybenzyl)-hexa-α-2,4-di-enedioic acid

A mixture of 3.5 g. of 3,3′,4-trihydroxydiphenylmethane in 50 ml. of acetone and 50 ml. of 10% aqueous sodium hydroxide is cooled to 0° C. Thirty ml. of 35% aqueous hydrogen peroxide solution is then added dropwise, the mixture turning pale pink after 5 to 10 minutes. An exothermic reaction occurs with considerable boiling and foaming. The mixture is allowed to stand for 1 hour and is then extracted with ethyl acetate, the extract being discarded. The aqueous solution is then acidified and extracted with ethyl acetate. Concentration of the ethanol acetate extract after drying gives the product as a gummy residue.

EXAMPLE XXVII

3-(3-hydroxybenzyl)adipic acid

The product of the preceding example (105 mg.) is dissolved in 13 ml. of ethanol containing 1 drop of concentrated hydrochloric acid and hydrogenated over platinum oxide at 1 atmosphere of hydrogen gas at room temperature. The hydrogen uptake is exactly 2 molecular equivalents. Filtration and concentration of reaction mixture gives the product.

EXAMPLE XXVIII

3-(3-methoxybenzyl)adipic acid dimethyl ester

The acid product of the preceding example is dissolved in aqueous sodium hydroxide (4 molar equivalents) and agitated with 3 molar equivalents of dimethyl sulfate at 40° C. for 6 hours. The resultant solution is then diluted with water and extracted with chloroform. The chloroform layer is separated, dried and concentrated under reduced pressure to yield an oil, B.P. 205 to 210° C. at 0.2 mm. mercury. This product is also obtained by treatment of the starting compound with diazomethane in diethyl ether.

In a similar manner the corresponding ethyl and propyl esters are prepared.

EXAMPLE XXIX

3-(3-methoxybenzyl)hexa-2,4-dienedioic acid

Five grams of 3,3′4-trimethoxydiphenylmethane are dissolved in 50 ml. of acetic acid containing about 10 drops of water and ozonized air containing about 40% $O_3$ is then passed into the mixture for 1.5 hours (total of about 6 moles of ozone). The resultant yellow solution is poured into 1 liter of water and extracted with chloroform. The chloroform layer is separated, washed with aqueous sodium bicarbonate solution and concentrated under reduced pressure. The residue is dissolved in ethanol containing 2 g. of KOH and the mixture allowed to stand at room temperature for 2 days after which it is diluted with water and extracted with chloroform. After separation of the chloroform layer the aqueous alkaline solution is acidified with dilute hydrochloric acid and extracted with chloroform. Concentration of the chloroform extract gives the acid product.

The methyl, ethyl and propyl diesters of this acid are prepared by refluxing the acid for 3 days in ethylene dichloride containing the appropriate alcohol and sulfuric acid.

EXAMPLE XXX

3-(3-methoxybenzyl)adipic acid dimethyl ester

The ester of the preceding example is hydrogenated in ethanol over 10% palladium on carbon at 1 atmosphere of hydrogen gas at room temperature. The theoretical uptake of hydrogen gas (2 molar equivalents) is very rapid. The product is obtained by filtration and concentration of the hydrogenation mixture.

In similar fashion the corresponding free acid is obtained by hydrogenation of the free acid of the preceding example.

EXAMPLE XXXI

The following monoester compounds are prepared by reduction of corresponding benzoyl diesters according to the methods of Example I. The free adipic acid derivatives are prepared by the methods of Example II from the corresponding benzoyl adipic acids. The products are subsequently converted to the corresponding diesters by conventional procedures, e.g., Example II, Method B.

3-benzyladipic acid monoethyl ester
3-(2-ethyl-5-hydroxybenzyl)adipic acid monoethyl ester
3-(2-chloro-5-methoxybenzyl)adipic acid monomethyl ester
3-(2-dimethylamino-5-methoxybenzyl)adipic acid monomethyl ester
3-(2-amino-5-methoxybenzyl)adipic acid
3-(2-acetamido-5-methoxybenzyl)adipic acid
3-(3-hydroxy-benzyl)adipic acid monoethyl ester
3-(3-methyl-5-hydroxybenzyl)adipic acid monoethyl ester
3-(2,3-dimethyl-5-hydroxybenzyl)adipic acid monoethyl ester
3-(2-methyl-5-hydroxybenzyl)adipic acid monoethyl ester
3-(3-dimethylamino-5-hydroxybenzyl)adipic acid monoethyl ester
3-(2,3-dimethylbenzyl)adipic acid monoethyl ester
3-(3,5-dimethoxybenzyl)adipic acid monoethyl ester
3-(3-hydroxybenzyl)adipic acid monoethyl ester
3-(3-isopropyl-5-hydroxybenzyl)adipic acid monoethyl ester
3-(2,3-diethyl-5-hydroxybenzyl)adipic acid monoethyl ester
3-(5-benzyloxybenzyl)adipic acid monoethyl ester
3-(2-chloro-5-benzyloxybenzyl)adipic acid monoethyl ester
3-(3-propionyloxybenzyl)adipic acid monoethyl ester
3-(3-acetyloxybenzyl)adipic acid monoethyl ester
3-(2-amino-5-benzyloxybenzyl)adipic acid monobenzyl ester
3-(2-propyl-5-propoxybenzyl)adipic acid monomethyl ester
3-(2-methoxy-3,5-ditrifluoromethylbenzyl)adipic acid monomethyl ester
3-(2-trifluoromethyl-3,5-dibutoxybenzyl)adipic acid monoethyl ester
3-(2-trifluoromethyl-3-ethylamino-5-methoxybenzyl)adipic acid monoethyl ester
3-(3-butyrylamidobenzyl)adipic acid monoethyl ester
3-(2-trifluoromethyl-5-hydroxybenzyl)adipic acid monobenzyl ester
3-(2-chloro-5-hydroxybenzyl)adipic acid monobenzyl ester
3-(2-chloro-3-methyl-5-hydroxybenzyl)adipic acid monoethyl ester
3-(2-chloro-3-isopropyl-5-hydroxybenzyl)adipic acid monoethyl ester
3-(2-chloro-3-amino-5-methoxybenzyl)adipic acid monoethyl ester
3-(2-chloro-3-methyl-5-methoxybenzyl)adipic acid monobenzyl ester
3-(2-chloro-3-ethyl-5-methoxybenzyl)adipic acid monobenzyl ester
3-(2-chloro-3-dimethylamino-5-hydroxybenzyl)adipic acid
3-(3,5-dimethoxybenzyl)adipic acid monoethyl ester
3-(2-methylamino-5-propoxybenzyl)adipic acid monoethyl ester
3-(2-methyl-5-hydroxybenzyl)adipic acid
3-(2-amino-5-benzyloxybenzyl)adipic acid monomethyl ester
3-(3-acetamido-5-hydroxybenzyl)adipic acid monoethyl ester
3-(2-chloro-3,5-dihydroxybenzyl)adipic acid monoethyl ester
3-(3-trifluoromethyl-5-hydroxybenzyl)adipic acid monoethyl ester
3-(3-hydroxybenzyl)adipic acid monoethyl ester.

The corresponding diesters are prepared by esterification of these compounds with the selected alcohol by the usual method.

Those compounds having a benzyloxy substituent are reduced by the procedures of Methods A or C of Example II. Of course, the procedure of Example II, Method A, results in hydrolysis of the ester groups and necessitates re-esterification.

EXAMPLE XXXII

Alpha-hydroxybenzyladipic acid compounds corresponding to the products of Example XXXI are prepared by hydrogenation of corresponding benzoyladipic acid compounds according to the method of Example XIV.

The α-hydroxybenzyl adipate diesters are further converted to the corresponding α-dimethylamino and α-monomethylamino derivatives via the tosylates by the procedure described in Example XIV. For this procedure hydroxy substituents other than the α-hydroxy group are avoided by employing the corresponding methyl ethers; likewise, amino substituents are employed in acetylated form.

The α-amino benzyl adipates obtained in this manner are further converted to the corresponding 1-amino-4-tetralones of structure III by the procedure of Example VI.

EXAMPLE XXXIII

The procedure of Example XXI is repeated to produce the following compounds from corresponding benzoyladipic acid compounds using lower alkylmagnesium halides.

diethyl 3-(α-hydroxy-α-phenethyl)adipate
diethyl 3-[α-hydroxy-o-(2-ethyl-5-hydroxyphenyl)ethyl]adipate
dimethyl 3-[α-hydroxy-α-(2-dimethylamino-5-methoxyphenyl)ethyl]adipate
dimethyl 3-[α-hydroxy-α-(2-amino-5-methoxyphenyl)ethyl]adipate
dimethyl 3-[α-hydroxy-α-(2-acetamido-5-methoxyphenyl)ethyl]adipate
diethyl 3-[α-hydroxy-α-(3-hydroxyphenyl)ethyl]adipate
diethyl 3-[α-hydroxy-α-(2-chloro-5-methoxyphenyl)ethyl]adipate
diethyl 3-[]α-hydroxy-α-(3-methyl-5-hydroxyphenyl)ethyl]adipate
diethyl 3-[α-hydroxy-α-(3,5-dimethoxyphenyl)ethyl]adipate
diethyl 3-[α-hydroxy-α-(3-methoxyphenyl)propyl]adipate
diethyl 3-[α-hydroxy-α-(2-chloro-5-methoxyphenyl)propyl]adipate
diethyl 3-[α-hydroxy-α-(2-chloro-5-methoxyphenyl)butyl]adipate
diethyl 3-[α-hydroxy-α-(3-methoxyphenyl)ethyl]adipate.

In the case of the precursors to the compounds listed above which possess an active hydrogen, 2.5 moles of Grignard reagent are employed.

The compounds containing an amino-substituent are isolated from the reaction mixture by the substitution of saturated aqueous ammonium chloride for 6 N HCl.

EXAMPLE XXXIV

The α-hydroxy group of Example XXXIII compounds is hydrogenolyzed according to the method of Example XXII to afford the following compounds:

diethyl 3-(α-phenethyl)adipate
diethyl 3-[α-(2-ethyl-5-hydroxyphenyl)ethyl]adipate
dimethyl 3-[α-(2-chloro-5-methoxyphenyl)ethyl]adipate
dimethyl 3-[α-(2-dimethylamino-5-methoxyphenyl)ethyl]adipate
dimethyl 3-[α-(2-amino-5-methoxyphenyl)ethyl]adipate
dimethyl 3-[α-(2-acetamido-5-methoxyphenyl)propyl]adipate
diethyl 3-[α-(3-hydroxyphenyl)ethyl]adipate
diethyl 3-[α-(3-methyl-5-hydroxyphenyl)ethyl]adipate
diethyl 3-[α-(3,5-dimethoxyphenyl)ethyl]adipate
diethyl 3-[α-(3-methoxyphenyl)propyl]adipate
diethyl 3-[α-(2-chloro-5-methoxyphenyl)propyl]adipate
diethyl 3-[α-(2-chloro-5-methoxyphenyl)butyl]adipate
diethyl 3-[α-(3-methoxyphenyl)ethyl]adipate.

EXAMPLE XXXV

The following compounds are prepared according to the methods of Example VI by ring closure of corresponding compounds.

2-(2-carbethoxyethyl)-4-tetralone
2-(2-cyanoethyl)-5-methoxy-8-ethyl-4-tetralone
2-(2-carboxyethyl)-5-methoxy-8-dimethylamino-4-tetralone
2(2-carbobenzyloxyethyl)-5-methoxy-8-amino-4-tetralone
2-(2-carbopropoxyethyl)-5-methoxy-8-acetamido-4-tetralone
2-(2-carbobenzyloxyethyl)-5-hydroxy-8-chloro-4-tetralone
2-(2-carbethoxyethyl)-5-hydroxy-7-methyl-8-chloro-4-tetralone
2-(2-carboxyethyl)-5-hydroxy-7-isopropyl-8-chloro-4-tetralone
2-(2-carboxyethyl)-5-hydroxy-7,8-diethyl-4-tetralone
2-(2-carbethoxyethyl)-5-propoxy-8-methylamino-4-tetralone
2-(2-carbobenzyloxyethyl)-5-benzyloxy-8-chloro-4-tetralone
2-(2-carboxypropyl)-5-hydroxy-8-chloro-4-tetralone
2-(2-carboxybutyl)-5-hydroxy-8-chloro-4-tetralone
2-(2-carbobenzyloxyethyl)-5-methoxy-7-amino-8-chloro-4-tetralone
2-(2-carbobenzyloxyethyl)-5-methoxy-7-ethyl-8-chloro-4-tetralone
2-(2-carbobenzyloxyethyl)-5-methoxy-7-methyl-8-chloro-4-tetralone
2-(2-carboxyethyl)-5-hydroxy-7-dimethylamino-8-chloro-4-tetralone
2-(2-carboxyethyl)-7,8-dimethyl-4-tetralone
2-(2-carboxyethyl)-5-hydroxy-8-chloro-4-tetralone
1-methyl-2-(2-carboxyethyl)-5-methoxy-8-chloro-4-tetralone
1-ethyl-2-(2-carboxyethyl)-5-methoxy-8-chloro-4-tetralone
1-propyl-2-(2-carboxyethyl)-5-methoxy-8-chloro-4-tetralone
1-methyl-2-(2-carboxypropyl)-5-methoxy-8-chloro-4-tetralone
2-(2-carboxyethyl)-5-hydroxy-8-methyl-4-tetralone
2-(2-carboxyethyl)-5-hydroxy-7,8-dimethyl-4-tetralone
1-propyl-2-(2-carboxyethyl)-5-hydroxy-8-chloro-4-tetralone
2-(2-cyanoethyl)-5-methoxy-8-methyl-4-tetralone
2-(2-carboxyethyl)-5-methoxy-7-methyl-8-chloro-4-tetralone
2-(2-carbethoxyethyl)-5,7-dimethoxy-4-tetralone
2-(2-carbobenzyloxyethyl)-5-hydroxy-7-isopropyl-4-tetralone
2-(2-carbomethoxyethyl)-5-benzyloxy-8-amino-4-tetralone
2-(2-carbomethoxyethyl)-5-propoxy-8-propyl-4-tetralone
2-(2-carbomethoxyethyl)-5-hydroxy-4-tetralone
1-methyl-2-(2-carbomethoxyethyl)-5-methoxy-4-tetralone
1-ethyl-2-(2-carbomethoxyethyl)-5-methoxy-4-tetralone
1-propyl-2-(2-carbomethoxyethyl)-5-methoxy-4-tetralone
2-(2-carbobenzyloxyethyl)-5-hydroxy-8-methyl-4-tetralone
2-(2-carbobenzyloxyethyl)-5-methoxy-4-tetralone
1-methyl-2-(2-carbobenzyloxyethyl)-5-hydroxy-4-tetralone
1-propyl-2-(2-carbobenzyloxyethyl)-5-hydroxy-4-tetralone 1-ethyl-2-(2-carbobenzyloxyethyl)-5-methoxy-4-tetralone
1-ethoxyethyl-2-(2-carbethoxyethyl)-7-propionyloxy-
    8-methyl-4-tetralone
1-ethyl-2-(2-carbomethoxyethyl)-5-ethoxy-7-acetoxy-
    8-chloro-4-tetralone
2-(2-carbomethoxyethyl)-5,7-ditriuuoromethyl-8-
    methoxy-4-tetralone
2-(2-carbethoxyethyl)-5,7-dibutoxy-8-trifluoromethyl-
    4-tetralone
2-(2-carbethoxyethyl)-5-methoxy-7-ethylamino-8-tri-
    fluoromethyl-4-tetralone
2-(2-carbomethoxyethyl)-7-butyrylamido-4-tetralone
2-(2-carbobenzyloxyethyl)-5-hydroxy-8-trifluoromethyl-
    4-tetralone
2-(2-carbethoxyethyl)-5,7-dihydroxy-8-chloro-4-tetralone
2-(2-carbethoxyethyl)-5-hydroxy-7-acetamido-4-tetralone
2-(2-carbethoxyethyl)-5-hydroxy-7-trifluoromethyl-
    4-tetralone
1-methyl-2-(2-carbethoxyethyl)-1-hydroxy-4-tetralone.

The aromatic chloro compounds can be subsequently hydrogenolyzed to the corresponding deschloro compounds by the procedure of Example XV.

Those compounds of the above list which contain no amino or hydroxy groups are also prepared by the methods of Example V.

EXAMPLE XXXVI

Example XXXV products and other analogous products prepared as described herein, as lower alkyl or benzyl esters or nitrile, are condensed with diethyl oxalate according to the method of Example IX to obtain 3,4,10-trioxo-anthracene derivatives. Those compounds having an active hydrogen require the use of an additional mole of sodium hydride.

The reaction mixtures are worked up as follows: After 10 minutes, or when active bubbling ceases if this occurs sooner, the reaction mixture is chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acid-washed Florisil. The highly fluorescent product fraction is collected and evaporated to obtain the desired substance.

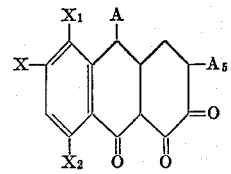

| X | $X_1$ | $X_2$ | A | $A_5$ |
|---|---|---|---|---|
| H | H | H | H | COOEt |
| H | 8-Et | 5-OMe | H | CN |
| H | 8-NMe$_2$ | 5-OMe | H | COOBz |
| H | 8-NH$_2$ | 5-OMe | H | COOBz |
| H | 8-NHCOMe | 5-OMe | H | COOPr |
| H | H | 5-OH | H | COOBz |
| 7-Me | H | 5-OH | H | COOEt |
| 7-i-Pr | H | 5-OH | H | COOBz |
| 7-Et | 8-Et | 5-OH | H | COOMe |
| H | H | 5-OCH$_2$C$_6$H$_5$ | H | COOBz |
| H | H | 5-OH | H | COOEt |
| 7-NH$_2$ | H | 5-OMe | H | COOBz |
| 7-Pr | H | 5-OMe | H | COOBz |
| 7-Me | H | 5-OMe | H | COOBz |
| 7-NMe$_2$ | H | 5-OH | H | COOBz |
| 7-Me | 8-Me | H | H | COOMe |
| H | 8-NH$_2$ | 5-OCH$_2$C$_6$H$_5$ | H | COOMe |
| H | 8-Pr | 5-OPr | H | COOMe |
| H | H | 5-OH | H | COOMe |
| H | H | 5-OMe | Me | COOMe |
| H | H | 5-OMe | Et | COOMe |
| H | H | 5-OMe | Pr | COOMe |
| H | 8-Me | 5-OH | H | COOBz |
| H | 6-Me | 5-OH | H | COOBz |
| 7-Me | 8-Me | 5-OH | H | COOBz |
| H | H | 5-OH | Me | COOBz |
| H | H | 5-OH | Pr | COOBz |
| H | H | 5-OMe | Me | COOBz |

| X | $X_1$ | $X_2$ | A | $A_5$ |
|---|---|---|---|---|
| H | H | 5-OMe | H | COOBz |
| H | H | 5-OMe | Et | COOBz |
| 7-CF$_3$ | 8-CF$_3$ | 5-OMe | H | COOMe |
| 7-EtCO$_2$ | 8-Me | H | EtOCH(Me) | COOEt |
| 7-OBu | 8-CF$_3$ | 5-OBu | H | COOEt |
| 7-NHEt | 8-CF$_3$ | 5-OMe | H | COOEt |
| 7-NHCOC$_3$H$_7$ | H | H | H | COOMe |
| 7-MeCO$_2$ | 8-Cl | 5-OEt | Et | COOMe |
| H | 8-CF$_3$ | H | H | COOBz |
| H | 8-Cl | 5-OH | H | COOEt |
| 7-Me | 8-Cl | 5-OH | H | COOEt |
| H | 8-NHMe | 5-OPr | H | COOBz |
| H | 8-Cl | 5-OBz | H | COOBz |
| 7-Me | 8-Cl | 5-OMe | H | COOMe |
| 7-NH$_2$ | 8-Cl | 5-OMe | H | COOMe |
| 7-Et | 8-Cl | 5-OMe | H | COOMe |
| H | 8-Cl | 5-OMe | Me | COOEt |
| H | 8-Cl | 5-OMe | Et | COOEt |
| H | 8-Cl | 5-OMe | Pr | COOEt |
| 7-OMe | H | 5-OMe | H | COOEt |

In the above table, Me=CH$_3$; Et=C$_2$H$_5$; Pr=C$_3$H$_7$; Bz=benzyl. Ether substituents are converted to hydroxy groups by HBr cleavage; and acylamido groups to amino groups by hydrolysis.

EXAMPLE XXXVII

Compounds of Structure IX are oxidized using ozone according to the method of Example XXVI to obtain acids of the formula:

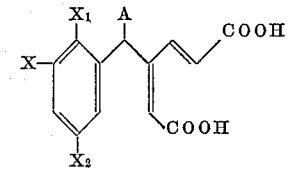

| X | $X_1$ | $X_2$ | A |
|---|---|---|---|
| H | H | H | H |
| H | 2-Et | 5-OMe | H |
| H | 2-NH$_2$ | 5-OMe | H |
| H | 2-NHCOMe | 5-OMe | H |
| H | 2-OMe | H | H |
| H | 2-Me | 5-OH | H |
| 5-i-Pr | H | 3-OH | H |
| 3-Et | 2-Et | 5-OH | H |
| H | H | 3-OCH$_2$C$_6$H$_5$ | H |
| H | H | 3-EtCO$_2$ | H |
| H | H | 3-MeCO$_2$ | H |
| H | H | 3-OH | H |
| 5-NHCOMe | H | 3-OMe | H |
| 5-Et | H | 3-OMe | H |
| 5-Me | H | 3-OMe | H |
| 5-NMe$_2$ | H | 3-OH | H |
| 3-Me | 2-Me | H | H |
| H | 2-Pr | 5-OPr | H |
| H | H | 3-OMe | Et |
| H | H | 3-OMe | Pr |
| H | H | 3-OMe | Me |
| H | 2-Me | 5-OH | H |
| 3-Me | 2-Me | 5-OH | H |
| H | H | 3-OH | Me |
| H | H | 3-OH | i-Pr |
| 5-Me | H | 3-OH | Me |
| H | H | 3-OMe | H |
| 5-CF$_3$ | H | 3-OMe | H |
| 3-Me | 2-Me | 5-OMe | H |
| 5-MeCO$_2$ | H | 3-OMe | H |
| 5-NMe$_2$ | H | 3-OMe | H |
| H | H | 3-OPr | Me |
| H | 2-OMe | 5-OMe | H |
| 5-OMe | H | 3-OMe | H |
| H | 2-NMe$_2$ | 5-OMe | H |
| 5-Me | 2-NEt$_2$ | 5-OMe | H |
| H | H | 3-OEt | H |
| H | 2-OMe | 5-OCH$_2$C$_6$H$_5$ | H |
| H | 2-NHMe | 5-OMe | H |
| 3-CF$_3$ | 2-CF$_3$ | 5-OMe | H |
| 3-EtCOO | 2-Me | H | H |
| 3-OBu | 2-CF$_3$ | 5-OBu | H |
| 3-NHEt | 2-CF$_3$ | 5-OMe | H |
| 3-NHCOMe | H | H | H |
| 3-MeCOO | 2-Cl | 5-OEt | H |
| H | 2-CF$_3$ | H | H |
| 3-CF$_3$ | 2-CF$_3$ | 5-OMe | H |
| 3-PrCO$_2$ | 2-Me | H | EtOCH(Me) |
| 3-OBu | 2-CF$_3$ | 5-OBu | H |
| 3-NHEt | 2-CF$_3$ | 5-OMe | H |
| 3-NHCOC$_3$H$_7$ | H | H | H |
| 3-MeCO$_2$ | 2-Cl | 5-OEt | Et |
| H | 2-CF$_3$ | 5-OH | H |
| 3-NHCOCH$_3$ | H | 5-OH | H |
| 3-OH | 2-Cl | 5-OH | H |
| 3-CF$_3$ | H | 5-OH | H |
| 3-OH | H | H | CH$_3$ |

In the above table, Me=CH$_3$; Et=C$_2$H$_5$; Pr=C$_3$H$_7$; Ac=acetyl.

These acids are converted to corresponding lower alkyl or benzyl esters by conventional procedures.

In the case of both oxidation procedures the acidification is effected by means of acetic acid and the product is extracted into n-butanol and recovered therefrom by evaporation.

EXAMPLE XXXVIII

Methyl, ethyl and propyl esters of (3-methoxybenozyl) acetic acid

To a mixture of 16.6 g. (0.3 mole) of methyl 3-methoxybenzoate and 10 g. (0.2 mole) of sodium hydride (48% dispersion in oil) in 300 ml. of dry dimethylformamide is added a solution of 8.0 g. of methyl acetate in 150 ml. of dry dimethylformamide dropwise with stirring at room temperature during a period of 4 hours. The mixture is then stirred for an additional two hours, after which it is acidified slowly with glacial acetic acid. The acidified mixture is poured into excess water which is next extracted with chloroform. The chloroform extract is dried over anhydrous sodium sulfate and then evaporated under reduced pressure to an oil. The residual oil is washed with hexane and distilled in vacuo to obtain 10.57 g. of the methyl ester product, B.P. 128–131° C./ (0.5 mm.), $n_D^{25}$=1.5428. Infrared analysis shows characteristic peaks at 5.73 and 5.92$\mu$. Elemental analysis gives the following results:

Calcd. for C$_{11}$H$_{12}$O$_4$ (percent): C, 63.45; H, 5.81. Found (percent): C, 63.28; H, 5.89.

The ethyl and propyl esters are prepared in the same manner (but heating at 50° C. for 15 minutes to insure complete reaction) using ethyl or propyl acetate in lieu of methyl acetate.

EXAMPLE XXXIX t-Butyl ester of (3-methoxybenzoyl)acetic acid

To a stirred suspension of sodamide in liquid ammonia (prepared from 11.5 g. of sodium in 400 ml. of liquid ammonia) is added 54 g. of t-butyl acetate in 50 ml. of dry ether followed by a solution of 41.5 g. of methyl 3-methoxybenzoate in 50 ml. of dry ether. The ammonia is then replaced by 100 ml. of ether and the mixture refluxed for 2 hours. After standing at room temperature for 12 hours, the mixture is poured into 400 ml. of ice water containing 28.8 ml. of acetic acid. The mixture is then extracted with ether, the etherate washed with 2% sodium bicarbonate solution and then dried over anhydrous sodium sulfate. After removal of the ether at reduced pressure, the residual oil is distilled in vacuo to obtain 33.5 g. of product, B.P. 126–128° (0.3 mm.). Infrared absorption of the product shows characteristic maxima at 5.75 and 5.90.

EXAMPLE XL

Ethyl 3-carbomethoxy-3-(3-methoxybenzoyl) propionate

*Method A.*—To a suspension of 26 g. of sodium hydride in 250 ml. of dry dimethylformamide is added dropwise with stirring at room temperature a solution of 108 g. of the Example XXXVIII methyl ester in 250 ml. of dry dimethylformamide over a period of 45 minutes. The mixture is stirred for an additional 30 minutes and there is then added dropwise with stirring a solution of 104 g. of ethyl bromoacetate in 250 ml. of dry dimethylformamide. The mixture is allowed to stand for 12 hours and is then evaporated under reduced pressure. The residual oil is dissolved in chloroform and the solid sodium bromide filtered. The chloroform solution, after water-washing and drying over sodium sulfate, is evaporated and the residual oil distilled in vacuo to obtain 112.5 g. of product, B.P. 182–188° C. (1.4–1.5 mm.). Infrared analysis of the product shows characteristic peaks at 5.75 and 5.91 microns. Elemental analysis gives the following results:

Calcd. for C$_{15}$H$_{18}$O$_6$ (percent): C, 61.21; H, 6.17. Found (percent): C, 61.39; H, 6.23.

Ethyl and propyl 3-carbethoxy-3-(3-methoxybenzoyl) propionate are prepared in similar fashion.

*Method B.*—To a mixture of 29 g. of methyl 3-methoxybenzoate and 15 g. of sodium hydride in 75 ml. of dry dimethylformamide is added a solution of 19 g. of dimethyl succinate in 175 ml. of the same solvent dropwise with stirring at room temperature during 12–14 hours. The mixture is carefully acidified with 25 ml. of acetic acid and stirred at room temperature for an additional 3 hours. The filtered reaction mixture is next evaporated to a residue consisting of an oil and solid which is treated with ether to dissolve the oil. The ether solution is filtered and evaporated under reduced pressure to yield 18.29 g. of dimethyl $\alpha$-(3-methoxybenzoyl) succinate, B.P. 162.9° C. (0.4–0.5 mm.). Infrared analysis of the product shows characteristic peaks at 5.75 and 5.90 microns. Elemental analysis gives the following results:

Calcd. for C$_{14}$H$_{16}$O$_6$ (percent): C, 59.99; H, 5.75. Found (percent): C, 59.91; H, 5.79.

In similar manner, the corresponding diethyl, dipropyl and di-t-butyl esters are prepared.

EXAMPLE XLI

Ethyl 3-carbo-t-butoxy-3-(3-methoxybenzoyl) propionate

A mixture of 15.8 g. of the product of Example XXXIX 10.5 g. of ethyl bromoacetate and 3.02 g. of sodium hydride in 130 ml. of dimethylformamide is treated as in Method A of Example XL to obtain this product as a yellow oil. Infrared analysis of the product shows characteristic peaks at 5.75 and 5.90$\mu$. The product is used without distillation in the procedure of Example XLIV to produce ethyl 3-[carbo-t-butoxy-3-(2-cyanoethyl)-3-(3-methoxybenzoyl)]-propionate.

EXAMPLE XLII

Diethyl 3-carbethoxy-3-(3-methoxybenzoyl)adipate

To a mixture of 102 g. of diethyl $\alpha$-(3-methoxybenzoyl)succinate in 250 ml. of dioxane and 10 ml. of a 35% solution of benzyltrimethylammonium hydroxide in methanol maintained at 50° C. is added 167 g. of ethyl acrylate in one portion with stirring. Heating and stirring are continued for 30 minutes, after which 10 ml. of glacial acetic acid is added. The mixture is evaporated under reduced pressure to a dark oil which is distilled in vacuo to yield 80.5 g. of the diethyl ester product, B.P. 197° C. (0.1–0.2 mm.), $n_D^{25}$=1.5043. Infrared analysis shows characteristic peaks at 5.76 and 5.92$\mu$. Elemental analysis gives the following results:

Calcd. for C$_{21}$H$_{28}$O$_8$ (percent): C, 61.75; H, 6.91. Found (percent): C, 61.64; H, 6.90.

Dimethyl and dipropyl $\beta$-carbomethoxy-3-(3-methoxybenzoyl)adipate are prepared in similar fashion.

EXAMPLE XLIII

Diethyl 3-carbo-t-butoxy-3-(3-methoxybenzoyl)adipate

The product of Example XLI a yellow oil, is dissolved in 80 ml. of t-butanol containing 0.75 g. of potassium t-butoxide and 19 g. of ethyl acrylate. The mixture is refluxed for 1.3 hours and then concentrated under reduced pressure to obtain the adipate ester product, a yellow viscous oil, which is used without distillation in the procedure of Method B of Example XLV.

EXAMPLE XLIV $\alpha$-(3-methoxybenzoyl)-$\alpha$-(2-cyanoethyl)succinic acid diethyl ester This compound is prepared according to the procedure of Example XLII using acrylonitrile or $\beta$-bromopropionitrile in lieu of ethyl acrylate. The product is vacuum distilled at 212–218° C. (0.45 mm. Hg). This product is hydrolyzed and decarboxylated to 3-(3-methoxybenzoyl)adipic acid by refluxing in aqueous acetic acid containing sulfuric acid by the procedure of Method A of Example XLV. Corresponding esters are prepared in the usual manner.

EXAMPLE XLV

Diethyl 3-(3-methoxybenzoyl)adipate

*Method.*—A mixture of 25 g. of diethyl-3-carbethoxy-3-(3-methoxybenzoyl)adipate in 30 ml. of acetic acid, 10 ml. of concentrated sulfuric acid and 10 ml. of water is refluxed for 36 hours. The mixture is then poured into excess water and extracted with chloroform, the extract dried and evaporated under reduced pressure to an oil. The oil is dissolved in a mixture of 50 ml. of ethanol, 1 liter of ethylene dichloride and 6 ml. of concentrated sulfuric acid and refluxed for 12 hours. The mixture is then poured into water. The ethylene chloride layer is separated, dried and evaporated in vacuo to an oil which is distilled to obtain 5.5 g. of product, B.P. 169–172° C. (0.05 mm.), $n_D^{25}$=1.5092. Elemental analysis gives the following results:

Calcd. for $C_{18}H_{24}O_6$ (percent): C, 64.27; H, 7.19. Found (percent): C, 64.09; H, 7.19.

In similar fashion, the dimethyl and dipropyl esters are prepared.

*Method B.*—The product of Example XLIII a yellow viscous oil, is refluxed in 120 ml. of dry xylene containing 3.0 g. of p-toluenesulfonic acid and cooled and extracted with water. The xylene solution, after drying, is concentrated under reduced pressure and the residual oil vacuum distilled to obtain 6.8 g. of product.

There is also obtained 5.86 g. of the enol lactone:

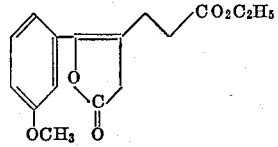

a red oil, which on infrared absorption analysis showed a maximum at 5.58µ.

As is recognized by those in the art, the product of this example is a racemic compound, DL-3-(3-methoxybenzoyl)adipic acid diethyl ester which, as the free acid, lends itself to resolution into its optical active forms by salt formation with optically active bases such as brucine, cinchonine, cinchonidine, morphine and the like to form diastereoisomers. Such procedures are well known to those skilled in the art. Of course, the optically active forms (antipodes) after separation, may be converted one to the other, as desired, by racemization and resolution. The present compound, in one of its optically active forms, is racemized by treating it with a strong base in solvent, e.g. sodium hydride, hydroxide or alkoxide in a lower alkanol. After racemization, the desired optical form may be resolved and the procedure repeated to produce more of the desired optical form from its antipode.

EXAMPLE XLVI

Employing the procedure of Example XXXVIII the following compounds are prepared from corresponding starting compounds. Those compounds having an active hydrogen require the use of an additional mole of sodium hydride.

methylbenzoylacetate
ethyl (2-ethyl-5-hydroxybenzoyl)acetate
methyl 2-(5-methoxybenzoyl)propionate
methyl 2-(5-methoxybenzoyl)butanoate
methyl 2-(5-methoxybenzoyl)pentanoate
methyl (2-chloro-5-methoxybenzoyl)acetate
methyl (2-dimethylamino-5-methoxybenzoyl)acetate
methyl (2-amino-5-methoxybenzoyl)acetate
methyl (2-acetamido-5-methoxybenzoyl)acetate
ethyl (5-hydroxybenzoyl)acetate
ethyl (2-methoxybenzoyl)acetate
ethyl (3-hydroxybenzoyl)acetate
ethyl (2-methyl-5-hydroxybenzoyl)acetate
ethyl (2,3-dimethyl-5-hydroxybenzoyl)acetate
ethyl (3-isopropyl-5-hydroxybenzoyl)acetate
ethyl (2,3-diethyl-5-hydroxybenzoyl)acetate
ethyl (5-benzyloxybenzoyl)acetate
ethyl (3-methyl-5-hydroxybenzoyl)acetate
ethyl (3-dimethylamino-5-hydroxybenzoyl)acetate
methyl (2,3-dimethylbenzoyl)acetate
ethyl 2-(3,5-dimethoxybenzoyl)acetate
ethyl 2-(2,3-diethyl-5-ethoxybenzoyl)acetate
ethyl 2-(3-isopropyl-5-ethoxybenzoyl)acetate
methyl 2-(2-methylamino-5-methoxybenzoyl)acetate
methyl 2-(3-ethyl-5-methoxybenzoyl)acetate
ethyl 2-(2-methoxy-5-benzyloxybenzoyl)acetate
ethyl 2-(2-propyl-5-propoxybenzoyl)acetate
ethyl 2-(3-trifluoromethyl-5-methoxybenzoyl)acetate
ethyl 2-(3-acetoxy-5-methoxybenzoyl)acetate
propyl 2-(3-propoxybenzoyl)acetate
benzyl 2-(2-chloro-5-methoxybenzoyl)acetate
ethyl 2-(3-benzyloxybenzoyl)acetate
ethyl 2-(3-amino-5-benzyloxybenzoyl)acetate
ethyl 2-(3-propyl-5-methoxybenzoyl)acetate
ethyl 2-(2-isopropyl-3-ethyl-5-methoxybenzoyl)acetate
benzoyl 2-(2-methoxy-5-ethoxybenzoyl)acetate
benzyl 2-(2-chloro-3-methyl-5-methoxybenzoyl)acetate
ethyl 2-(2-chloro-3-dimethylamino-5-methoxybenzoyl)acetate
methyl 2-(2-chloro-4-acetamidobenzoyl)acetate
methyl 2-(2-chloro-3-acetamido-5-methoxybenzoyl)acetate
methyl 2-(2,3-ditrifluoromethyl-5-methoxybenzoyl)acetate
methyl 2-(2-methyl-3-propionoxybenzoyl)acetate
ethyl 2-(2-trifluoromethyl-3,5-dibutoxybenzoyl)acetate
ethyl 2-(2-trifluoromethyl-3-ethylamino-5-methoxybenzoyl)acetate
ethyl 2-(3-butyrylamidobenzoyl)acetate
ethyl 2-(2-chloro-3-acetoxy-5-ethoxybenzoyl)acetate
ethyl 2-(2-chloro-3,5-dihydroxybenzoyl)acetate
ethyl 2-(3-acetamido-5-hydroxybenzoyl)acetate
ethyl 2-(3-trifluoromethyl-5-hydroxybenzoyl)acetate

EXAMPLE XLVII

The following carbalkoxybenzoyl propionates are prepared from corresponding benzoyl acetates by reaction with α-haloacetic acid esters according to the procedure of Method A of Example XL, as well as by the procedure of Method B, Example XL.

ethyl 3-carbomethoxy-3-benzoylpropionate
methyl 3-carbethoxy-3-(2-ethyl-5-methoxybenzoyl)propionate
methyl 3-carbomethoxy-3-(3-methoxybenzoyl)butanoate [1]
methyl 3-carbomethoxy-3-(3-methoxybenzoyl)pentanoate [1]
methyl 3-carbomethoxy-3-(3-methoxybenzoyl)hexanoate [1]
methyl 3-carbomethoxy-3-(2-chloro-5-methoxybenzoyl)propionate
methyl 3-carbomethoxy-3-(2-dimethylamino-5-methoxybenzoyl)propionate
benzyl 3-carbomethoxy-3-(2-acetamido-5-methoxybenzoyl)propionate
benzyl 3-carbomethoxy-3-(2-acetamido-5-methoxybenzoyl)propionate
ethyl 3-carbethoxy-3-(3-methoxybenzoyl)propionate
ethyl 3-carbethoxy-3-(2,3-diethyl-5-methoxybenzoyl)propionate
ethyl 3-carbethoxy-3-(3-isopropyl-5-methoxybenzoyl)propionate ethyl 3-carbethoxy-3-(2-methyl-5-ethoxybenzoyl)
  propionate
ethyl 3-carbethoxy-3-(3-dimethylamino-5-propoxy-
  benzoyl)propionate
methyl 3-carbomethoxy-3-(2,3-dimethylbenzoyl)
  propionate
ethyl 3-carbethoxy-3-(3-methoxybenzoyl)propionate
ethyl 3-carbethoxy-3-(2-methyl-5-methoxybenzoyl)
  propionate
ethyl 3-carbethoxy-3-(4-methyl-5-methoxybenzoyl)
  propionate
ethyl 3-carbethoxy-3-(2,3-dimethyl-5-methoxybenzoyl)
  propionate
ethyl 3-carbethoxy-3-(3-benzyloxybenzoyl)propionate
ethyl 3-carbethoxy-3-(3,5-dimethoxybenzoyl)
  propionate
ethyl 3-carbethoxy-3-(2,3-diethyl-5-ethoxybenzoyl)
  propionate
ethyl 3-carbethoxy-3-(3-isopropyl-5-ethoxybenzoyl)
  propionate
methyl 3-carbomethoxy-3-(2-methylamino-5-methoxy-
  benzoyl)propionate
methyl 3-carbomethoxy-3-(3-ethyl-5-methoxybenzoyl)
  propionate
ethyl 3-carbethoxy-3-(2-methoxy-5-benzyloxybenzoyl)
  propionate
ethyl 3-carbethoxy-3-(2-propyl-5-propoxybenzoyl)
  propionate
ethyl 3-carbomethoxy-3-(3-trifluoromethyl-5-methoxy-
  benzoyl)propionate
ethyl 3-carbomethoxy-3-(3-acetoxy-5-methoxybenzoyl)
  propionate
propyl 3-carbomethoxy-3-(3-propoxybenzoyl)
  propionate
benzoyl 3-carbomethoxy-3-(2-chloro-5-methoxybenzoyl)
  propionate
ethyl 3-carbomethoxy-3-(3-benzoyloxybenzoyl)
  propionate
ethyl 3-carbomethoxy-3-(3-amino-5-benzyloxybenzoyl)
  propionate
ethyl 3-carbomethoxy-3-(3-propyl-5-methoxybenzoyl)
  propionate
ethyl 3-carbomethoxy-3-(2-isopropyl-3-ethyl-5-methoxy-
  benzoyl)propionate
benzyl 3-carbethoxy-3-(3-methoxy-5-ethoxybenzoyl)
  propionate
benzyl 3-carbethoxy-3-(2-chloro-3-methyl-5-methoxy-
  benzyl)propionate
ethyl 3-carbethoxy-3-(2-chloro-3-dimethylamino-5-
  methoxybenzoyl)propionate
methyl 3-carbethoxy-3-(2-chloro-4-acetamidobenzoyl)
  propionate
methyl 3-carbomethoxy-3-(2-chloro-3-acetamido-5-
  methoxybenzoyl)propionate
methyl 3-carbomethoxy-3-(2-ditrifluoromethyl-5-
  methoxybenzoyl)propionate
methyl 3-carbomethoxy-3-(2-methyl-3-propionyloxy-
  benzoyl)propionate
ethyl 3-carbethoxy-3-(2-trifluoromethyl-3,5-dibutoxy-
  benzoyl)propionate
ethyl 3-carbethoxy-3-(2-trifluoromethyl-3-ethylamino-
  5-methoxybenzoyl)propionate
ethyl 3-carbethoxy-3-(3-butyrylamidobenzoyl)
  propionate
ethyl 3-carbethoxy-3-(2-chloro-3-acetoxy-5-ethoxy-
  benzoyl)propionate
ethyl 3-carbethoxy-3-(2-chloro-3,5-dihydroxybenzoyl)
  propionate
ethyl 3-carbethoxy-3-(3-acetamido-5-hydroxybenzoyl)
  propionate
ethyl 3-carbethoxy-3-(3-trifluoromethyl-5-hydroxy-
  benzoyl)propionate

[1] The higher benzoyl alkanoates, e.g. butanoate, pentanoate and hexanoate, are prepared from the next lower homolog by the procedure of Method A, Example XL.

EXAMPLE XLVIII

The following compounds are prepared from the products of Example XLVII by the procedure of Examples XLIV and XLII using corresponding β-bromo or α,β-unsaturated esters or nitriles.

diethyl 3-carbomethoxy-3-benzoyladipate
dimethyl 3 - carbethoxy-3-(2-ethyl-5-methoxybenzoyl)adipate
dimethyl 3-carbomethoxy-3-(2-chloro-5-methoxybenzoyl)
  adipate
dimethyl 3 - carbomethoxy - 3 - (2 - dimethylamino -5 -
  methoxybenzoyl)adipate
dibenzyl 3 - carbomethoxy - 3 - (2-acetamido-5-methoxy-
  benzoyl)adipate
diethyl 3-carbethoxy-3-(3-methoxybenzoyl)adipate
diethyl 3-carbethoxy-3-(2-methoxybenzoyl)adipate
diethyl 3 - carbethoxy - 3-(3-methyl-5-methoxybenzoyl)
  adipate
diethyl 3 - carbethoxy - 3 - (3-dimethylamino-5-methoxy-
  benzoyl)adipate
dimethyl 3-carbomethoxy-3-(2,3-dimethylbenzoyl)adipate
diethyl 3-carbethoxy-3-(3-methoxybenzoyl)adipate
diethyl 3 - carbethoxy - 3-(2-methyl-5-methoxybenzoyl)
  adipate
diethyl 3 - carbethoxy - 3-(4-methyl-5-methoxybenzoyl)
  adipate
diethyl 3 - carbethoxy-3-(2,3-dimethyl-5-methoxybenzoyl)
  adipate
diethyl 3 - carbethoxy - 3-(3-isopropyl-5-methoxybenzoyl)
  adipate
diethyl 3 - carbethoxy - 3-(2,3-diethyl-5-methoxybenzoyl)
  adipate
diethyl 3-carbethoxy-3-(3-benzyloxybenzoyl)adipate
diethyl 3-carbethoxy-3-(3,5-dimethoxybenzoyl)adipate
diethyl 3 - carbethoxy - 3 - (2,3-diethyl-5-ethoxybenzoyl)
  adipate
diethyl 3 - carbethoxy - 3-(3-isopropyl-5-ethoxybenzoyl)
  adipate
dimethyl 3 - carbomethoxy-3-(2-methylamino-5-methoxy-
  benzoyl)adipate
dimethyl 3 - carbomethoxy-3-(3-ethyl-5-methoxybenzoyl)
  adipate
diethyl 3 - carbethoxy-3-(2-methoxy-5-benzyloxybenzoyl)
  adipate
diethyl 3 - carbethoxy - 3 - (2-propyl-5-propoxybenzoyl)
  adipate
diethyl 3 - carbethoxy - 3-(3-trifluoromethyl-5-methoxy-
  benzoyl)adipate
diethyl 3 - carbomethoxy-3-(3-acetoxy-5-methoxybenzoyl)
  adipate
dipropyl 3-carbomethoxy-3-(3-propoxybenzoyl)adipate
dibenzyl 3-carbomethoxy-3-(2-chloro-5-methoxybenzoyl)
  adipate
diethyl 3-carbomethoxy-3-(3-benzyloxybenzoyl)adipate
diethyl 3-carbomethoxy-3-(3-amino-5-benzyloxybenzoyl)
  adipate
diethyl 3 - carbomethoxy-3-(3-propyl-5-methoxybenzoyl)
  adipate
diethyl 3-carbomethoxy-3-(2-isopropyl-3-ethyl-5-methoxy-
  benzoyl)adipate
dibenzyl 3 - carbethoxy - 3-(2-methoxy-5-ethoxybenzoyl)
  adipate
dibenzyl 3 - carbethoxy-3-(2-chloro-3-methyl-5-methoxy-
  benzoyl)adipate
diethyl 3 - carbethoxy - 3 - (2-chloro-3-dimethylamino-5-
  methoxybenzoyl)adipate
dimethyl 3 - carbethoxy-3-(2-chloro-4-acetaminobenzoyl)
  adipate
dimethyl 3 - carbomethoxy - 3 - (2-chloro-3-acetamido-5-
  methoxybenzoyl)adipate dimethyl 3 - carbomethoxy - 3 - (2,3-ditrifluoromethyl-5-methoxybenzoyl)adipate
dimethyl 3 - carbomethoxy - 3-(2-methyl-3-propionyloxybenzoyl)adipate
diethyl 3 - carbethoxy-3-(2-trifluoromethyl-3,5-dibutoxybenzoyl)adipate
diethyl 3 - carbethoxy-3-(2-trifluoromethyl-3-ethylamino-5-methoxybenzoyl)adipate
diethyl 3-carbethoxy-3-(3-butyrylamidobenzoyl)adipate
diethyl 3 - carbethoxy - 3-(2-chloro-3-acetoxy-5-hydroxybenzoyl)adipate
diethyl 3 - carbethoxy - 3 - (2-trifluoromethyl-5-hydroxybenzoyl)adipate
diethyl 3 - carbethoxy-3-(2-chloro-3,5-dihydroxybenzoyl)adipate
diethyl 3 - carbethoxy-3-(3-acetamido-5-hydroxybenzoyl)adipate
diethyl 3 - carbethoxy - 3-(3-trifluoromethyl-5-hydroxybenzoyl)adipate

EXAMPLE XLIX

The following compounds are prepared by hydrolysis and decarboxylation of corresponding 3-carbalkoxy compounds according to the procedure of Example XLV.

methyl 3-(3-methoxybenzoyl)butanoate
methyl 3-(3-methoxybenzoyl)pentanoate
methyl 3-(3-methoxybenzoyl)hexanoate

EXAMPLE L

Diethyl 3-(3-methoxybenzoyl)adipate 3-(3-methoxybenzoyl)propionic acid ethyl ester (16.7 g.) is dissolved in 100 ml. of a 2.5 M. solution of methyl magnesium carbonate in methanol and the resulting mixture refluxed for two hours. After cooling, 25 g. of ethyl β-bromopropionate is added and the mixture allowed to stand for 12 hours, after which it is acidified with concentrated HCl. Chloroform is then added and the entire mixture poured into water. The chloroform layer is separated, dried and concentrated under reduced pressure to give the product which is vacuum-distilled.

EXAMPLE LI

Dimethyl 2-(3-methoxybenzoyl)glutarate

This compound is prepared according to the methods of Examples XLII and XLIV using methyl (3-methoxybenzoyl)acetate as the starting compound.

In similar fashion, the following compounds are prepared from corresponding starting compounds using one equivalent of alkylating agent:

diethyl 2-benzoylglutarate
dimethyl 2-(3,5-diethylbenzoyl)glutarate
dimethyl 2-(2-ethyl-5-methoxybenzoyl)glutarate
dimethyl 2-(2-chloro-5-methoxybenzoyl)glutarate
dimethyl 2-(2-dimethylamino-5-methoxybenzoyl)glutarate
dibenzyl 2-(2-acetamido-5-methoxybenzoyl)glutarate
diethyl 2-(3-methoxybenzoyl)glutarate
diethyl 2-(3-methyl-5-methoxybenzoyl)glutarate
diethyl 2-(3-dimethylamino-5-methoxybenzoyl)glutarate
dimethyl 2-(2,3-dimethylbenzoyl)glutarate
diethyl 2-(3-methoxybenzoyl)glutarate
diethyl 2-(2-methyl-5-methoxybenzoyl)glutarate
diethyl 2-(4-methyl-5-methoxybenzoyl)glutarate
diethyl 2-(2,3-dimethyl-5-methoxybenzoyl)glutarate
diethyl 2-(3,5-dimethoxybenzoyl)glutarate
diethyl 2-(2,3-diethyl-5-ethoxybenzoyl)glutarate
diethyl 2-(3-isopropyl-5-ethoxybenzoyl)glutarate
dimethyl 2-(2-methylamino-5-methoxybenzoyl)glutarate
dimethyl 2-(3-ethyl-5-methoxybenzoyl)glutarate
diethyl 2-(2-methoxy-5-benzyloxybenzoyl)glutarate
diethyl 2-(2-propyl-5-propoxybenzoyl)glutarate
diethyl 2-(3-trifluoromethyl-5-methoxybenzoyl)glutarate
diethyl 2-(3-acetoxy-5-methoxybenzoyl)glutarate
dipropyl 2-(3-propoxybenzoyl)glutarate
dibenzyl 2-(2-chloro-5-methoxybenzoyl)glutarate
diethyl 2-(3-benzyloxybenzoyl)glutarate
diethyl 2-(3-amino-5-benzyloxybenzoyl)glutarate
diethyl 2-(3-propyl-5-methoxybenzoyl)glutarate
diethyl 2-(2-isopropyl-3-ethyl-5-methoxybenzoyl)glutarate
dibenzyl 2-(2-methoxy-5-ethoxybenzoyl)glutarate
dibenzyl 2 - (2-chloro-3-methyl-5-methoxybenzoyl)glutarate
diethyl 2 - (2-chloro-3-dimethylamino-5-methoxybenzoyl)glutarate
dimethyl 2-(2-chloro-4-acetamidobenzoyl)glutarate
dimethyl 2 - (2 - chloro-3-acetamido-5-methoxybenzoyl)glutarate
dimethyl 2 - (2,3 - ditrifluoromethyl-5-methoxybenzoyl)glutarate
dimethyl 2-(2-methyl-3-propionyloxybenzoyl)glutarate
diethyl 2 - (2 - trifluoromethyl - 3,5 - dibutoxybenzoyl)glutarate
diethyl 2 - (2 - trifluoromethyl-3-ethylamino-5-methoxybenzoyl)glutarate
diethyl 2-(3-butyrylamidobenzoyl)glutarate
diethyl 2-(2-chloro-3-acetoxy-5-ethoxybenzoyl)glutarate
diethyl 2-(2-trifluoromethyl-5-hydroxybenzoyl)glutarate
diethyl 2-(3-acetamido-5-hydroxybenzoyl)glutarate
diethyl 2-(2-chloro-3,5-dihydroxybenzoyl)glutarate
diethyl 2-(3-trifluoromethyl)-5-hydroxybenzoyl)glutarate

EXAMPLE LII

The compounds of Example LI are converted to the corresponding adipic acid derivatives described in Example XLVIII by reaction with bromoacetic acid ester by the procedure of Method A of Example XL.

EXAMPLE LIII

Dimethyl 3 - (α - methoxymethyl - 2 - chloro - 5 - methoxybenzyl)adipate

The ylid is prepared from chloromethyl ether in the following manner: triphenylphosphine (52.4 g., 0.2 mole) is dissolved in 100 ml. anhydrous benzene and 16.1 g. chloromethyl ether added. The mixture is heated at 50° C. for 16 hours. The resulting heavy crystalline mass is filtered off, washed with ether, dissolved in chloroform, and reprecipitated with ethyl acetate. The precipitate is then separated, washed with ether, and dried at 80° C. in high vacuum.

Triphenylmethoxymethylphosphonium chloride, 6.84 g., 0.02 mole, prepared as described above, is suspended in 65 ml. absolute ether. To this suspension is added 19.6 ml. 1.0 N phenyl lithium solution. With slight warming the mixture turns orange-red and then dark red. After five minutes there is added portionwise 0.02 mole dimethyl 3-(2-chloro-5-methoxybenzoyl)adipate in 50 ml. ether. An exothermic reaction occurs causing the ether to reflux. After stirring for 2 hours, the suspension is filtered and the separated solids washed with ether. The combined ether filtrate and washings are dried over anhydrous sodium sulfate, filtered, and evaporated, to obtain dimethyl 3-(α-methoxymethylene - 2 - chloro - 5 - methoxybenzyl) adipate as residue. It is further purified by distillation under high vacuum.

The methoxymethylene benzyl adipate, obtained as described, is dissolved in 50 parts by weight dioxane and hydrogenated over 0.1 part 5% palladium on charcoal at 50 p.s.i. and room temperature until one molar equivalent of hydrogen has been absorbed. The hydrogenation mixture is filtered, and the filtrate evaporated to obtain the desired dimethyl 3 - (α-methoxymethyl-2-chloro-5-methoxybenzyl) adipate as residue. It is further purified by high-vacuum distillation.

Following the described procedure, the following additional adipates are prepared from the corresponding benzoyl adipates. (For these syntheses the necessary chloromethyl ethers of the formula $(R_4)CHClOR_8$ are obtained by treatment of aldehyde acetals of the formula $R_4CH(OR_8)_2$ with acetyl chloride, as described in Liebig's Annalen, 493, p. 203 and 498, p. 120 (1932)).

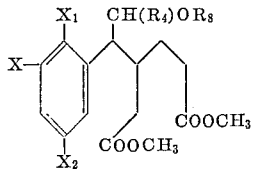

| X | $X_1$ | $X_2$ | $R_4$ | $R_8$ |
|---|---|---|---|---|
| H | 2-Cl | 5-OH | $CH_3$ | $CH_3$ |
| H | 2-NHCOCH$_3$ | 5-OEt | H | $CH_3$ |
| 4-Me | H | 3-OMe | H | n-$C_3H_7$ |
| 3-OMe | H | 5-OMe | H | $CH_3$ |
| H | 2-OMe | 5-OMe | $CH_3$ | $CH_3$ |
| 3-EtCO$_2$ | 2-OMe | H | $CH_3$ | $C_2H_5$ |

The alkoxy alkyl ethers produced in this manner are converted to the corresponding tetralones and thence to the corresponding 9-alkoxyalkyl-3,4,10-trioxo-1,2,3,4,4a,9 9a,10-octahydroanthracenes by the reaction sequences illustrated and exemplified above for the conversion of compounds of structure II to those of structure I.

The methoxymethylene benzyl adipate is also converted to an aldehyde, in the following manner: dimethyl 3-(α-methoxymethylene-2-chloro-5-methoxybenzyl) adipate is warmed with a mixture of 1:10 by volume 1% aqueous hydrochloric acid:dioxane for 5 minutes at 60° C. The solvent is then removed by evaporation at reduced pressure, and the residue is converted to the bisulfite addition product by shaking with alcoholic sodium bisulfite as descibed in Vogel, "A Textbook of Practical Organic Chemistry" Longmans (1948) p. 330. The addition product is then hydrolyzed by treatment with 5% aqueous hydrochloric acid and the resulting dimethyl 3-(α-formyl-2-chloro-5-methoxybenzyl) adipate is extracted from the aqueous acid into chloroform and recovered by evaporation of the solvent.

The dimethyl 3 - (a-formyl-2-chloro-5-methoxybenzyl) adipate prepared as described is hydrogenated in ethylene glycol diemthyl ether solvent at room temperature over platinum oxide catalyst until an equimolar proportion of hydrogen is consumed. The catalyst is then separated by filtration and the resulting α-hydroxymethyl benzyl adipate recovered by evaporation of the solvent under reduced pressure.

These a-alkoxyalkyl benzyl adipates are converted to 9-alkoxyalkyl - 3,4,10 - trioxo-octahydroanthracenes of Structure IV via the corresponding tetralones of Structure III by applying in order to procedure of Examples XXXV and XXXVI.

EXAMPLE LIV

2 - carbomethoxy - 5 - methoxy - 8 - chloro - 4,10 - dioxo-1,2,3,4,4a,9,9a,10-octahydroanthracene

*Method A.*—2.4 g. of 2-carbomethoxy-5-methoxy-8-chloro - 3,4,10-trioxo-1-2,3,4,4a,9,9a,10-octahydroanthracene, prepared in Examples IX and XII, is combined with 600 ml. acetic acid and 96 g. 10-mesh granulated zinc and the mixture is heated at reflux temperature for 6 hours. It is then cooled and filtered and the filtrate is evaporated under reduced pressure to a gum. The latter is dissolved in chloroform and water-washed to remove zinc acetate. The chloroform solution is then dried over anhydrous sodium sulfate, stirred with activated carbon, filtered and re-evaporated. The resulting gum is chromatographed in chloroform solution on a column of silicic acid. Concentration of the column eluate provides the desired product which, upon recrystallization from a mixture of ether and hexane, is obtained as yellow crystals melting at 146–7° c.

*Elemental analysis.*—calculated for $C_{17}H_{17}O_5Cl$ (percent): C, 60.63; H, 5.08. Found (percent): C, 60.67; H, 5.14.

*Method B.*—1.0 g. of 2-carbomethoxy-5-methoxy-8-chloro - 3,4,10 - trioxo - 1,2,3,4,4a,9,9a,10 - octahydroanthracene is combined with 1.0 g. ethane dithiol and 0.5 g. toluenesulfonic acid in a liter of toluene and the mixture refluxed for 5 hours under nitrogen. The toluene is then slowly distilled until the volume is reduced to about 100 ml. Further evaporation under reduced pressure provides a semisolid, which is dissolved in chloroform, water-washed, dried, treated with activated carbon, and filtered. The gum obtained upon concentration of the filtrate is chromatographed in chloroform solution on a column of silicic acid. Evaporation of chloroform from the eluate fractions provides the 3-ethylene dithioketal of the starting compound, in the form of a yellow-solid (90% yield).

The latter is dissolved in 500 ml. ethanol and stirred for 12 hours with 10 g. Raney nickel. Upon filtration and concentration of the filtrate, 2-carbomethoxy-5-methoxy-8 - chloro - 4,10 - dioxo - 1,2,3,4,4a,9,9a,10 - octahydroanthracene is obtained in about 60% yield.

*Method C.*—2.0 g. of 2-carbomethoxy-5-methoxy-8-chloro - 3,4,10 - trioxo - 1,2,3,4,4a,9,9a,10 - octahydroanthracene in 70 ml. glacial acetic acid plus 40 ml. tetrahydrofuran is stirred at room temperature for one hour with 10 g. zinc dust. The reaction mixture is then filtered and the solvent evaporated in vacuo. The residue is chromatographed in chloroform solution on a column of silicic acid and the main effluent fraction evaporated to obtain 1.8 g. 2-carbomethoxy-3-hydroxy-5-methoxy-8-chloro - 4,10 - dioxo 1,2,3,4,4a,9,9a,10-octahydroanthracene as residue.

1.45 g. of the 3-hydroxy compound is dissolved in 12 ml. dry pyridine, cooled to 0° C., and treated with 6 ml. acetoformic anhydride. After stirring at 0° C. for 30 minutes, the reaction mixture is poured into chloroform, washed with three portions of water, dried over sodium sulfate, and filtered. The filtrate is evaporated in vacuo and the resulting brown oil chromatographed in chloroform on silicic acid. The main effluent fraction is evaporated to obtain 0.83 g. yellow crystalline 2-carbomethoxy - 3 - formyloxy - 5 - methoxy - 8 - chloro - 4,10-dioxo-1,2,3,4,4a,9,9a,10-octahydroanthracene. Upon recrystallization from acetone-hexane it melts at 143–53° C.

*Analysis.*—calculated for $C_{18}H_{17}O_7Cl$ (percent): C, 56.99; H, 4.48; Cl, 9.36. Found (percent): C, 57.22, H, 4.63; Cl, 9.50.

300 mg. of the formyloxy compound in 100 ml. methanol is stirred at room temperature for 3½ hours under nitrogen with 20 drops 98+% formic acid and 300 mg. zinc dust. The reaction mixture is then filtered and evaporated in vacuo. The residual gum is dissolved in chloroform, and hydrogen sulfide gas passed through for 10 minutes. The mixture is then filtered and taken to dryness in vacuo in a rotating evaporator. The resulting residue is redissolved in chloroform and chromatographed on silicic acid. The principal effluent fraction is evaporated to obtain 185 mg. 2-carbomethoxy-5-methoxy-8-chloro-4,10-dioxo - 1,2,3,4,4a,9,9a,10-octahydroanthracene. Recrystallization from ether-hexane gives the product in the form of yellow crystals.

EXAMPLE LV

The products of Example XXXVI are treated as in the preceding example, to prepare the corresponding 4,10-dioxanthracene derivatives, as follows:

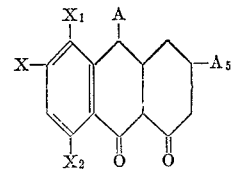

45 where X, $X_1$, $X_2$, A and $A_5$ have the significance assigned in Example XXXVI.

EXAMPLE LVI 2-(2-carbomethoxyethyl)-5-methoxy-8-chloro-4-tetralone ethylene hemithioketal A solution of 10 g. of 2-(2-carbomethoxyethyl)-5-methoxy-8-chloro-4-tetralone, prepared as described in Example V, and 5 g. β-mercaptoethanol in 200 ml. of dry toluene is prepared and 100 mg. of p-toluene sulfonic acid monohydrate catalyst is added. The mixture is refluxed for about 2 hours and then slowly concentrated to approximately one-half its original volume at atmospheric pressure by distillation of the solvent. The residue is concentrated in vacuo to about 8.6 g. of thick oil.

EXAMPLE LVII 2-(2,3-Dicarbomethoxypropyl)-8-chloro-5-methoxy-4-tetralone

The ethylene hemithioketal prepared in the preceding example is dissolved in 100 ml. of dry dimethylformamide and treated with a suspension of sodium hydride (1.34 g. of a 50% suspension in oil) in dimethylformamide, added in portions over a 30 minute period. The mixture is stirred for an additional 30 minutes and then a solution of 4.05 g. of methyl bromoacetate in 100 ml. of dimethylformamide is added dropwise over a one hour period. The resulting mixture is stirred for about 16 hours at room temperature, then heated to 80° C. for 30 minutes. It is then cooled, cautiously acidified and treated with 10 ml. of conc. hydrochloric acid diluted with 10 ml. of water, and stirred at 50–60° C. for two hours. Approximately 250 ml. of water is then added, and the mixture is extracted with three successive 250 ml. portions of chloroform. The chloroform extracts are separated, dried over sodium sulphate and the solvent removed by distillation. The crude product so obtained weighs 9.7 g. It is further purified by absorption on silica gel and elution therefrom with chloroform.

EXAMPLE LVIII 2-carbomethoxy-5-methoxy-8-chloro-4,10-dioxo-1,2,3,4, 4a,9,9a,10-octahydroanthracene 2 - (2,3 - dicarbomethoxypropyl) - 8 - chloro - 5-methoxy-4-tetralone, 0.01 mole, is dissolved in 50 ml. of dry, freshly distilled dimethylformamide and the resulting solution added in dropwise fashion with stirring to 50 ml. of dimethylformamide containing 0.02 mole of sodium hydride (as 50% suspension in oil), during a 30 minute period. 0.01 mole of methanol is added and the reaction mixture is stirred for approximately 16 hours at room temperature in a nitrogen atmosphere. The product is then recovered by treatment with sufficient acetic acid to neutralize the sodium salt and excess sodium hydride, 200 ml. of chloroform is added, and the mixture poured into approximately 300 ml. of water. The solvent layer is separated and the aqueous layer twice extracted with an equal volume of chloroform. Combined chloroform extracts are washed with water, dried over sodium sulphate, and the solvent distilled in vacuo, yielding a solid-pale yellow or off-white residue.

EXAMPLE LIX 2-carboxy-5-methoxy-8-chloro-4,10-dioxo-1,2,3,4,4a,9, 9a,10-octahydroanthracene 2 - carbomethoxy - 5 - methoxy - 8 - chloro - 4,10-dioxo-1,2,3,4,4a,9,9a,10-octahydroanthracene (250 mg.) is hydrolyzed by heating on the steam bath for three hours with a mixture of 15 ml. of acetic acid, 1 ml. of water, and 5 ml. of conc. hydrochloric acid. Upon cooling, 200

46 mg. of the desired product separates in the form of pale yellow crystals, M.P. 260–266° C. Recrystallized from chloroform-methanol, the product melts at 266–8° C.

*Elemental analysis.*—Calculated for $C_{16}H_{15}O$-Cl (percent): C, 59.55; H, 4.69. Found (percent): C, 59.79; H, 4.70.

EXAMPLE LX

Following the procedure of the preceding example, 4,10-dioxanthracenes prepared from the appropriate 2-carboxy-4-tetralone esters (prepared by the method of Example V), as in Example LV, are converted to the corresponding carboxylic acids as listed below. Those products containing amino groups are recovered by neutralizing the hydrolysis mixture, evaporating to dryness followed by extraction with acetonitrile, and evaporation of the extract. The other products are recovered by extracting the hydrolysis mixture with methylene chloride and evaporating the extract.

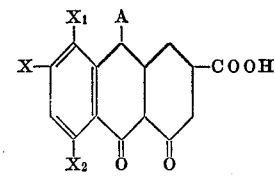

| X | $X_1$ | $X_2$ | A |
|---|---|---|---|
| H | H | H | H |
| H | 8-Et | 5-OMe | H |
| H | 8-NMe₂ | 5-OMe | H |
| H | 8-NH₂ | 5-OMe | H |
| H | 8-NHMe | 5-OMe | H |
| H | H | 5-OH | H |
| H | 8-OMe | H | H |
| 7-Me | H | 5-OH | H |
| 7-i-Pr | H | 5-OH | H |
| 7-Et | 8-Et | 5-OH | H |
| H | H | 5-OCH₂C₆H₅ | H |
| H | 8-NHCOMe | 5-OMe | H |
| H | H | 5-OH | H |
| 7-NH₂ | H | 5-OMe | H |
| 7-Cl | H | 5-OMe | H |
| 7-Pr | H | 5-OMe | H |
| 7-Me | H | 5-OMe | H |
| 7-NMe₂ | H | 5-OMe | H |
| 7-Me | 8-Me | H | H |
| H | 8-NH₂ | 5-OCH₂C₆H₅ | H |
| H | 8-Pr | 5-OPr | H |
| 7-OMe | H | 5-OMe | MeOCH₂ |
| H | 8-OMe | 5-OMe | MeOCH(Me) |
| 7-CF₃ | H | 5-OMe | H |
| H | H | 5-OMe | Me |
| H | H | 5-OMe | Et |
| 7-MeCO₂ | H | 5-OMe | H |
| 7-Me | 8-Me | 5-OH | H |
| H | H | 5-OH | Me |
| H | H | 5-OH | i-Pr |
| 7-Me | H | 5-OH | Me |
| H | H | 5-OMe | H |
| 7-CF₃ | 8-CF₃ | 5-OMe | H |
| 7-EtCO₂ | 8-Me | H | EtOCH(Me) |
| 7-OBu | 8-CF₃ | 5-OBu | H |
| 7-NHET | 8-CF₃ | 5-OMe | H |
| 7-NHCOC₃H₇ | H | H | H |
| 7-MECO₂ | 8-Cl | 5-OEt | Et |
| H | 8-CF₃ | 5-OH | H |
| 7-NHCOCH₃ | H | 5-OH | H |
| 7-OH | 8-Cl | 5-OH | H |
| 7-CF₃ | H | 5-OH | H |
| 7-OH | H | H | CH₃ |

Acyloxy and acylamino groups are hydrolyzed by this procedure and subsequent reacylation is necessary. Ether substituents are converted to hydroxy groups by HBr cleavage.

EXAMPLE LXI 2-chloroformyl-5-methoxy-8-chloro-4,10-dioxo-1,2,3, 4,4a,9,9a,10-octahydroanthracene 2-carboxy - 5 - methoxy-8-chloro-4,10-dioxo-1,2,3,4, 4a,9,9a,10-octahydroanthracene, 0.01 mole, is dissolved in 50 ml. of dry chloroform at 0° C. and treated with one equivalent of finely divided phosphorous pentachloride. The mixture is stirred for an additional two hours and then allowed to warm to room temperature. The solvent is distilled in vacuo and the residue treated with 50 ml. of toluene which is also distilled in vacuo to remove by-product phosphorous oxychloride. The desired acid chloride is obtained as a solid residue.

EXAMPLE LXII

Following the procedure of the preceding example, the 2-carboxy-4,10-dioxoanthracenes of Example LX are converted to the corresponding acid chlorides, as follows:

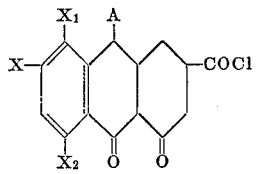

where X, $X_1$, $X_2$ and A have the significance assigned in Example LX.

EXAMPLE LXIII 5-methoxy-8-chloro-4,10-dioxo-1,2,3,4,4a,9,9a,10-octahydro-2-anthraldehyde 2-chloroformyl-5-methoxy-8-chloro - 4,10 - dioxo-1,2,3,4,4a,9,9a,10-octahydroanthracene 0.01 mole, is dissolved in 100 ml. of dry xylene to which is added 0.5 g. of freshly prepared 5% palladium on barium sulfate catalyst and 0.1 ml. of quinoline sulfur regulator prepared as described in "Organic Reactions" (1948) volume 4, p. 368. The mixture is then heated to 140° C. and hydrogen gas is passed through the solution employing a gas diffusion tube to insure intimate contact of the gas with the solution. The exit gases are absorbed in an accurately measured volume of standard aqueous sodium hydroxide solution. Aliquots of this standard solution are withdrawn and titrated during the course of the reaction. When approximately 90% of the calculated quantity of hydrogen chloride has been absorbed in the sodium hydroxide solution, further evolution of gas becomes very slow. The reaction mixture is now cooled to room temperature, filtered and the solvent distilled in vacuo leaving the desired aldehyde as residue.

Alternatively, the reduction may be conducted as follows: 0.01 mole of lithium-tri-t-butoxyaluminohydride (prepared as described in J. Am. Chem. Soc., vol. 78, p. 252, 1956) in 25 ml. tetrahydrofuran is added slowly to the acid chloride in 75 ml. tetrahydrofuran maintained at about −70° C. The reaction mixture is permitted to warm to room temperature and poured onto crushed ice. The mixture is extracted with chloroform, and the organic phase is separated and concentrated to obtain the product.

EXAMPLE LXIV 5-methoxy-8-chloro-4,10-dioxo-1,2,3,4,4a,9,9a,10-octahydroanthracene 2-carbothiolic acid ethyl ester 2-carbomethoxy-5-methoxy - 8 - chloro-4,10-dioxo-1,2,3,4,4a,9,9a,10-octahydroanthracene, 0.01 mole, is dissolved in 100 ml. ethyl mercaptan and 0.5 g. boron trifluoride etherate is added. After 48 hours at room temperature the mixture is concentrated at reduced pressure and the residue is taken up in toluene and again concentrated to obtain the desired product.

The procedure is repeated, substituting the following substances for ethyl mercaptan, to obtain the thiol esters corresponding to these mercaptans: ethanedithiol, butyl mercaptan, methyl mercaptan, benzyl mercaptan, with ethanedithiol the carbothiolic acid β-mercaptoethyl ester is obtained.

EXAMPLE LXV

Example LV esters are converted to the corresponding 2-carbothiolic acid esters by the procedure of Example LXIV as follows:

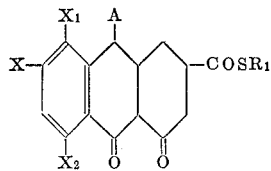

| X | $X_1$ | $X_2$ | A | $R_1$ |
|---|---|---|---|---|
| H | H | H | H | $C_2H_5$ |
| H | 8-Et | 5-OMe | H | $CH_3$ |
| H | 8-NMe₂ | 5-OMe | H | $C_4H_9$ |
| H | 8-NH₂ | 5-OMe | H | $C_5H_{11}$ |
| H | 8-NHCOMe | 5-OMe | H | $CH_2C_6H_5$ |
| H | H | 5-OH | H | $C_4H_9$ |
| H | 8-OMe | H | H | $C_4H_9$ |
| 7-Me | H | 5-OH | H | $CH_2C_6H_5$ |
| 7-i-Pr | H | 5-OH | H | $CH_3$ |
| 7-Et | 8-Et | 5-OH | H | $CH_3$ |
| H | H | 5-OCH₂C₆H₅ | H | $C_2H_5$ |
| H | H | 5-OH | H | $C_2H_5$ |
| 7-i-Pr | H | 5-OMe | H | $C_2H_5$ |
| 7-Me | H | 5-OMe | H | $C_2H_5$ |
| 7-NMe | H | 5-OH | H | $C_2H_5$ |
| 7-Me | 8-Me | H | H | $C_2H_5$ |
| H | 8-NH₂ | 5-OCH₂C₆H₅ | H | $C_2H_5$ |
| H | 8-Pr | 5-OPr | H | $CH_3$ |
| 7-OMe | H | 5-OMe | MeOCH₂ | $CH_3$ |
| H | 8-OMe | 5-OMe | MeOCH(Me) | $CH_3$ |
| 7-CF₃ | H | 5-OMe | H | $CH_2C_6H_5$ |
| H | H | 5-OMe | Me | $CH_2C_6H_5$ |
| H | H | 5-OMe | Et | $C_4H_9$ |
| 7-MeCO₂ | H | 5-OMe | H | $CH_2C_6H_5$ |
| 7-Me | 8-Me | 5-OH | H | $C_4H_9$ |
| H | H | 5-OH | Me | $C_2H_5$ |
| H | H | 5-OH | i-Pr | $C_2H_5$ |
| H | H | 5-OMe | Me | $C_2H_5$ |
| H | H | 5-OMe | H | $C_2H_5$ |
| H | 8-NHMe | 5-OMe | H | $C_2H_5$ |
| 7-NH₂ | H | 5-OMe | H | $C_3H_7$ |
| 7-OH | H | 5-OH | H | $CH_3$ |
| H | 8-OH | 5-OH | H | $C_2H_5$ |
| H | H | 5-OCH₂C₆H₅ | H | $(CH_2)_2SH$ |
| H | 8-NEt₂ | 5-OMe | H | $CH_3$ |
| 7-CF₃ | 8-CF₃ | 5-OMe | H | $C_2H_5$ |
| 7-EtCO₂ | 8-Me | H | EtOCH(Me) | $C_2H_5$ |
| 7-OBu | 8-CF₃ | 5-OBu | H | $(CH_2)_2SH$ |
| 7-NHEt | 8-CF₃ | H | H | $CH_3$ |
| 7-NHCOC₃H₇ | H | 5-OEt | Et | $CH_3$ |
| 7-MeCO₂ | 8-Cl | 5-OH | Et | $CH_3$ |
| H | 8-CF₃ | 5-OH | H | $C_2H_5$ |
| 7-NHCOCH₃ | H | 5-OH | H | $CH_3$ |
| 7-OH | 8-Cl | 5-OH | H | $CH_3$ |
| 7-CF₃ | H | 5-OH | H | $CH_3$ |
| 7-OH | H | H | $CH_3$ | $CH_3$ |

EXAMPLE LXVI 4,10-dioxo-5-methoxy-8-chloro,1,2,3,4,4a,9,9a,10-octahydro-2-anthraldehyde The carbothiolic acid ethyl ester of Example LXIV, 1.0 gram, is dissolved in 50 ml. ethanol and stirred with Raney nickel for 24 hours. Filtration and evaporation of the solvent provide the desired product.

EXAMPLE LXVII 2-(2-cyanoethyl)-5-methoxy-8-chloro-4-tetralone 2-(2-carboxyethyl) - 5 - methoxy-8-chloro-4-tetralone, prepared as in Example VI, 25 g., is dissolved in 455 ml. chloroform and to this is added 12 ml. triethylamine followed by 10 ml. ethyl chloroformate. The temperature rises to 35° C. in about 5 minutes and the introduction of anhydrous ammonia is then begun and continued for one hour. At the end of this time 19 g. of 2-(2-carboxamidoethyl) - 5 - methoxy-8-chloro-4-tetralone is recovered in the form of a crystalline precipitate melting at 193–8° C., by filtration and water-washing. A second crop (5.1 g.) of less pure product melting at 184–192° C. is also recovered. After recrystallization from dioxane the pale yellow crystals melt at 199–201° C.

10 g. of this amide are dissolved in 100 ml. pyridine and 24 g. p-toluenesulfonyl chloride added. After stirring at room temperature for 18 hours the clear yellow solution is poured into a liter of chloroform and washed successively with water, 3 N HCl, and brine. The dried solution is evaporated to obtain 8.1 g. pale yellow crystalline product melting at 105–107.1° C. Recrystallization from ethyl acetate gives 6.6 g. melting at 107–109° C.

EXAMPLE LXVIII 2-cyano-5-methoxy-8-chloro-3,4,10-trioxo-1,2,3,4,4a,9,9a,10-octahydroanthracene Sodium hydride, 3.1 g. of a 50% dispersion in oil, is suspended in 50 ml. dry dimethyl formamide. To this is added 4.1 g. 2-(2-cyanoethyl)-8-chloro-5-methoxytetralone together with 3.9 g. dimethyl oxalate in 25 ml. dimethyl formamide. The mixture is stirred under nitrogen while the temperature is raised rapidly to 95° C. and maintained there until an exothermic reaction ensues. The temperature rises to about 100° C. with the external heating source removed. When the reaction subsides the mixture is cooled to 30° C. and carefully acidified with acetic acid. The solvent is then evaporated at reduced pressure and the residue distributed between chloroform and water. The chloroform layer is then washed with water and with brine, dried, treated with activated carbon, and filtered. The filtrate is evaporated to a brown solid, which is hexane-washed and triturated with ethyl acetate to obtain 3.1 g. of product melting at 237–239° C. Recrystallization from tetrahydrofuran-ethyl acetate raises the melting point to 260–2° C. (with decomposition).

*Elemental analysis.*—Calculated for $C_{16}H_{12}O_4NCl$ (percent): C, 60.48; H, 3.81; N, 4.41. Found (percent): C, 60.13; H, 3.89; N, 4.27.

EXAMPLE LXIX 2-cyano-3-hydroxy-5-methoxy-8-chloro-4,10-dioxo-1,2,3,4,4a,9,9a,10-octahydroanthracene Under a nitrogen atmosphere and with stirring a solution of 3.18 g. (0.01 mole) of 2-cyano-5-methoxy - 8 - chloro - 3,4,10 - trioxo - 1,2,3,4,4a,9,9a,10 - octahydroanthracene in tetrahydrofuran is treated with a solution of 0.38 g. (0.01 mole) of sodium borohydride, 50 cc. of tetrahydrofuran, and 15 cc. of water. After 30 minutes 10 cc. of glacial acetic acid is added, and stirring is continued for five minutes. Next 5 cc. of 6 N hydrochloric acid is added, and stirring is continued for an additional 30 minutes. The mixture is poured into water, and is extracted several times with chloroform. The combined extracts are dried over anhydrous sodium sulfate, filtered, and evaporated. The residue is purified by recrystallization from tetrahydrofuran/ethyl acetate.

EXAMPLE LXX 2-cyano-3-formyloxy-5-methoxy-8-chloro-4,10-dioxo-1,2,3,4,4a,9,9a,10-octahydroanthracene A solution of 3.20 g. (0.01 mole) of 2-cyano-3-hydroxy-5-methoxy-8-chloro-4,10-dioxo - 1,2,3,4,4a,9,9a,10 - octahydroanthracene in pyridine is cooled to 0° and treated with 3.5 g. (0.04 mole) of acetoformic anhydride. After standing 30 minutes at 0° the solution is evaporated under reduced pressure and the residue is taken up in chloroform. The chloroform solution is washed exhaustively with water, dried over anhydrous sodium sulfate, filtered, and evaporated. The residue is purified by recrystallization from tetrahydrofuran/ethyl acetate.

EXAMPLE LXXI 2-cyano-5-methoxy-8-chloro-4,10-dioxo-1,2,3,4,4a,9,9a,10-octahydroanthracene

*Method A.*—Under a nitrogen atmosphere a solution of 3.48 g. (0.01 mole) of 2-cyano-3-formyloxy-5-methoxy-8-chloro-4,10-dioxo - 1,2,3,4,4a,9,9a,10 - octahydroanthracene and 97% formic acid is treated with 3.5 g. of zinc dust. After 15 minutes the reaction mixture is filtered, and the filtrate evaporated under reduced pressure. The filter pad is washed thoroughly with 97% formic acid and the filtrate evaporated under reduced pressure to a hard gum. To remove traces of formic acid, the gum is triturated with ether, filtered, washed thoroughly with ether and the residual amber gum dissolved in 150 ml. of 67% methanol in water. Hydrogen sulfide is bubbled through the solution for 3 minutes, the mixture then treated with Darco and filtered through Super Cel, the filter pad being thoroughly washed with the methanol solution. The filtrate is evaporated under reduced pressure. The residue is purified by means of chromatography on a column of silicic acid in chloroform. The major fraction is evaporated to dryness and recrystallized from ethyl acetate/hexane.

*Method B.*—A mixture of 3.48 g. of 2-cyano-3-formyl-oxy-5-methoxy - 8 - chloro-4,10-dioxo-1,2,3,4,4a,9,9a,10-octahydroanthracene and 0.4 g. 10% palladium-on-carbon in dry dimethylformamide is hydrogenated at 1000 p.s.i. and 60° C. for 3 hours. The reaction mixture is filtered and the filtrate processed as in Method A to obtain the product.

*Method C.*—A solution of 3.22 g. (0.01 mole) of 5-methoxy - 8 - chloro-4,10-dioxo-1,2,3,4,4a,9,9a,10-octahydro-2-anthracenecarboxamide and 1.91 g. (0.01 mole) of p-toluenesulfonyl chloride in pyridine is allowed to stand at room temperature overnight. The solvent is evaporated under reduced pressure, and the residue is taken up in chloroform. The chloroform solution is washed exhaustively with water, dried over anhydrous sodium sulfate, treated with activated carbon, filtered, and evaporated. The residue is purified by recrystallization from ethyl acetate/hexane.

*Method D.*—A solution of 3.18 g. (0.01 mole) of 2-cyano-5-methoxy-8-chloro - 3,4,10 - trioxo-1,2,3,4,4a,9,9a,10-octahydroanthracene and 0.3 g. of p-toluenesulfonic acid monohydrate in 500 cc. of benzene is distilled until the volume is about 350 cc. Ethanedithiol (2.8 g., 0.03 mole) is added, and 150 cc. of benzene is distilled from the solution over a three-hour period. The remainder of the solution is evaporated under reduced pressure, and the residue is taken up in chloroform. The chloroform solution is washed three times with water, dried over anhydrous sodium sulfate, treated with activated carbon, filtered, and evaporated. The residual 3-ethylenethioketal is purified by recrystallization from acetone/hexane.

A mixture of 3.94 g. (0.01 mole) of the 3-ethylene-thioketal and 4.0 g. of W–2 Raney nickel catalyst in ethanol is heated under reflux for an hour. The reaction mixture is mixed with diatomaceous earth and then rapidly filtered. The filtrate is evaporated under reduced pressure. The residue is purified by recrystallization from ethyl acetate/hexane.

EXAMPLE LXXII 5-methoxy-8-chloro-4,10-dioxo-1,2,3,4,4a,9,9a,10-octahydro-2-anthraldehyde A solution of 3.40 g. (0.02 mole) of lithium triethoxy-aluminohydride in dry 1,2-dimethoxyethane is prepared by the method described in Tetrahedron Letters, No. 3, pp. 9–10, 1959. Maintaining the thus prepared reducing solution at 0°, 3.04 g. (0.01 mole) of 2-cyano-5-methoxy-8-chloro - 4,10 - dioxo-1,2,3,4,4a,9,9a,10-octahydroanthracene is added, and after one hour at 0° methanol is added to destroy unreacted hydride. The solution is evaporated under reduced pressure, and the residue is taken up in chloroform. The chloroform solution is washed twice with 50 cc. portions of 1 N hydrochloric acid, and once with water, dried over anhydrous sodium sulfate, treated with activated carbon, filtered, and evaporated. The residue is purified by recrystallization from ethyl acetate/hexane.

Alternatively, this product is prepared from the same nitrile starting compound by reduction with diisobutylaluminum hydride according to the procedure described in Proc. Acad. Sci. U.S.S.R., Chemistry Section, pp. 879–881 (1957).

EXAMPLE LXXIII

The listed dioxo hydroanthraldehydes are prepared from the products of Examples LXII, LXV and corresponding 2-cyano-4,10-dioxo-octahydroanthracenes by the procedures of Examples LXIII, LXVI and LXXII. Approximate procedures for a given product are selected by applying the principles previously discussed. With compounds containing an active hydrogen in addition to those in the β-diketone system (e.g. hydroxy or amino substituent) an additional equivalent of hydride is employed in the hydride procedures of Examples LXIII, and LXXII. More than one active hydrogen per mole in avoided in the latter procedures, e.g. by formation of lower alkyl ethers. Protective ether groups are subsequently cleaved by HBr treatment following the procedure given below. Additionally, the acid recoveries of Example LXXII are inappropriate where basic groups such as amino or alkylamino substituents are present.

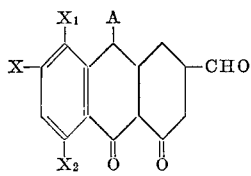

| X | $X_1$ | $X_2$ | A |
|---|---|---|---|
| H | H | H | H |
| 7-OH | H | 5-OH | H |
| H | 8-Et | 5-OMe | H |
| H | 8-NMe₂ | 5-OMe | H |
| H | 8-NH₂ | 5-OMe | H |
| H | 8-NHCOMe | 5-OMe | H |
| H | H | 5-OH | H |
| H | 8-OMe | H | H |
| 7-Me | H | 5-OH | H |
| 7-i-Pr | H | 5-OH | H |
| 7-Et | 8-Et | 5-OH | H |
| H | H | 5-OCH₂C₆H₅ | H |
| 7-NH₂ | H | 5-OMe | H |
| 7-Et | H | 5-OMe | H |
| 7-Me | H | 5-OMe | H |
| 7-NMe₂ | H | 5-OH | H |
| 7-Me | 8-Me | H | H |
| H | 8-OMe | 5-OCH₂C₆H₅ | H |
| 7-OMe | H | 5-OMe | MeOCH₂ |
| H | 8-OMe | 5-OMe | MeOCH(Me) |
| 7-CF₃ | H | 5-OMe | H |
| H | H | 5-OMe | Me |
| H | H | 5-OMe | Et |
| 7-MeCO₂ | H | 5-OMe | H |
| 7-Me | 8-Me | 5-OH | H |
| H | H | 5-OH | Me |
| H | H | 5-OH | i-Pr |
| 7-Me | H | 5-OH | Me |
| H | H | 5-OMe | H |
| H | 8-NH₂ | 5-OCH₂C₆H₅ | H |
| H | 8-Pr | 5-OPr | H |
| 7-Pr | H | 5-OMe | H |
| 7-Me | H | 5-OMe | Me |
| 7-Et | H | 5-OMe | H |
| H | 8-Cl | 5-OMe | H |
| 7-Et | 8-i-Pr | 5-OMe | H |
| H | 8-OMe | 5-OEt | H |
| 7-Me | 8-Cl | 5-OMe | H |
| 7-NMe₂ | 8-Cl | 5-OMe | H |
| 7-OMe | 8-Cl | H | H |
| H | 8-Cl | 5-NHCOCH₃ | H |
| 7-NHCOCH₃ | 8-Cl | 5-OMe | H |
| H | 8-NEt₂ | 5-OMe | H |
| 7-CF₃ | 8-CF₃ | 5-OMe | H |
| 7-EtCO₂ | 8-Me | H | EtOCH(Me) |
| 7-OBu | 8-CF₃ | 5-OBu | H |
| 7-NHEt | 8-CF₃ | 5-OMe | H |
| 7-NHCOC₃H₇ | H | H | H |
| 7-MeCO₂ | 8-Cl | 5-OEt | Et |
| H | 8-CF₃ | 5-OH | H |
| 7-NHCOCH₃ | H | 5-OH | H |
| 7-OH | 8-Cl | 5-OH | H |
| 7-CF₃ | H | 5-OH | H |
| 7-OH | H | H | CH₃ |

The 5-methoxy hydroanthracenedione of the preceding example is heated on a steam bath under nitrogen with approximately six times their weight of 30% hydrogen bromide is glacial acetic acid for approximately 15 minutes. The solution is then poured into approximately 3 volumes of ice water, which results in precipitation of the desired hydroxy compound. It is collected, washed with water, and dried.

EXAMPLE LXXIV 2-carbobenzyloxy - 5 - methoxy - 8 - chloro - 4,10-dioxo-1,2,3,4,4a,9,9a,10 - octahydroanthracene-4-enol methyl ether 2 - carbobenzyloxy - 5 - methoxy-8-chloro-4,10-dioxo-1,2,3,4,4a,9,9a,10-octahydroanthracene is prepared from the corresponding methyl ester of Example LIV by ester interchange: The methyl ester is dissolved in benzyl alcohol saturated with dry hydrogen chloride, heated at 75° C. for three hours, and the reaction mixture is concentrated in vacuo to obtain the desired intermediate as residue.

The 2-carbobenzyloxy diketone, 0.002 mole, is placed in 100 ml. ether with sufficient chloroform to solubilize. The solution is then treated with 0.5 g. diazomethane in 50 ml. ether and 70 ml. methanol. After 8 days 1.0 g. diazomethane in 100 ml. ether is added, and the solution is permitted to stand until an aliquot no longer gives a positive ferric chloride test. The solution is then evaporated in vacuo to obtain the desired product.

EXAMPLE LXXV 4,10 - dioxo - 5 - methoxy - 8 - chloro-1,2,3,4,4a,9,9a,10-octahydroanthracene-2-aldehyde-4-enol methyl ether 2 - carbobenzyloxy - 5 - methoxy-8-chloro-4,10-dioxo-1,2,3,4,4a,9,9a,10 - octahydroanthracene - 4 - enol methyl ether, 1.0 g., in ethyl acetate is combined with 0.1 g. 5% palladium on barium sulfate and subjected to 30 p.s.i. hydrogen pressure at 10° C. until an equimolar proportion of hydrogen has been consumed. The reaction mixture is filtered and evaporated in vacuo to obtain 2-carboxy - 5 - methoxy-8-chloro-4,10-dioxo-1,2,3,4,4a,9,9a,10-octahydroanthracene-4-enol methyl ether as residue.

This substance is converted to the desired aldehyde product via the acid chloride by applying in order the procedures of Examples LXI and LXIII, merely substituting an equimolar proportion of the enol ethers for the corresponding diketones of those examples. The aldehyde is suitable for subsequent conversions in the same procedures which are applied to the product of Example LXX. Strong acid treatments hydrolyze the 4-enol ether.

EXAMPLE LXXVI 4,10-dioxo-5-methoxy-1,2,3,4,4a,9,9a,10-octahydro-anthracene-2-carboxaldehyde 4,10 - dioxo-5-methoxy-8 - chloro - 1,2,3,4,4a,9,9a,10-octahydroanthracene-2-carboxaldehyde, 0.1 mole, is dissolved in 250 ml. ethylene glycol monomethyl ether containing 0.1 mole triethylamine. The solution is subjected to 50 p.s.i. hydrogen pressure at room temperature in the presence of 3 g. of 5% palladium on carbon until 0.1 mole hydrogen has been consumed. The slurry is filtered and the product precipitated by pouring the filtrate into about a liter of water.

EXAMPLE LXXVII 6,12a-dideoxy-6-demethyltetracycline-10-methyl ether (A) To a well-stirred mixture of 10 g. (0.025 mole) of 2 - decarboxamido-6,12a-dideoxy-6-demethyltetracycline-2-nitrile-10-methyl ether in 100 ml. of glacial acetic acid is added 18 ml. of conc. H₂SO₄. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water, and the orange crystalline precipitate of N-t-butyl - 6,12a-dideoxy-6-demethyltetracycline- 10-methyl ether is filtered, water-washed, and dried in vacuum.

0.4 g. of the product is dissolved in 2 ml. of 85% sulfuric acid and the solution allowed to stand for one hour at room temperature, after which it is carefully diluted with 2 volumes of water, employing ethernal cooling to control the exothermic reaction. Upon standing for an additional 16 hours, a crystalline precipitate forms and is collected. The product is a mixture of predominantly 6-demethyl - 6,12a - dideoxytetracycline-10-methyl ether together with a small amount of starting compound which is separated using chromatographic techniques.

(B) The 10-methyl ether is converted to 6,12a-dideoxy-6-demethyltetracycline as follows: 2 g. are heated at 100° C. in 50 ml. 48% HBr for 45 minutes. Concentration of the mixture yields the desired product as a hydrobromide, which may be converted to the amphoteric compound by treatment in aqueous solution with an equivalent proportion of sodium bicarbonate.

Resolution of the racemate is accomplished by fractional crystallization of the camphorsulfonic acid salt from aqueous alcohol. The crops of crystals of the desired antipode are identified by virtue of their enhanced antibacterial potency.

Following Procedure A, above, 6,12a-dideoxy-6-demethy-7-chlortetracycline-10-methyl ether and 10-benzyl ether are prepared from the corresponding nitriles.

Following Procedure B (15 minutes' heating instead of 45), 6,12a-dideoxy-6-demethyltetracycline-2-nitrile is prepared from the corresponding 10-methyl ether. Alternatively this product is obtained by passing dry hydrogen chloride through a concentrated hydrochloric acid solution of 6,12a-dideoxy-6-demethyltetracycline-2-nitrile-10-methyl ether for 30 minutes at steam bath temperature, cooling, diluting with water, adjusting the pH to 4 and filtering the precipitated product.

EXAMPLE LXXVIII 12a-hydroxylation of 12a-deoxytetracyclines

A solution of about 30 g. of the 12a-deoxytetracycline in 350 ml. of methanol containing 26.6 grams of cerium chloride heptahydrate is combined with 350 ml. pH 10 glycine:sodium chloride:sodium hydroxide buffer and treated by passing oxygen gas through the solution for 30 hours.

The reaction mixture is diluted with 700 ml. water, adjusted to pH 5–6, and extracted with butanol. The butanol extract is evaporated to dryness and taken up in water. The product is isolated by passing this solution through a column consisting of two layers, the first, an anion exchange resin (an amine anion resin prepared by the method of the example of U.S. Pat. 2,630,429, which is converted to the acetate salt by treatment with aqueous acetic acid and subsequent water washing to remove excess acetic acid) and the second, a cation exchange resin (a carboxylic acid resin-H+ cycle, prepared by polymerizing methacrylic acid with 5% divinylbenzene in the presence of 1% benzoyl peroxide catalyst at 60° C. for 24 hours). The effluent from the column contains unreacted 12a-deoxy starting compound as the acetate salt. Elution of the carboxylic acid resin with dilute hydrochloric acid followed by concentration of the eluate yields the tetracycline product as the hydrochloride salt.

Alternatively, the 12a-hydroxylated products produced by this method are separated by the procedure of Example CIV.

EXAMPLE LXXIX 6-deoxy-6-demethyltetracycline-2-nitrile

This product is prepared from the corresponding 6,12a-dideoxy compound by the 12a-hydroxylation procedure of the previous example.

EXAMPLE LXXX 6-deoxy-6-demethyltetracycline

Following the procedures of Example LXXVII, 0.025 mole of 6-deoxy-6-demethyltetracycline-2-nitrile is converted to a mixture of predominantly 6-demethyl-6-deoxytetracycline together with a small amount of starting compound which is separated using chromatographic techniques.

The diastereoisomeric amide products thus obtained are separated by partition chromatography using ethyl acetate saturated with water as the mobile phase and water saturated with ethyl acetate as the stationary phase. A column is prepared by making a slurry of the mobile phase and Whatman cellulose powder (about 150–200 g. per gram of products to be separated). This slurry is homogenized with the stationary phase in a blender, employing 0.5 ml. of stationary phase per gram of paper powder. The mixture is then poured into a chromatography tube and packed down tightly with a plunger using hand pressure. Excess liquid is then drawn off the column.

The diastereoisomeric products are dissolved in a minimum of water and the solution is adjusted to pH 6 by addition of triethylamine while dimethyl formamide is also added to keep the solution homogeneous. This solution is applied to the top of the column and eluted with the mobile phase.

The less polar effluent fraction possesses high biological activity and has infrared and ultraviolet characteristics identical with those of 6-deoxy-6-demethyltetracycline. It is purified by crystallization of the sulfate salt from aqueous solution.

Resolution of the racemate is accomplished by fractional crystallization of the camphorsulfonic acid salt from aqueous alcohol. The crops of crystals of the desired antipode are identified by virtue of their enhanced antibacterial potency.

This product is also obtained by the 12a-hydroxylation of the 12a-deoxy compound.

EXAMPLE LXXXI 6-deoxy-6-demethyl-7-chlortetracycline (A) 6-deoxy-6-demethyl-7-chlortetracycline-10-methyl ether, 2 g., is heated at 100° C. with 50 ml. 48% hydrobromic acid for 15 minutes. Before the reaction, nitrogen is bubbled through the HBr to free it of oxygen, and nitrogen is continuously introduced during the reaction as well. The mixture is then neutralized to pH 5.5, extracted with butanol, the solvent stripped, and the product crystallized from DMF: water as the hydrobromide. It is converted to the amphoteric compound by treatment with an equivalent of sodium bicarbonate in aqueous solution.

(B) 6 - deoxy-6-demethyl-7-chlortetracycline-10-benzyl ether, 2 g., is dissolved in 150 ml. glacial acetic acid and hydrogenated at about 40 p.s.i. hydrogen pressure at room temperature in the presence of 2 g. 5% palladium on carbon catalyst until an equimolar proportion of hydrogen has been consumed. The mixture is then filtered and concentrated at reduced pressure to obtain the product as residue.

The racemic mixtures obtained by the foregoing procedures are resolved as described in the preceding example.

EXAMPLE LXXXII 2-cyanohydroxymethyl-4,10-dioxo-5-methoxy-8-chloro-1,2,3,4,4a,9,9a,10-octahydroanthracene 4,10 - dioxo - 5 - methoxy - 8 - chloro-1,2,3,4,4a,9,9a,10-octahydroanthracene-2-carboxaldehyde, 0.25 mole, is combined with 200 ml. acetone cyanohydrin and 5 ml. triethylamine, and the mixture permitted to stand 24 hours at room temperature. Upon concentration of the reaction mixure in vacuo, the cyanohydrin product crystallizes and is separated.

EXAMPLE LXXXIII 2-(cyano-N,N-dimethylaminomethyl)-4,10-dioxo-5-methoxy-8-chloro-1,2,3,4,4a,9,9a,10-octahydroanthracene 0.1 mole of the Example LXXXII product and 0.12 mole dimethylamine are shaken together in a liter of dimethoxyethane, and the solution is permitted to stand for three days at room temperature. The flask is then opened and the solution poured into 5 liters 0.5% aqueous hydrochloric acid. The aqueous mixture is made alkaline by addition of sodium carbonate, and extracted exhaustively with chloroform. The chloroform extracts are dried and the solvent evaporated to obtain the desired α-dimethylaminonitrile.

EXAMPLE LXXXIV 2-(carboxy-N,N-dimethylaminomethyl)-4,10-dioxo-5-methoxy-8-chloro-1,2,3,4,4a,9,9a,10-octahydroanthracene Four grams of the nitrile of the preceding example is heated for 4 hours in a solution of 12.5 ml. concentrated hydrochloric acid and 12.5 ml. water. The solution is then concentrated and a crystalline wax separates. The solid is triturated with water and the aqueous mixture neutralized to Congo red with sodium hydroxide and filtered hot. The filtrate is acidified with acetic acid and extracted continuously with chloroform. The extract is then separated and concentrated to dryness in vacuo to obtain the desired acid.

Alternatively, the hydrolysis is accomplished by prolonged refluxing in 5% NaOH in the presence of zinc chloride. When ammonia evolution ceases, the solution is adjusted to pH 5–6, hydrogen sulfide put through for 3–5 minutes and the mixture filtered through Supercel. The filter pad is washed with methanol and the washings plus filtrate concentrated then extracted with n-butanol. The dry extract is evaporated to dryness to give the amino acid product.

EXAMPLE LXXXV 2-(cyanoaminomethyl)-4,10-dioxo-5-methoxy-8-chloro-1,2,3,4,4a,9,9a,10-octahydroanthracene 5.9 grams ammonium chloride and 5.3 g. sodium cyanide are combined with 35 ml. concentrated ammonium hydroxide and 40 ml. ethanol saturated with ammonia. Next, 0.05 mole of 4,10-dioxo-5-methoxy-8-chloro-1,2,3,4,4a,9,9a,10-octahydroanthracene-2-carboxaldehyde, prepared as described in Example LXIII is added in small portions over a 90-minute period with stirring at 15–20° C. The mixture is stirred overnight and then concentrated under reduced pressure to about 30 ml. The concentrate is acidified with acetic acid and extracted with butanol. The combined butanol extracts are dried and concentrated to obtain the desired product as residue.

EXAMPLE LXXXVI 2-(carboxyaminomethyl)-4,10-dioxo-5-methoxy-8-chloro-1,2,3,4,4a,9,9a,10-octahydroanthracene This substance is prepared from the product of the previous example by following the procedure of Example LXXXIV.

EXAMPLE LXXXVII

The following aminomethyl dioxohydroanthracenes are synthesized from aldehydes prepared as in Example LXXIII by the procedure of Examples LXXXII–LXXXVI. If desired, free hydroxy groups are protected, e.g. by etherification, and any free amino groups by standard acylation. The acylamino group is subsequently hydrolyzed concurrently with the nitrile, by the procedures of Examples LXXXIV or LXXXVI. Ether groups may subsequently be cleaved by HBr treatment following the procedures of Example LXXIII. Alternatively, OH groups protected as benzyl ethers are subsequently regenerated by standard hydrogenolysis.

The anthracene carboxylic acids may be converted to corresponding esters by standard esterification.

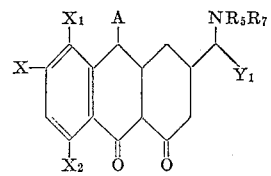

| X | $X_1$ | $X_2$ | A | $R_5$ | $R_7$ | $Y_1$ |
|---|---|---|---|---|---|---|
| H | H | H | H | $CH_3$ | $CH_3$ | COOH |
| 7-OMe | H | 5-OMe | H | $CH_3$ | $CH_3$ | COOH |
| H | 8-OMe | H | H | $CH_3$ | $CH_3$ | COOH |
| H | 8-Et | 5-OMe | H | $CH_3$ | $CH_3$ | COOH |
| H | 8-NMe$_2$ | 5-OMe | H | $CH_3$ | $CH_3$ | COOH |
| H | 8-NEt$_2$ | 5-OMe | H | $CH_3$ | $CH_3$ | COOH |
| H | 8-NHCOMe | 5-OMe | H | $CH_3$ | $CH_3$ | COOH |
| H | H | 5-OMe | H | $C_2H_5$ | $C_2H_5$ | CN |
| 7-NMe$_2$ | H | 5-OMe | H | $-CH_2CH_2SCH_2CH_2-$ | | CN |
| 7-Me | H | 5-OEt | H | $C_2H_5$ | $CH_3$ | CN |
| 7-i-Pr | H | 5-OEt | H | $C_2H_5$ | $C_2H_5$ | CN |
| 7-Et | 8-Et | 5-OEt | H | $CH_3$ | $CH_3$ | CN |
| H | H | 5-OCH$_2$C$_6$H$_5$ | H | $C_2H_5$ | $C_2H_5$ | CN |
| H | H | 5-OMe | H | $(CH_2)_2OMe$ | H | COOH |
| H | H | 5-OMe | H | $(CH_2)_2OMe$ | $(CH_2)_2OMe$ | COOH |
| H | H | 5-OMe | H | $(CH_2)_2OEt$ | $(CH_2)_2OEt$ | COOH |
| 7-NMe$_2$ | H | 5-OMe | H | $CH_3$ | $CH_3$ | COOH |
| 7-Et | H | 5-OMe | H | $CH_3$ | $CH_3$ | COOH |
| 7-Me | H | 5-OMe | H | $CH_3$ | $CH_3$ | COOH |
| 7-NME$_2$ | H | 5-OMe | H | $-CH_2CH_2OCH_2CH_2-$ | | COOH |
| 7-Me | 8-Me | H | H | $-CH_2CH_2CH_2CH_2-$ | | COOH |
| H | H | 5-OCH$_2$C$_6$H$_5$ | H | $CH_3$ | $CH_3$ | COOH |
| 7-OMe | H | 5-OMe | MeOCH$_2$ | $CH_3$ | $CH_3$ | COOH |
| H | 8-OMe | 5-OMe | MeOCH(Me) | $CH_3$ | $CH_3$ | COOH |
| H | 8-Pr | 5-OPr | H | $CH_3$ | $CH_3$ | COOH |
| 7-CF$_3$ | H | 5-OMe | H | $CH_3$ | $CH_3$ | COOH |
| 7-OMe | H | 5-OMe | H | $-CH_2CH_2NCH_2CH_2-$ | | COOH |
| H | H | 5-OMe | H | $-CH=CH-CH=CH-$ | | COOH |
| H | H | 5-OMe | H | $-CH_2CH_2CH_2CH_2-$ | | COOH |
| H | H | 5-OMe | Me | $CH_3$ | $CH_3$ | COOH |
| H | H | 5-OMe | Et | $CH_3$ | $CH_3$ | COOH |
| 7-MeCO$_2$ | H | 5-OMe | H | $CH_3$ | $CH_3$ | COOH |
| 7-Me | 8-Me | 5-OMe | H | $-(CH_2)_3CH(CO_2Me)-$ | | COOH |
| H | H | 5-OPr | Me | $CH_3$ | $CH_3$ | COOH |
| H | H | 5-OPr | i-Pr | $CH_3$ | $CH_3$ | COOH |
| H | H | 5-OMe | Me | $CH_3$ | $CH_3$ | COOH |
| H | H | 5-OMe | Et | H | H | COOH |
| H | H | 5-OMe | H | H | H | COOH |
| H | 8-Cl | 5-OMe | H | H | H | COOH |
| H | H | 5-OMe | H | H | H | COOH |
| H | 8-Cl | 5-OMe | H | H | COCH$_3$ | COOH |
| H | 8-Cl | 5-OMe | H | H | CHO | COOH |
| H | H | 5-OCH$_2$C$_6$H$_5$ | H | H | COCH$_3$ | COOH |
| 7-NH$_2$ | H | 5-OMe | H | $CH_3$ | $CH_3$ | COOH |

| X | X₁ | X₂ | A | R₅ | R₇ | Y₁ |
|---|---|---|---|---|---|---|
| 7-Et | H | 5-OMe | H | CH₃ | CH₃ | CN |
| H | 8-NH₂ | 5-OCH₂C₆H₅ | H | CH₃ | CH₃ | CN |
| 7-Pr | H | 5-OMe | H | CH₃ | CH₃ | CN |
| 7-Me | H | 5-OMe | Me | CH₃ | CH₃ | CN |
| 7-Et | 8-i-Pr | 5-OMe | H | CH₃ | CH₃ | CN |
| H | 8-OMe | 5-OEt | H | CH₃ | CH₃ | COOH |
| 7-Me | 8-Cl | 5-OMe | H | CH₃ | CH₃ | COOH |
| 7-NMe₂ | 8-Cl | 5-OMe | H | CH₃ | CH₃ | COOH |
| 7-OMe | 8-Cl | H | H | CH₃ | CH₃ | COOH |
| 7-NHCOCH₃ | 8-Cl | 5-OMe | H | CH₃ | CH₃ | COOH |
| 7-CF₃ | 8-CF₃ | 5-OMe | H | C₄H₉ | C₄H₉ | COOH |
| 7-EtCO₂ | 8-Me | H | EtOCH(Me) | CH₃ | CH₃ | CN |
| 7-OBu | 8-CF₃ | 5-OBu | H | C₂H₅ | C₂H₅ | CN |
| 7-NHEt | 8-CF₃ | 5-OMe | H | CH₃ | CH₃ | COOH |
| 7-NHCOC₃H₇ | H | H | H | CH₃ | CH₃ | CN |
| 7-MeCO₂ | 8-Cl | 5-OEt | Et | CH₃ | CH₃ | CN |
| H | 8-CF₃ | 5-OH | H | CH₃ | CH₃ | COOH |
| 7-NHCOCH₃ | H | 5-OH | H | CH₃ | CH₃ | COOH |
| 7-OH | 8-Cl | 5-OH | H | CH₃ | CH₃ | COOH |
| 7-OH | H | H | CH₃ | CH₃ | CH₃ | COOH |

EXAMPLE LXXXVIII

5 - methoxy - 8-chloro-4,10-dioxo-1,2,3,4,4a,9,9a,10-octahydroanthracene - 2 - (α-dimethylaminoacetonyl)-γ,γ-dinitrile Malonodinitrile, 0.02 mole, is dissolved in 100 ml. dry dimethyl formamide and treated with 0.02 mole sodium hydride (as a 50% dispersion in oil), added in portions over a 30 minute period. After hydrogen evolution ceases, 0.01 mole of the mixed anhydride of 5-methoxy-8-chloro-4,10 - dioxo - 1,2,3,4,4a,9,9a,10-octahydroanthracene-2-α-dimethylaminoacetic acid and n-butyl chlorocarbonate in 100 ml. dry dimethyl formamide is added. The mixture is stirred for 16 hours at room temperature and then concentrated at reduced pressure to remove the solvent. The residue is taken up in 200 ml. of 2 N hydrochloric acid and filtered. The filtrate is then made alkaline with sodium bicarbonate and the product extracted with three 200 ml. portions of chloroform. Concentration of the combined three extracts provides the desired substance as residue.

The corresponding γ-cyano, γ-carbethoxy and γ-carboxamido, γ-carbethoxy compounds are obtained in the same way, substituting equimolar proportions of cyanoacetic ester and malonic ester half amide for the malononitrile.

In the same way, malonic monoethyl ester mono-N-t-butyl amide, and malonic mononitrile mono-N-t-butyl amide are substituted in equimolar proportion for the malononitrile in separate experiments, to obtain, respectively, the corresponding γ-mono-N-t-butyl-carboxamido, γ-carboethoxy and γ-mono-N - t - butyl - carboxamido, γ-cyano compounds. Each of these is dissolved in concentrated sulfuric acid (0.4 g. in 2 ml.) and the solutions allowed to stand for one hour at room temperature. Careful dilution with 2 volumes of water, with cooling, causes precipitation of ethyl 5-methoxy-8-chloro-4,10-dioxo-1,2,3,4,4a,9,9a,10 - octahydroanthracene-2-(α-dimethylaminoacetonyl)-γ-carboxamide, γ-carboxylate, and 5 - methoxy-8-chloro-4,10-dioxo-1,2,3,4,4a,9,9a,10 - octahydroanthracene - 2 - (α - dimethylaminoacetonyl)-γ-carboxamide, γ-nitrile, respectively.

EXAMPLE LXXXIX

Dimethyl 5 - methoxy-8-chloro-4,10-dioxo-1,2,3,4,4a,9,9a, 10 - octahydroanthracene - 2 - [α-dimethylaminoacetonyl]-γ,γ-dicarboxylate A solution of 2.64 g. (0.02 mole) of dimethyl malonate and 40 cc. of 1,2-dimethoxyethane is added as rapidly as safety permits to an ethereal solution of 0.02 mole of ethyl magnesium bromide. With cooling and efficient stirring, the mixed anhydride of 5-methoxy-8-chloro-4,10-dioxo-1,2,3,4,4a,9,9a,10 - octahydroanthracene - 2 - α-dimethylaminoacetic acid and n-butyl chlorocarbonate, 0.02 mole, in 40 cc. of 1,2-dimethoxyethane is added dropwise. The reaction mixture is stirred overnight at room temperature, and is then treated with 2.0 cc. of glacial acetic acid. The volatile components are evaporated under reduced pressure, and the residue is taken up in 2 N hydrochloric acid and filtered. The filtrate is neutralized with a slight excess of sodium bicarbonate, and then extracted three times with 25 cc. portions of chloroform. The combined chloroform extracts are dried over anhydrous sodium sulfate, filtered, and evaporated under reduced pressure to give the desired product. It is recrystallized from a hot solution of ethyl acetate and hexane.

EXAMPLE XC 5-methoxy - 8 - chloro - 4,10 - dioxo-1,2,3,4,4a,9,9a,10-octahydroanthracene - 2 - (α - dimethylamino)acetic acid anhydrides with lower alkyl carbonates To a stirred suspension of 1.17 g. (0.0031 mole) 2-(carboxy-N,N-dimethylaminomethyl) - 5 - methoxy - 8 - chloro - 4,10 - dioxo-1,2,3,4,4a,9,9a,10-octahydroanthracene in 100 ml. chloroform is added 0.86 ml. (0.63 g., 0.0062 mole) triethylamine. When the acid dissolves the solution is cooled to 0° C. and 0.76 g. (0.0062 mole) i-propyl chloroformate is added. The solution is stirred at 0° for two hours and then rapidly washed twice with water and once with saturated sodium chloride solution. The chloroform solution is dried over anhydrous sodium sulfate and hydrogen chloride is bubbled in for two minutes. The chloroform is then removed by evaporation at reduced pressure and the residual yellow solid triturated with ethyl acetate. The resulting pale yellow crystalline octahydroanthracene-2-(α-dimethylamino) acetic-isopropyl carbonic anhydride hydrochloride salt is recovered by filtration. The product melts at 127–9° C. with bubbling and exhibits infrared absorption maxima at 5.49 and 5.67μ.

The ethyl, n-butyl and isobutyl mixed anhydrides are prepared from the appropriate chloroformate esters in the same way. The corresponding products are prepared from the carboxylic acids of Example LXXXVII by this procedure.

EXAMPLE XCI

Diethyl 5-methoxy - 8 - chloro - 4,10 - dioxo-1,2,3,4,4a,9,9a,10-octahydroanthracene - 2 - (α - dimethylaminoacetonyl)-γ,γ-dicarboxylate 5-methoxy - 8 - chloro - 4,10 - dioxo-1,2,3,4,4a,9,9a,10-octahydroanthracene-2-α-dimethylaminoacetic - isopropyl carbonic anhydride hydrochloride, prepared in Example XC, 0.01 mole, is dissolved in 30 ml. chloroform and treated with 0.02 mole solid magnesium ethoxy malonic ester (prepared as described in the Journal of Organic Chemistry, vol, 22, pp. 247–8, 1957, followed by removal of the solvent). During the addition the temperature is maintained at −5–0° C., with cooling as required. The mixture is allowed to come to room temperature. The solvent is removed, the residue dissolved in chloroform and extracted 3 times with 3 N HCl, 3 times with water, and once with brine. The chloroform solution is then dried with anhydrous sodium sulfate and concentrated at reduced pressure to obtain the desired product as residue.

In the same way, magnesium ethoxy malonic half ester half amide is substituted for the magnesium ethoxy malonic ester to obtain ethyl 5-methoxy-8-chloro-4,10-dioxo-1,2,3,4,4a,9,9a,10 - octahydroanthracene - 2 - (α-dimethylaminoacetonyl)-γ-carboxamide, γ - carboxylate, and the analogous reaction is also conducted with magnesium ethoxy malonic half ester half N-t-butyl amide using acetonitrile as solvent in place of chloroform.

EXAMPLE XCII

Methyl 2-decarboxamido-6-demethyl-6,12a-dideoxy-7-chlorotetracycline-2-carboxylate-10-methyl ether A solution of 4.94 g. (0.01 mole) dimethyl 5-methoxy-8-chloro-4,10 - dioxo - 1,2,3,4,4a,9,9a,10 - octahydroanthracene - 2 - (α - dimethylaminoacetonyl)-γ,γ-dicarboxylate in 25 cc. dry N,N-dimethylformamide is cautiously treated with 1.4 g. (0.03 mole) sodium hydride as a 50% mineral oil dispersion. When the exothermic reaction subsides, the mixture is heated on a steam bath until 5 minutes after hydrogen evolution ceases. (Alternatively the mixture is stirred at room temperature for 3 days.) 20 cc. glacial acetic acid is then carefully added and the dimethylformamide removed by evaporation at 1 mm. pressure (bath temperature 50–75°). The residue is taken up in methanol, and chromatographed on a carboxylic acid ion-exchange resin. Fractions containing the product are readily distinguished by their strong fluorescence. The combined fluorescent fractions are stripped to dryness and the product crystallized from dimethyl formamide-water.

Following this procedure, the corresponding octahydroanthracene - 2 - (α - dimethylaminoacetonyl)-γ,γ-dinitrile is converted to 2-decarboxamido-1-imido-6-demethyl - 6,12a-dideoxy-7-chlorotetracycline - 2 - nitrile-10-methyl, ether; the corresponding γ-carboxamido, γ-carbethoxy compound is converted to 6-demethyl-6,12a-dideoxy-7-chlortetracycline-10-methyl ether; and the corresponding γ-cyano, γ-carbethoxy compound is converted to 2-decarboxamido-6-demethyl-6,12a - dideoxy-7-chlortetracycline-2-nitrile-10-methyl ether. In preparing 12a-deoxy tetracycline nitriles, the crude residue obtained from the glacial acetic acid-acidified reaction mixture by removal of the solvent is crystallized directly from dimethyl formamide:water or tetrahydrofuran:water. The product thus obtained is, if necessary, purified by partition chromatography. Formic acid:chloroform:ethanol, 2:2:1, are thoroughly mixed, then allowed to stand for two days. During this period, partial esterification occurs, and a 2-phase system results. The phases are separated, and the aqueous formic acid layer is employed to wet powdered cellulose, the stationary phase of the chromatographic column. The crude product is dissolved in the ethyl formate:chloroform:ethanol layer and put through the column. The 12a-deoxy tetracycline nitrile fraction is recognized by its intense yellow fluorescence under ultraviolet light. The product is recovered by evaporation of the solvent and crystallized from DMF:water or THF:water.

EXAMPLE XCIII 6-demethyl-6,12a-dideoxy-7-chlortetracycline-10-methyl ether 2-decarboxamido - 1 - imido - 6 - demethyl-6,12a-dideoxy - 7 - chlortetracycline-2-nitrile-10-methyl ether, 10 g., in 100 ml. glacial acetic acid is treated, with vigorous stirring, with 18 ml. 85% sulfuric acid. The solution is cooled to 15° C. and 9 g. isobutylene is introduced. Stirring is continued for 16 hours at 5° C. and the mixture is then extracted with petroleum ether. The acetic acid layer is separated, poured into a liter of ice water, and neutralized with dilute sodium hydroxide. This mixture is extracted three times with 250 ml. portions of chloroform, and the extracts are combined, water-washed, dried with sodium sulfate, and evaporated to dryness.

The residue is dissolved in 2 ml. concentrated sulfuric acid and the solution is held at room temperature for one hour and then diluted with two volumes of water, with cooling. This solution is next heated to 60° C. for hours and then permitted to stand for 16 hours while cooling to room temperature. The resulting crystalline precipitate is separated and dried.

EXAMPLE XCIV 2-decarboxamido-6-demethyl-6,12a-dideoxy-7-chlortetracycline-10-methyl ether (A) 2-(carbomethoxy - N,N - dimethylaminomethyl)-4,10-dioxo-5-methoxy-8-chloro - 1,2,3,4,4a,9,9a,10 - octahydroanthracene, 0.01 mole, in 100 ml. dimethyl formamide is treated with 0.03 mole lithium hydride as a 50% oil dispersion. Next, 0.01 mole methanol is added with cooling, as necessary, to maintain the temperature at about 20–25°, and 0.01 mole methyl acetate is then introduced. When the exothermic reaction subsides, the reaction mixture is heated on a steam bath until 10 minutes after hydrogen evolution ceases.

The dimethyl formamide is now removed by distillation at reduced pressure, and the residue is taken up in 200 ml. 1 N hydrochloride acid. After chloroform-washing, the aqueous phase is made alkaline with sodium bicarbonate and extracted with three 200 ml. portion of chloroform. Concentration of the combined three extracts provides the desired product as residue.

EXAMPLE XCV

The octahydroanthracene derivatives listed below are prepared from the corresponding 2-(carboxyaminomethyl)octahydroanthracenes and the appropriate malonates by the procedures of Example XC and of Examples LXXXVIII–LXXXIX.

For these sequences, hydroxy groups are processed in the form of their ethers; amino substituents are acylated. They are subject to subsequent regeneration, by HBr cleavage and acid or base hydrolysis, respectively, as previously described.

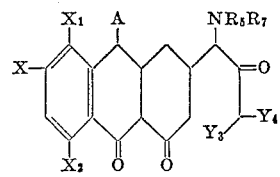

| X | X₁ | X₂ | A | R₅ | R₇ | Y₃ | Y₄ |
|---|---|---|---|---|---|---|---|
| H | H | H | H | CH₃ | CH₃ | COOEt | CN |
| 7-OMe | H | 5-OMe | H | CH₃ | CH₃ | COOEt | CONH₂ |
| H | 8-OMe | 5-OMe | H | CH₃ | CH₃ | CN | CN |
| 7-OMe | H | 5-OMe | H | CH₃ | CH₃ | H | H |
| H | 8-Et | 5-OMe | H | CH₃ | CH₃ | H | COOPr |
| H | 8-NMe₂ | 5-OMe | H | CH₃ | CH₃ | COOEt | CONMe₂ |
| H | 8-NEt₂ | 5-OMe | H | CH₃ | CH₃ | CN | CONMe₂ |
| H | 8-NHCOMe | 5-OMe | H | CH₃ | CH₃ | COOEt | CONHC₆H₅ |
| H | H | 5-OMe | H | C₂H₅ | C₂H₅ | COOEt | CONHC₆H₅ |
| 7-Me | H | 5-OEt | H | C₂H₅ | CH₃ | CN | CONHPr |
| 7-i-Pr | H | 5-OEt | H | C₂H₅ | C₂H₅ | COOEt | CON:(CH₂)₄ |
| 7-Et | 8-Et | 5-OEt | H | CH₃ | CH₃ | COOEt | CON:(CH=CH)₂ |
| H | H | 5-OCH₂C₆H₅ | H | C₂H₅ | C₂H₅ | COOEt | CON:(CH₂CH₂)₂O |
| H | H | 5-OEt | H | CH₃ | CH₂CH₂OMe | COOEt | CONH(CH₂)₂OMe |
| H | H | 5-OEt | H | (CH₂)₂OMe | H | CN | CONH(CH₂)₃OMe |
| H | H | 5-OEt | H | (CH₂)₂OMe | (CH₂)₂OMe | COOEt | CONH(C₂H₅)OEt |
| H | H | 5-OMe | H | (CH₂)₂OEt | (CH₂)₂OEt | COOEt | CONHCH₂C₆H₅ |
| 7-NMe₂ | H | 5-OMe | H | CH₃ | CH₃ | COOEt | CONH(CH₂)₃C₆H₄- (M-CH₃) |

| X | X₁ | X₂ | A | R₅ | R₇ | Y₃ | Y₄ |
|---|---|---|---|---|---|---|---|
| 7-Et | H | 5-OMe | H | CH₃ | CH₃ | COOEt | CONMeC₆H₅ |
| 7-Me | H | 5-OMe | H | CH₃ | CH₃ | COOEt | CONMeNMe₂ |
| 7-OMe | H | 5-OMe | H | —CH₂CH₂NCH₂CH₂— | | COOEt | CONH₂ |
| H | H | 5-OMe | H | —CH=CH—CH=CH— | | COOEt | CONH₂ |
| H | H | 5-OMe | H | —CH₂CH₂CH₂CH₂— | | COOEt | CONH₂ |
| 7-NMe₂ | H | 5-OMe | H | CH₂CH₂SCH₂CH₂ | | COOEt | CONH₂ |
| 7-NME₂ | H | 5-OMe | H | —CH₂CH₂OCH₂CH₂— | | COOEt | CONMe(CH₂)₂OMe |
| 7-Me | 8-Me | H | H | —CH₂CH₂CH₂CH₂CH₂— | | COOEt | CONH₂ |
| H | 8-OMe | 5-OCH₂C₆H₅ | H | CH₃ | CH₃ | H | H |
| H | 8-Pr | 5-OPr | H | CH₃ | CH₃ | CN | CONH₂ |
| 7-OMe | H | 5-OMe | MeOCH₂ | CH₃ | CH₃ | CN | CONH₂ |
| 7-CF₃ | H | 5-OMe | H | CH₃ | CH₃ | CN | CONH₂ |
| H | 8-OMe | 5-OMe | MeOCH(Me) | CH₃ | CH₃ | CN | CONH₂ |
| H | H | 5-OMe | Me | CH₃ | CH₃ | CN | CONH₂ |
| H | H | 5-OMe | Et | CH₃ | CH₃ | CN | CONH₂ |
| H | H | 5-OMe | Me | CH₃ | CH₃ | H | COOMe |
| 7-MeCO₂ | H | 5-OMe | H | CH₃ | CH₃ | H | COOEt |
| 7-Me | 8-Me | 5-OMe | H | —CH₂₃CH(COOMe) | | H | COOEt |
| H | H | 5-OPr | Me | CH₃ | CH₃ | CN | CN |
| H | H | 5-OPr | i-Pr | CH₃ | CH₃ | CN | CN |
| H | H | 5-OMe | Me | CH₃ | H | COOEt | COEEt |
| H | H | 5-OMe | H | CH₃ | CH₃ | COOEt | COEEt |
| H | H | 5-OMe | Et | H | H | COOBu | COOBu |
| H | 8-NHMe | 5-OMe | H | CH₃ | CH₃ | COOEt | CONH₂ |
| H | H | 5-OMe | H | (CH₂)₂OMe | H | COOCH₃ | CONH(t-Bu) |
| H | H | 5-OMe | H | (CH₂)₂OMe | (CH₂)₂OMe | COOCH₃ | CONH(t-Bu) |
| H | H | 5-OMe | H | (CH₂)₂OEt | (CH₂)₂OEt | COOCH₃ | CONH(t-Bu) |
| H | H | 5-OMe | Et | CH₃ | CH₃ | CN | CONHPr |
| H | H | 5-OMe | H | H | H | H | COOEt |
| H | 8-Cl | 5-OMe | H | H | H | COOEt | COOMe |
| H | H | 5-OMe | H | H | H | COOEt | CONH₂ |
| H | 8-Cl | 5-OMe | H | H | COCH₃ | COOEt | CONHMe |
| H | 8-Cl | 5-OMe | H | H | CHO | COOEt | CONHEt |
| H | H | 5-OCH₂C₆H₅ | H | H | COCH₃ | COOMe | CONHMe |
| 7-NH₂ | H | 5-OMe | H | CH₃ | CH₃ | COOMe | CONHMe |
| 7-Et | H | 5-OMe | H | CH₃ | CH₃ | COOMe | CONH(t-Bu) |
| H | 8-NH₂ | 5-OCH₂C₆H₅ | H | CH₃ | CH₃ | CN | CONH₂ |
| 7-Pr | H | 5-OMe | H | CH₃ | CH₃ | CN | CONH₂ |
| 7-Me | H | 5-OMe | Me | CH₃ | CH₃ | CN | COOEt |
| 7-Et | 8-i-Pr | 5-OMe | H | CH₃ | CH₃ | H | CONH₂ |
| H | 8-OMe | 5-OEt | H | CH₃ | CH₃ | CH₃ | CONHCH₂C₆H₅ |
| 7-Me | 8-Cl | 5-OMe | H | CH₃ | CH₃ | H | CONH₂ |
| 7-NMe₂ | 8-Cl | 5-OMe | H | CH₃ | CH₃ | COOEt | CONHPr |
| 7-OMe | 8-Cl | H | H | CH₃ | CH₃ | COOEt | CONH₂ |
| H | 8-Cl | 5-NHCOCH₃ | H | CH₃ | CH₃ | COOEt | CONH₂ |
| 7-NHCOCH₃ | 8-Cl | 5-OMe | H | CH₃ | CH₃ | COOEt | CONHBu |
| 7-OH | H | 5-OH | H | CH₃ | CH₃ | COOEt | CONH₂ |
| 7-CF₃ | 8-CF₃ | 5-OMe | H | C₄H₉ | C₄H₉ | COOEt | CONH(t-Bu) |
| 7-EtCO₂ | 8-Me | H | EtOCH(Me) | CH₃ | CH₃ | COOMe | CONH₂ |
| 7-OBu | 8-CF₃ | 5-OBu | H | C₂H₅ | C₂H₅ | COOEt | CONHMe |
| 7-NHCOC₃H₇ | H | H | H | CH₃ | CH₃ | COOEt | CONH₂ |
| 7-MeCO₂ | 8-Cl | 5-OEt | Et | CH₃ | CH₃ | COOMe | CONH₂ |
| 7-NHEt | 8-CF₃ | 5-OMe | H | CH₃ | CH₃ | COOMe | CONH₂ |
| H | 8-CF₃ | 5-OH | H | CH₃ | CH₃ | COOMe | CONH₂ |
| 7-NHCOCH₃ | H | 5-OH | H | CH₃ | CH₃ | COOMe | CONH₂ |
| 7-OH | 8-Cl | 5-OH | H | CH₃ | CH₃ | COOMe | CONH₂ |
| 7-CF₃ | H | 5-OH | H | CH₃ | CH₃ | COOMe | CONHMe |
| 7-OH | H | H | CH₃ | CH₃ | CH₃ | COOMe | CONH₂ |

The above compounds are transformed to the corresponding 12a-deoxy-tetracyclines by the procedure of Example XCII.

EXAMPLE XCVI

3'-carbomethoxy-6-demethyl-6,12a-dideoxy-7-chloro-2,3-tetracyclino-4',5'-isoxazole-10-methyl ether 2 - decarboxamido - 6 - demethyl - 6,12a - dideoxy - 7-chlortetracycline-10-methyl ether, 4.04 g. (0.01 mole), is treated in dimethyl formamide solution with 0.48 g. (0.015 mole) sodium hydride. After 30 minutes, 1.37 g. (0.01 mole) methyl-α-oximino-acetate in dimethyl formamide solution is added dropwise to the stirred reaction mixture. Stirring is continued at room temperature overnight, and the solvent removed in vacuo at low temperature. The residue is extracted with 1 N aqueous hydrochloric acid, and the extract is separated and adjusted to pH 7 with sodium bicarbonate. The neutral aqueous solution is then extracted exhaustively with n-butanol. The combined butanol extracts are dried and then evaporated at reduced pressure to obtain as residue the 2-(α-oximinoacetic acid methyl ester) corresponding to the starting compound. It may be purified by recrystallization from hot aqueous methanol. However, for present purposes it is used in the next reaction without recrystallization.

5.05 g. (0.01 mole) of the intermediate prepared above is dissolved in ethylene chloride, together with 0.1 g. p-toluenesulfonic acid monohydrate. The solution is slowly distilled at atmospheric pressure, thereby azeotropically removing water as it is produced by the cyclization. When about half of the ethylene chloride has distilled, the solution in the distillation flask is allowed to cool; it is then washed with saturated aqueous sodium bicarbonate and with water. The washed organic phase is dried over anhydrous sodium sulfate, filtered, and evaporated under reduced pressure to obtain 3'-carbomethoxy-6-demethyl-6,12a - dideoxy - 7 - chloro - 2,3 - tetracyclino - 4',5'-isoxazole-10-methyl ether as residue. It is purified by recrystallization from a hot solution of ethyl acetate and hexane.

The described procedure is repeated, substituting an equimolar proportion of 4,10-dioxo-5-methoxy-8-chloro-1,2,3,4,4a,9,9a,10 - octahydroanthracene - 2 - (β - keto-γ-dimethylaminobutyric acid methyl ester) for 2-decarboxamido - 6 - demethyl - 6,12a - dideoxy - 7 - chlortetracycline-10-methyl ether. In this case the final product obtained is 2-(3',4'-dicarbomethoxy-5'-isoxazolyl-N,N-dimethylaminomethyl) - 4,10 - dioxo - 5 - methoxy - 8-chloro-1,2,3,4,4a,9,9a,10-octahydroanthracene.

EXAMPLE XCVII 2-decarboxamido-6-demethyl-6,12a-dideoxy-7-chlortetracycline-2-nitrile-10-methyl ether A solution of 4.87 g. (0.01 mole) of 3'-carbomethoxy-6 - demethyl - 6,12a - dideoxy - 7 - chloro - 2,3 - tetracyclino-4',5'-isoxazole-10-methyl ether together with 0.05 mole potassium hydroxide and 0.015 mole zinc chloride in methanol is heated under reflux for one hour. During this period the starting compound is saponified and the carboxylate anion loses carbon dioxide with concomitant cleavage of the isoxazole ring. The reaction mixture is then neutralized by addition of 1.8 g. (0.03 mole) of glacial acetic acid, and evaporated under reduced pressure. The residue, suspended in chloroform, is saturated with hydrogen sulfide, then filtered. The filter cake is washed thoroughly with hot chloroform, the washings combined, washed with water and brine, then dried over anhydrous sodium sulfate. After filtration the chloroform is evaporated to obtain the desired product as residue.

Any 1,2-tetracylino isomer present in the starting compound is also converted to the desired product in the foregoing procedure.

EXAMPLE XCVIII

6-demethyl-6,12a-dideoxy-7-chlortetracycline

Methyl 2 - decarboxamido - 6 - demethyl - 6,12a - dideoxy - 7 - chlortetracycline - 2 - carboxylate - 10 - benzyl ether, 100 mg., is fused with 2 g. ammonium formate at 140° C. for 3 hours under nitrogen. After cooling, the reaction mixture is extracted with water and with ethyl acetate. The extracts are equilibrated and the organic phase separated and washed with water. After drying, the organic extract is evaporated at reduced pressure, and the solid residue obtained is hydrolyzed by refluxing in a mixture of 7.5 ml. glacial acetic acid, 7.5 ml. conc. hydrochloric acid and 5 drops water for an hour. The hot reaction mixture is poured into water, and this mixture is extracted with ethyl acetate. The organic phase is separated, water-washed, dried and concentrated in vacuum to obtain the product. It is purified by recrystallization from aqueous alcohol.

EXAMPLE XCIX

6-demethyl-6,12a-dideoxy-7-chlortetracycline-10-methyl ether

*Method A.*—To a mixture of 0.01 mole 2-decarboxamido - 6 - demethyl - 6,12a - dideoxy - 7 chlortetracycline-10-methyl ether and 0.015 mole sodium hydride in dry dimethyl formamide is added with stirring 0.11 mole acetyl isocyanate in dimethyl formamide. During addition the temperature of the reaction mixture is maintained at 15–20° C. The mixture is stirred for one hour and 10 ml. glacial acetic acid is then added. The solvent is removed by distillation at reduced pressure, and the residue is carefully neutralized with hydrochloric acid. Extraction of the neutral mixture with butanol removes the acetylated amide product, which is recovered as residue by evaporation of the solvent under reduced pressure.

The acetylated amide is hydrolyzed by treatment with 20% ammonia in methanol for 24 hours at room temperature in a sealed tube. The reaction mixture is then concentrated and the residue obtained is heated in 1% aqueous hydrochloric acid at 60° for 20 minutes. The acid is then adjusted to pH 5.5 and extracted with butanol. The butanol extract is separated, dried, and concentrated at reduced pressure to obtain the desired product.

*Method B.*—Under a nitrogen atmosphere a solution of 4.04 g. (0.01 mole) 2-decarboxamido - 6 - demethyl-6,12a-dideoxy-7-chlortetracycline-10-methyl ether, 0.60 g. (0.01 mole) urea and 1.0 g. triethanolamine in dimethyl formamide is heated under reflux for one hour. After cooling, the reaction mixture is acidified with acetic acid, evaporated to dryness, and the residue is taken up in n-butanol. The butanol solution is water-washed, dried-filtered, and evaporated to obtain the desired product. It is purified by means of column chromatography followed by recrystallization of the dried effluent fractions.

EXAMPLE C

2-decarboxamido-6-demethyl-6,12a-dideoxy-7-chlortetracyclne-2-nitrile-10-methyl ether

*Method A.*—A solution of 4.04 g. (0.01 mole) 2-decarboxamido-6-demethyl-6,12a-dideoxy-7 - chlortetracycline-10-methyl ether in benzene is treated under nitrogen with 0.48 g. (0.02 mole) sodium hydride. When hydrogen evolution ceases the mixture is cooled to 0° in an ice-water bath. With efficient stirring, a solution of 0.62 g. (0.01 mole) chlorine-free cyanogen chloride in benzene is now added dropwise. (The cyanogen chloride is prepared by introducing chlorine into an aqueous solution of potassium cyanide and zinc sulfate.)

After an hour the benzene is evaporated at reduced pressure, the residue is taken up in n-butanol, and the resulting solution is washed thoroughly with water. The butanol phase is dried, filtered and evaporated to obtain the product. It is crystallized by solution in methanol, followed by slow evaporation.

*Method B.*—The starting compound of Method A, 0.01 mole, is converted to the enamine by refluxing in benzene solution with 0.78 g. (0.011 mole) pyrrolidine, together with a few crystals of p-tolenesulfonic acid. By-product water is collected as formed in a Dean-Stark trap. When evolution of water ceases, the solvent is evaporated at reduce pressure. The residue is then taken up in chloroform and the resulting solution is thoroughly washed with water. The chlorform solution is dried over anhydrous sodium sulfate, filtered, and evaporated to obtain the 3-pyrrolidinyl derivative. The product is purified by recrystallization from a hot solution of ethyl acetate and hexane.

The enamine obtained as described, (4.57 g., 0.01 mole) is combined with 1.01 g. (0.01 mole) triethylamine in chloroform, with efficient stirring under nitrogen. The solution is cooled to 0° C. in an ice-water bath and a solution of 0.62 g. (0.01 mole) cyanogen in chloroform is added dropwise, while maintaining the temperature below 10° C. After two hours in the ice bath, the solution is allowed to stand at room temperature overnight. It is then shaken vigorously with 1 N hydrochloric acid for an hour. The pH is then adjusted to 3–4 and the aqueous phase further extracted with butanol. The combined butanol and chloroform solutions are dried, filtered and evaporated to obtain the desired 2-nitrile. It is purified as in Method A. Any 1-pyrrolidinyl isomer present in the starting enamine is also converted to the desired product in this procedure.

EXAMPLE CI

2-decarboxamido-6-demethyl-6,12a-dideoxy-7 - chlortetracycline-2-(N-t-butyl carboxamide)-10-methyl ether

*Method A.*—This product is obtained following Method B of the preceding example by substituting an equimolar proportion of N-t-butyl carbamyl chloride for the cyanogen chloride of that example. The N-t-butyl carbamyl chloride is prepared by the reaction of t-butylamine and phosgene.

In the same manner, 6-demethyl-6,12a-dideoxy-7-chlortetracycline-10-methyl ether is prepared, substituting carbamyl chloride for cyanogen chloride.

*Method B.*—Under a nitrogen atmosphere, with cooling and stirring, a solution of 4.04 g. (0.01 mole) 2-decarboxamide-6-demethyl-6,12a-dideoxy - 7 - chlortetracycline-10-methyl ether in dimethyl formamide is treated with 0.48 g. (0.02 mole) sodium hydride. After 30 minutes, a solution of 0.99 g. (0.01 mole) t-butyl isocyanate in dimethyl formamide is added dropwise to the reaction mixture. The mixture is allowed to stand at room temperature overnight, and the solvent is then evaporated under reduced pressure. The resulting residue is taken up in 0.1 N hydrochloric acid, and after 15 minutes the solution is adjusted to pH 7 with sodium bicarbonate. The neutral solution is then extracted exhaustively with n-butanol. The butanol extract is dried, filtered, and evaporated. The 2-decarboxamido-6-demethyl-6,12a-dideoxy-7-chlortetracycline-2-(N-t-butyl carboxamide)-10-methyl ether which is obtained as residue is purified by recrystallization from a hot solution of methanol and water.

EXAMPLE CII

6,12a-dideoxy-6-demethyltetracycline 2-decarboxamido - 6,12a - dideoxy - 6 - demethyltetracycline-2-nitrile, 0.5 g., is partly dissolved in a mixture of 5 ml. glacial acetic acid and 0.9 ml. conc. sulfuric acid and cooled to 0° C. Isobutylene gas is passed into the mixture for 15 minutes while maintaining the temperature below 10° C. The reaction mixture is then maintained under nitrogen at 0 to 5° C. for 16 hours, hexane-washed, and poured into water at 10° C. The resulting orange precipitate is separated and triturated with chloroform, causing it to crystallize. The crystals are washed with ether and dried, to obtain 563 mg. (94% of theory) of N-t-butyl-6,12a-dideoxy-6-demethyltetracycline. The infrared absorption curve shows no nitrile absorption at 4.5 $\mu$. Ultraviolet absorption maxima are observed at 233, 267, 410, 433 and 456 m$\mu$ in 0.01 N HCl.

The t-butyl amide, 500 mg., is dissolved in 4 ml. 85% $H_2SO_4$ and the solution allowed to stand at room temperature for 1.5 hour, then added to water. The resulting solution is adjusted to pH 5 and filtered. The crude solid thus obtained is crystallized from n-butanol, or from aqueous dimethyl formamide to give red prisms of the desired product.

EXAMPLE CIII 6-deoxy-6-demethyltetracycline 6,12a-dideoxy-6-demethyltetracycline, 100 mg. and manganese chloride tetrahydrate, 50 mg. are dissolved in 100 ml. methanol, and 100 ml. of pH 10 glycine:sodium chloride:sodium hydroxide buffer solution are added. Oxygen is bubbled into the mixture for 3 hours to produce a clear amber solution. The latter is diluted with 200 ml. water, adjusted to pH 5.0, and extracted with butanol. The butanol extract is evaporated to dryness and the resulting mixture of product and unreacted starting material is separated by partition chromatography or by the ion exchange procedure of Example CXII. The yield is approximately 25% of theory.

EXAMPLE CIV 6-deoxy-6-demethyltetracycline 6,12a - dideoxy - 6 - demethyltetracycline (250 mg.) and 25 ml. of dimethylformamide are vigorously stirred in a 250 ml. round bottom flask under nitrogen. After 5 minutes cerous chloride (308 mg.) is added to the suspension and stirring continued under nitrogen for an additional 10 minutes. Methanol (55 ml.) is then added in one portion to the clear solution of the cerous chelate. Seventeen ml. of a buffer solution (ph 10.40, comprising 9 ml. of 0.1 N glycine/0.1 N sodium chloride and 8 ml. of 0.1 N sodium hydroxide) is added in one portion to produce a clear light yellow to amber solution. The apparent pH of the resulting solution is 5.7.

The flow of nitrogen gas is discontinued and oxygen then bubbled in at a vigorous rate for 30 minutes. The reaction mixture becomes progressively darker in color during the oxidation. At the end of this time 9.5 ml. of concentrated hydrochloric acid is introduced into the reaction mixture to give a clear yellow/amber color. The mixture is then evaporated to dryness.

To the residue in the still warm flask there is added 5.0 ml. concentrated HCl and the mixture warmed on a steam bath to effect solution. 60 ml. of n-butanol, previously saturated with 1 N HCl, is added to give a completely clear solution. Water (50 ml.) is added and the mixture vigorously shaken and allowed to separate into two layers. The butanol layer is collected and shaken with 25 ml. of 1 N HCl previously saturated with butanol. The aqueous HCl extract is combined with the original HCl liquor and extracted twice with 20 ml. volumes of butanol which had been previously saturated with 1 N HCl. The three n-butanol extracts are combined and run through a partition column, which had been previously prepared according to the following method.

Partition column I.—n-butanol and 1.0 N HCl are shaken together until each is saturated with the other. Acid washed super-cel is mixed with the aqueous acid layer to produce a thin slurry which is packed into a column under a 5 p.s.i. pressure of $N_2$. To produce a super-cel column (l. 300 mm.; i.d. 28 mm.). n-Butanol saturated with 1 N HCl is run through this column to displace the excess stationary phase.

The butanol solution of the reaction mixture is run slowly through this column and the entire yellow eluate evaporated to dryness. Toluene is added and this solvent removed in vacuo until no odor of solvents remain. The residue, a friable, yellow/orange solid is chromatographed on a partition column prepared in a manner similar to that above using the system $CHCl_3$: HCOOH:

$H_2O$ (2:1:1:1) (Upper phase=stationary; Lower phase= Mobile).

The acid washer super-cel column is prepared with the stationary phase (l. 280 mm.; i.d. 28 mm.). It is not necessary to replace excess stationary phase. Instead, the mixture to be chromatographed is dissolved in the minimum amount of stationary phase and pressed into the column with 5 p.s.i. pressure of $N_2$.

The mobile phase is cautiously added to the column, and a pressure of 8–10 p.s.i. $N_2$ applied. The mobile phase overtakes the layer of applied solids, and displaces excess stationary phase. The developed column is extruded from the column, and the bands eluted from the super-cel with methanol and evaporated to dryness. In this manner, 6-deoxy - 6 - demethyltetracycline and a mixture containing 6 - deoxy - 6 - demethyltetracycline, its $C_4$ epimer and a presently unidentified substance are obtained. The $C_4$ epimer is converted to 6 - deoxy - 6 - demethyltetracycline by equilibration of its calcium chelate as described below.

The mixture containing 6 - deoxy - 6 - demethyltetracycline and its $C_4$ epimer (119 mg.) is combined with anhydrous calcium chloride (74 mg.), 0.1 ml. of water and 3 ml. n-butanol under nitrogen and swirled to produce a clear solution. The pH is adjusted to 8.5 with an ethanolamine solution (10% v./v. in n-butanol) and the mixture refluxed for 3.5 hours under nitrogen in the dark. After one hour yellow crystals separate. The final amber mixture is acidified with 3 ml. of 1 N HCl saturated with butanol, the mixture shaken vigorously, and the butanol layer separated and extracted with a further 3 ml. of 1 N HCl saturated with butanol. The combined HCl liquors are extracted three times with 5 ml. portions of butanol, and the butanol solutions combined and run through a partition column (l. 110 mm.; i.d. 29 mm.; n-Butanol/1.0 N HCl—see Partition Column 1 above). The yellow eluate is evaporated to dryness, toluene added, and the mixture again evaporated until free of solvents. The prodduct, a yellow foam, is purified further by countercurrent extraction with the system methanol: water: chloroform: carbontetrachloride (4:4:3:1). The upper layer is the stationary phase and the lower layer the mobile phase.

25 ml. of the stationary phase is placed into each of eleven 50 ml. separatory funnels. Then 25 ml. of the mobile phase is put into tubes 1 and 2.

The yellow foam is dissolved in the contents of tube I. (pH of the upper phase of tube=pH 3.2). 5% $NH_3$ solution is cautiously added to tube I, until the pH of the upper layer is pH 8.0. The tube is shaken vigorously after each addition of base. If the pH should accidently rise above pH 8.0, it is brought back to the required pH by addition of 5% HCl.

Tubes 1 and 2 are shaken vigorously and allowed to separate. Then the lower phase of tube 2 is transferred to tube 3, and the lower phase of tube 1 to tube 2. 25 ml. of fresh mobile phase is added to tube 1.

Tubes 1, 2 and 3 are shaken, allowed to separate, and transferred, 3 to 4, 2 to 3, 1 to 2, and 25 ml. of fresh mobile phase to 1, etc.

A very rapid way to run this countercurrent is as follows. Before the pH of tube 1 is adjusted to 8.0, the contents of tube 2 (being 25 ml. of each, Mobile and Stationary phases) are shaken, allowed to separate, and the lower phase transferred to tube 3. This is in turn shaken, allowed to separate, and the lower phase transferred to tube 4, and so on along the countercurrent train and then the lower (mobile phase) discarded. This process assures that the mobile and stationary phases are mutually saturated, and removes any impurities present in the separatory funnels.

Then tube 1 is adjusted to pH 8.0 as described above. Tube 1 is equilibrated, separated and the mobile phase transferred to 2. Fresh mobile phase (25 ml.) is added to 1. 1 and 2 are shaken, allowed to separate, and then 2 is transferred to 3; 1 is transferred to 2. These two separatory funnels contain ca. 80% of the 6-dimethyl-6-deoxytetracycline. Their mobile phases are run along the countercurrent train, transferring 3 to 4, 2 to 3, then 4 to 5, and 3 to 4, etc., until the first portion of mobile phase arrives at tube 9. Tube 9 is adjusted to pH 2–3 with 5% HCl, and then equiliberated—most of the color is now in the upper stationary phase. Then the lower phase from 9 is transferred to 10, and 8 to 9, etc., and the mobile phases run through tubes 10 and 11 and finally collected in an Erlenmeyer flask. Compounds which pass through this countercurrent are non-basic. The desired 6-demethyl-6-deoxytetracycline, as the stable hydrochloride salt is in the upper (stationary phase of tube 9.

Meanwhile, in a second operation 25 ml. of fresh mobile phase is added to tube 1, the mixture equilibrated, the lower layer separated and transferred to tube 2. Then a further 25 ml. portion of the mobile phase is added to tube 1. The process is continued as described above to carry the mobile phases of these tubes through the countercurrent system. A third such operation is also carried out making a total of six tubes (21 changes) which normally is sufficient to remove all the 6-dimethyl-6-deoxytetracycline from tubes 1, 2 and 3. Tubes 1, 2 and 3 contain the unidentified product and any trace amounts of Epi 6-demethyl-6-deoxytetracycline. Tubes 1+2+3 are acidified and evaporated to produce mostly unidentified product and ammonium chloride (71 mg.). The Erlenmeyer flask at the end of the train contains a non-basic impurity and tube 9 contains 6-demethyl-6-deoxytetracycline (49 mg.). Evaporation of tube 9 produces a pale yellow solid which can be crystallized from a small volume of methanol.

A more effective method of purification involves thin layer chromatography on buffered silica gel plates (pH 4.2) and elution therefrom with methanol. The methanol eluates containing the desired product (determined by paper chromatography) are combined, evaporated to dryness and run through a countercurrent system as described above but using only 5 separatory funnels. Tube 1 is adjusted to pH 8.0, and tube 5 is acidic. This is necessary to separate the 6-demethyl-6-deoxytetracycline from the materials used to buffer the silica gel plate. Tube 5 is evaporated to dryness to give almost pure 6-demethyl-6-deoxytetracycline (14 mg.) which is recrystallized from methanol. Bioassay 860 (Control 860); paper chromatography shows only one spot.

ULTRAVIOLET ABSORPTION DATA

| | Max. ($\mu$) | $\epsilon$ | | Percent purity |
|---|---|---|---|---|
| (0.01 N HCl MeOH) | 267 | 18,700 | 418 | 96.5 |
| | 346 | 15,300 | 342 | 102 |
| (0.01 N NaOH MeOH) | 247 | 16,700 | 372 | 99.5 |
| | 384 | 18,500 | 413. | 102 |

Following the above procedure, racemic 6,12a-dideoxy-6-demethyltetracycline is converted to racemic 6-deoxy-6-demethyltetracycline. The quantities of materials used in the various stages are summarized below.

Oxidation step

D.L. 6-demethyl:6-12a-dideoxytetracycline—250 mg.
Dimethylformamide—25 ml.

Cerous chloride heptahydrate—308 mg.
Methanol—44 ml.
Buffer (9 ml. 01 N glycine/0.1 N Nacl) (8 ml. 0.1 N NaOH)—pH 10.4

Epimerization step

D.L. 6-deoxy-6-demethyltetracycline—$C_4$ epi mixture— 99.5 mg.
$CaCl_2$ (anhydrous)—63 mg.
n-Butanol—3 ml.
Water—0.1 ml.
Ethanolamine solution (10Z v./v. in butanol)—apparent pH 8.5

What is claimed is:
1. A compound of the formula

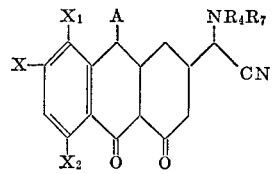

wherein X is selected from the group consisting of hydrogen, trifluoromethyl, amino, mono- and di-lower alkylamino containing 2 to 4 carbon atoms, lower alkyl, alkanoyloxy containing 2 to 4 carbon atoms, and OR wherein R is selected from the group consisting of hydrogen and lower alkyl;

$X_1$ is selected from the group consisting of hydrogen, hydroxy, chloro, lower alkyl, trifluoromethyl, amino, mono- and di-lower-alkylamino, and alkanoylamino containing 2 to 4 carbon atoms, and OR' wherein R' is lower alkyl;

with the proviso that only one of X and $X_1$ is selected from the group consisting of amino, mono- and di-lower-alkylamino and alkanoylamino containing 2 to 4 carbon atoms;

$X_2$ is selected from the group consisting of hydrogen and OR in which R is as previously defined;

A is selected from the group consisting of hydrogen, lower alkyl, and $R_8OCH(R_4)$— wherein $R_8$ is lower alkyl and $R_4$ is selected from the group consisting of hydrogen and lower alkyl;

$R_5$ and $R_7$ are each selected from the group consisting of hydrogen, alkanoyl containing 1 to 4 carbon atoms;

and $CH_2B_1$ wherein $B_1$ is selected from the group consisting of hydrogen, lower alkyl and monosubstituted lower alkyl, said substituent being selected from the group consisting of hydroxy and lower alkoxy;

provided that only one of $R_5$ and $R_7$ is selected from the group consisting of alkanoyl containing 1 to 4 carbon atoms.

2. The compound of claim 1 having the formula

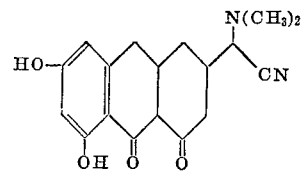

3. The compound of claim 1 having the formula
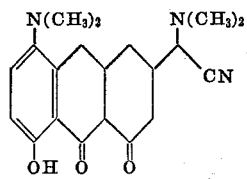
4. The compound of claim 1 having the formula
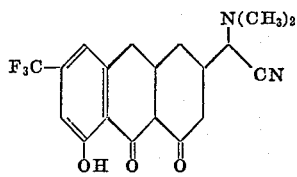
5. The compound of claim 1 having the fromula
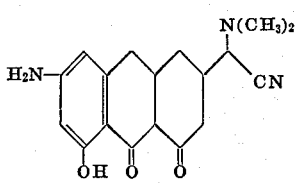
6. The compound of claim 1 having the formula
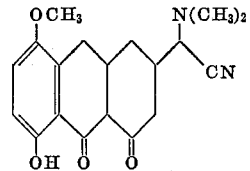
References Cited
UNITED STATES PATENTS
| | | |
|---|---|---|
| 3,030,377 | 4/1962 | Söder et al. |
| 3,102,914 | 9/1963 | Wilkinson et al. _____ 260—590 |
| 3,153,067 | 10/1964 | Fields et al. _____ 260—351 |
| 3,167,579 | 1/1965 | Fields et al. |
CHARLES B. PARKER, Primary Examiner
D. H. TORRENCE, Assistant Examiner
U.S. Cl. X.R.
260—243, 247.2, 247.5, 247.7, 268, 294, 294.3, 294.7, 326.3, 326.5, 326.8, 326.85, 343.6, 469, 470, 471, 473, 475, 455, 463, 479, 482, 484, 485, 501.18, 501.19, 518, 519, 520, 544, 521, 562, 576, 578, 559, 571, 573, 515, 590, 591, 592, 613, 619; 210—38; 252—193; 424—246, 248, 250, 267, 274, 279, 304, 324

UNITED STATES PATENT OFFICE
CERTIFICATE OF CORRECTION

Patent No. 3,514,477  Dated May 26, 1970

Inventor(s) Lloyd H. Conover  Page 1

It is certified that error appears in the above-identified patent and that said Letters Patent are hereby corrected as shown below:

Column 6, lines 5 through 12, that portion of the first formula which reads

Column 16, lines 13 through 18, that portion of the second formula which reads

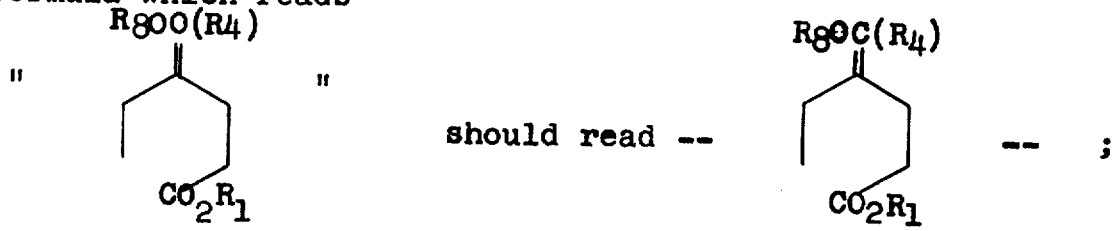

lines 28 through 33, that portion of the second formula which reads

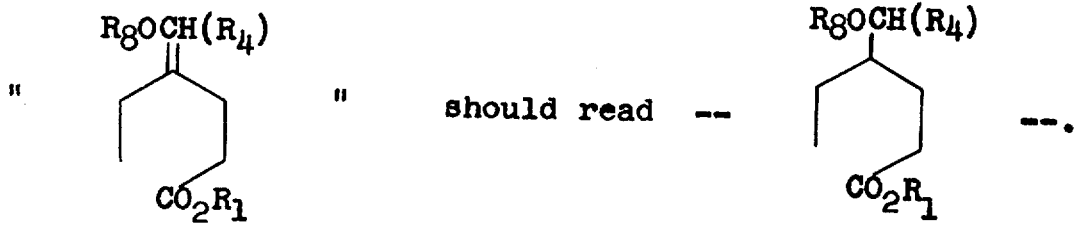

Patent No. 3,514,477
Page 2
Column 6, lines 5 through 12, that portion of the second formula which reads
" 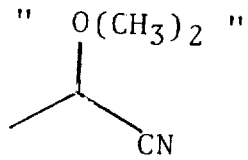 "    -- 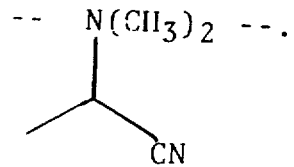 --.
SIGNED AND
SEALED
OCT 6 - 1970
(SEAL)
Attest:
Edward M. Fletcher, Jr.
Attesting Officer
WILLIAM E. SCHUYLER, JR.
Commissioner of Patents